US012425495B2

(12) United States Patent
Yamada et al.

(10) Patent No.: US 12,425,495 B2
(45) **Date of Patent: *Sep. 23, 2025**

(54) COMMUNICATION DEVICE AND COMMUNICATION SYSTEM

(71) Applicant: Sony Semiconductor Solutions Corporation, Kanagawa (JP)

(72) Inventors: Junya Yamada, Kanagawa (JP); Satoshi Ota, Kanagawa (JP); Toshihisa Hyakudai, San Diego, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,657

(22) Filed: May 14, 2024

(65) Prior Publication Data

US 2024/0370400 A1 Nov. 7, 2024

Related U.S. Application Data

(63) Continuation of application No. 17/927,249, filed as application No. PCT/JP2021/021436 on Jun. 4, 2021,
(Continued)

(51) Int. Cl.

| | |
|---|---|
| ***H04L 69/08*** | (2022.01) |
| ***G06F 13/42*** | (2006.01) |
| ***H04L 1/1607*** | (2023.01) |

(52) U.S. Cl.
CPC .......... *H04L 69/08* (2013.01); *G06F 13/4282* (2013.01); *H04L 1/1607* (2013.01)

(58) Field of Classification Search
CPC ............................. H04L 69/08; G06F 13/4282
(Continued)

(56) References Cited

U.S. PATENT DOCUMENTS 7,492,813 B2 * 2/2009 Agazzi ..................... H04B 3/32 370/278
2002/0165962 A1 11/2002 Alvarez
(Continued)

FOREIGN PATENT DOCUMENTS

CN 101507183 A 8/2009
CN 110430110 A * 11/2019 ....... H04L 12/40097
(Continued)

OTHER PUBLICATIONS

International Search Report (PCT/ISA/210), International Application No. PCT/JP2021/021436, dated Aug. 24, 2021.

*Primary Examiner* — Sibte H Bukhari
(74) *Attorney, Agent, or Firm* — Michael Best & Friedrich LLP

(57) ABSTRACT

Communication devices and systems are disclosed. In one example, a communication device includes a LINK that performs protocol conversion of a signal from a Master and outputs the converted signal to a Slave SerDes, and of a signal from the Slave SerDes and outputs the converted signal to the Master. The LINK alternatively selects a first mode and a second mode. In the first mode, the LINK converts a 1-byte signal transmitted from the Master into a signal of a first communication standard in units of the 1-byte signal and transmits the converted signal to the Slave SerDes, then receives a signal of the first communication standard including an ACK signal representing an acknowledgement or a NACK signal representing a negative acknowledgement, and converts the received signal into a signal of a second communication standard and transmits the converted signal to the Master.

19 Claims, 74 Drawing Sheets

Related U.S. Application Data now Pat. No. 12,130,768, which is a continuation of application No. 17/241,614, filed on Apr. 27, 2021, now Pat. No. 11,831,739.

(60) Provisional application No. 63/042,229, filed on Jun. 22, 2020.

(58) Field of Classification Search
USPC .......................................................... 709/230
See application file for complete search history.

(56) References Cited

U.S. PATENT DOCUMENTS

| | | | |
|---|---|---|---|
| 2003/0026525 | A1 | 2/2003 | Alvarez |
| 2003/0091267 | A1 | 5/2003 | Alvarez |
| 2005/0047334 | A1 | 3/2005 | Paul |
| 2008/0072113 | A1 | 3/2008 | Tsang |
| 2009/0086735 | A1 | 4/2009 | Tsang |
| 2010/0194996 | A1 | 8/2010 | Vergoossen |
| 2012/0230671 | A1 | 9/2012 | Nakada et al. |
| 2015/0237145 | A1 | 8/2015 | Koseki |
| 2017/0220517 | A1 | 8/2017 | Khan et al. |

FOREIGN PATENT DOCUMENTS

| | | | |
|---|---|---|---|
| JP | 2010502046 | A | 1/2010 |
| JP | 2011044100 | A | 3/2011 |
| JP | 2011239011 | A | 11/2011 |
| JP | 2015154260 | A | 8/2015 |
| WO | 2008020401 | A2 | 2/2008 |

* cited by examiner

Figure 5. Write Format To Remote $I^2C$ Slave

FIG. 10A

| cmd_mode [7]=0 | value | function | |
|---|---|---|---|
| [7] | 1 | Byte I2C mode | |
| | 0 | Bulk I2C mode | |
| [6] | 1 | Slave-SIDE I2C COMMUNICATION RETRY MODE AT NACK RECEPTION | DO Retry |
| | 0 | | DO NOT Retry |
| [5] | 1 | DEFINE Slave SerDes OPERATION WHEN NACK ARRIVES DURING Slave ACCESS | OUTPUT RAW DATA |
| | 0 | | normal |
| [4] | 1 | I2C COMMAND BATCH TRANSMISSION MODE | TRANSMIT WHEN End of data AND cmd_done |
| | 0 | | MAKE END DETERMINATION FOR EACH End of data AND TRANSMIT |
| [3] | 1 | Slave-SIDE I2C Address mode | current location (sub address not set) |
| | 0 | | random location (sub address set) |
| [2:0] | 111 | I2C Format Type ON COMMUNICATION STANDARD X | Error command Format |
| | 110 | | Special command Format |
| | 10X | | Reserved |
| | 011 | | Read response Format |
| | 010 | | ACK/NACK Format |
| | 001 | | Read command Format |
| | 000 | | Write command Format |

cmd_mode [7:0] IN Bulk I2C mode

FIG. 10B

| cmd_mode [7]=1 | value | function | |
|---|---|---|---|
| [7] | 1 | Byte I2C mode | |
| | 0 | Bulk I2C mode | |
| [6:5] | 11 | Clk mode:<br>defines node1 to tell node2 on generating clocks automatically or manually for Slave. | generates 9 clocks manually for ACK/NACK + DATA |
| | 10 | | generates 8 clocks manually for DATA |
| | 01 | | generates 1 clock manually for ACK/NACK |
| | 00 | | generates 9/8/1 clocks automatically |
| [4] | 1 | I2C Packet Type:<br>defines the packetized I2C data<br><br>(Remarks)<br>If error occurs, cmd_mode[3:0] indicates 4'b1111.<br>Usually this combination doesn't exist. | Write/Read DATA to follow cmd_mode |
| | 0 | | No Write/Read DATA to follow cmd_mode |
| [3] | 1 | | NACK received from Slave or Master |
| | 0 | | No NACK received |
| [2] | 1 | | ACK received from Slave or Master |
| | 0 | | No ACK received |
| [1] | 1 | | STOP detected |
| | 0 | | No STOP detected |
| [0] | 1 | | START/ReSTART detected |
| | 0 | | No START/ReSTRAT detected |

cmd_mode [7:0] IN Byte I2C mode

FIG. 12

Table2: (I2C Cmd Table IN I2C Cmd Unit)
I2C COMMAND PACKET VALUE

| Function | bit | 7 | 6 | 5 | 4 | 3 | 2 | 1 | 0 |
|---|---|---|---|---|---|---|---|---|---|
| ACK | 81 | 1 | 0 | 0 | 0 | 0 | 0 | 0 | 1 |
| NACK | 7E | 0 | 1 | 1 | 1 | 1 | 1 | 1 | 0 |
| Repeated_start | 60 | 0 | 1 | 1 | 0 | 0 | 0 | 0 | 0 |
| End of data | 9F | 1 | 0 | 0 | 1 | 1 | 1 | 1 | 1 |
| cmd_done | FF | 1 | 1 | 1 | 1 | 1 | 1 | 1 | 1 |
| Rsv_command | XX | X | X | X | X | X | X | X | X |

cmd_mode = 8'b1000_0001
[7]=1: Byte I2C mode
[6:5] = 00: node2 clocks automatically
[4] = 0: No DATA
[3] = 0: No NACK
[2] = 0: No ACK
[1] = 0: No STOP
[0] = 1: START (P3)

cmd_mode = 8'b1011_0001
[7]=1: Byte I2C mode
[6:5] = 01: node2 generates 1 clock manually
[4] = 1: DATA
[3] = 0: No NACK
[2] = 0: No ACK
[1] = 0: No STOP
[0] = 1: START/ReSTART (P4)

cmd_mode = 8'b1111_0001
[7]=1: Byte I2C mode
[6:5] = 11: node2 generates 9 clocks manually
[4] = 1: DATA
[3] = 0: NACK
[2] = 0: No ACK
[1] = 0: No STOP
[0] = 1: START/ReSTART (P5)
cmd_mode = 8'b1001_0100
[7]=1: Byte I2C mode
[6:5] = xx
[4] = 1: DATA
[3] = 0: No NACK
[2] = 1: ACK
[1] = 0: No STOP
[0] = 0: No START (P6)

cmd_mode = 8'b1000_1010
[7]=1: Byte I2C mode
[6:5] = xx
[4] = 0: No DATA
[3] = 1: NACK
[2] = 0: No ACK
[1] = 1: STOP
[0] = 0: No START Byte I2C mode format (P7)

cmd_mode = 8'b1xx0_1111
[7]=1: Byte I2C mode
[6:5] = xx
[4] = 0: No DATA
[3] = 1: NACK
[2] = 1: ACK
[1] = 1: STOP
[0] = 1: START If error occurs, cmd_mode[3:0] indicates 4'b1111.
Usually this combination doesn't exist.

Write OPERATION 1

Write OPERATION 2

Write OPERATION 3

Err OPERATION 2

1W. Master→SerDes1 OPERATION (Random Write)

FIG. 28

Table1:
SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ··· | ··· |
| N-2 | wdata |
| N-1 | End of data |

2W. SerDes1→SerDes2 OPERATION (Random Write)

FIG. 30

Table3:
SAVED data IN mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ··· | ··· |
| N-2 | wdata |
| N-1 | End of data |

3W. SerDes2→Slave OPERATION (Random Write)

4W. SerDes2→SerDes1 OPERATION (Random Write)

FIG. 33

Table3:
SAVED data IN mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ••• | ••• |
| N-2 | wdata |
| N-1 | End of data |
| N | A or Nak |

5W. SerDes1 OPERATION (mem write) // RETENTION OF REQUEST COMMAND RESULT

*FIG. 35*

Table1:
SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| *** | *** |
| N-2 | wdata |
| N-1 | End of data |
| N | CLK_value |
| N+1 | Cmd_mode |
| N+2 | Master_Adr |
| N+3 | Sub_adrH |
| N+4 | Sub_adrL |
| N+5 | LengthH |
| N+6 | LengthL |
| N+7 | Slave_adr |
| N+8 | A or Nak |
| N+9 | End of data |

6W. Master→SerDes1 OPERATION (Random Read) // POLLING

7W. Master→SerDes1 OPERATION (Random Write) // TERMINATION PROCESSING

FIG. 38

Table1:

SAVED data IN mem1

| Sub Adr | Data[7:0] |
|---|---|
| 0 | CLK_value |
| 1 | cmd_mode |
| 2 | Slave_Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | Master_Adr |
| N+3 | Sub_adrH |
| N+4 | Sub_adrL |
| N+5 | LengthH |
| N+6 | LengthL |
| N+7 | Slave_adr |
| N+8 | A or Nak |
| N+9 | End of data |
| N+10 | Clear |

1WS. Master→SerDes1 OPERATION (Random Write & cmd_done) OUTLINE

1R. Master→SerDes1 OPERATION (Random Read)

FIG. 43

Table1:

SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |

2R. SerDes1→SerDes2 OPERATION (Random Read)

FIG. 45

Table3:

SAVED data IN mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |

FIG. 47

Table3:
SAVED data IN mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | rdata |
| ... | ... |
| N-2 | rdata |
| N-1 | A or Nak |
| N | End of data |

4R. SerDes2→SerDes1 OPERATION (Random Read)

5R. SerDes1 OPERATION (mem write) // RETENTION OF REQUEST COMMAND RESULT

FIG. 50

Table1:

SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ••• | rdata0 |
| N-3 | ••• |
| N-2 | Rdata M |
| N-1 | End of data |

6R. Master →SerDes1 OPERATION (Random Read) // POLLING

FIG. 52

Table1:

SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ••• | Rdata 0 |
| N-3 | ••• |
| N-2 | Rdata M |
| N-1 | End of data |
| N | Clear |

3Rc. SerDes2→Slave OPERATION (Current Read)

*FIG. 54*

Table3:

SAVED data IN mem2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | A or Nak |
| 9 | rdata 0 |
| ··· | ··· |
| N-2 | rdata M |
| N-1 | End of data |

Normal Read Case

Read Error Case1

FIG. 57

Table3:
SAVED data IN mem2

| | Sub Adr | Data[7:0] |
|---|---|---|
| Read Command Format | 0 | CLK_value |
| | 1 | cmd_mode |
| | 2 | Slave Adr |
| | 3 | Sub_adrH |
| | 4 | Sub_adrL |
| | 5 | LengthH |
| | 6 | LengthL |
| | 7 | End of data |
| Error Command Format | 8 | A or Nak |
| | 9 | rdata 0 |
| | • • • | Don't care |
| | N-2 | Don't care |
| | N-1 | End of data |

*FIG. 58*

Table1:

SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ・・・ | rdata0 |
| N-3 | |
| N-2 | |
| N-1 | End of data |

Read Command Format (Sub Adr 0–7)

Error Command Format (Sub Adr 8–N-1)

clk_value sub_adr=8 cnd_mode sub_adr=9

Error Command Format (cmd_mode)

Don't care (N-3, N-2)

Read Error Case2

FIG. 60

Table1:
SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | |
| 11 | |
| 12 | |
| 13 | |
| 14 | |
| 15 | |
| 16 | |
| ... | |
| N-3 | |
| N-2 | |
| N-1 | End of data |

Read Command Format (Sub Adr 0–7)

Error Command Format (Sub Adr 8–N-1)

Don't care (Sub Adr 10–N-2)

Error Command Format → cmd_mode (Sub Adr 9)

| clk_value | cnd_mode | End of data |
|---|---|---|
| sub_adr=8 | sub_adr=9 | sub_adr=N+1 |

FIG. 61

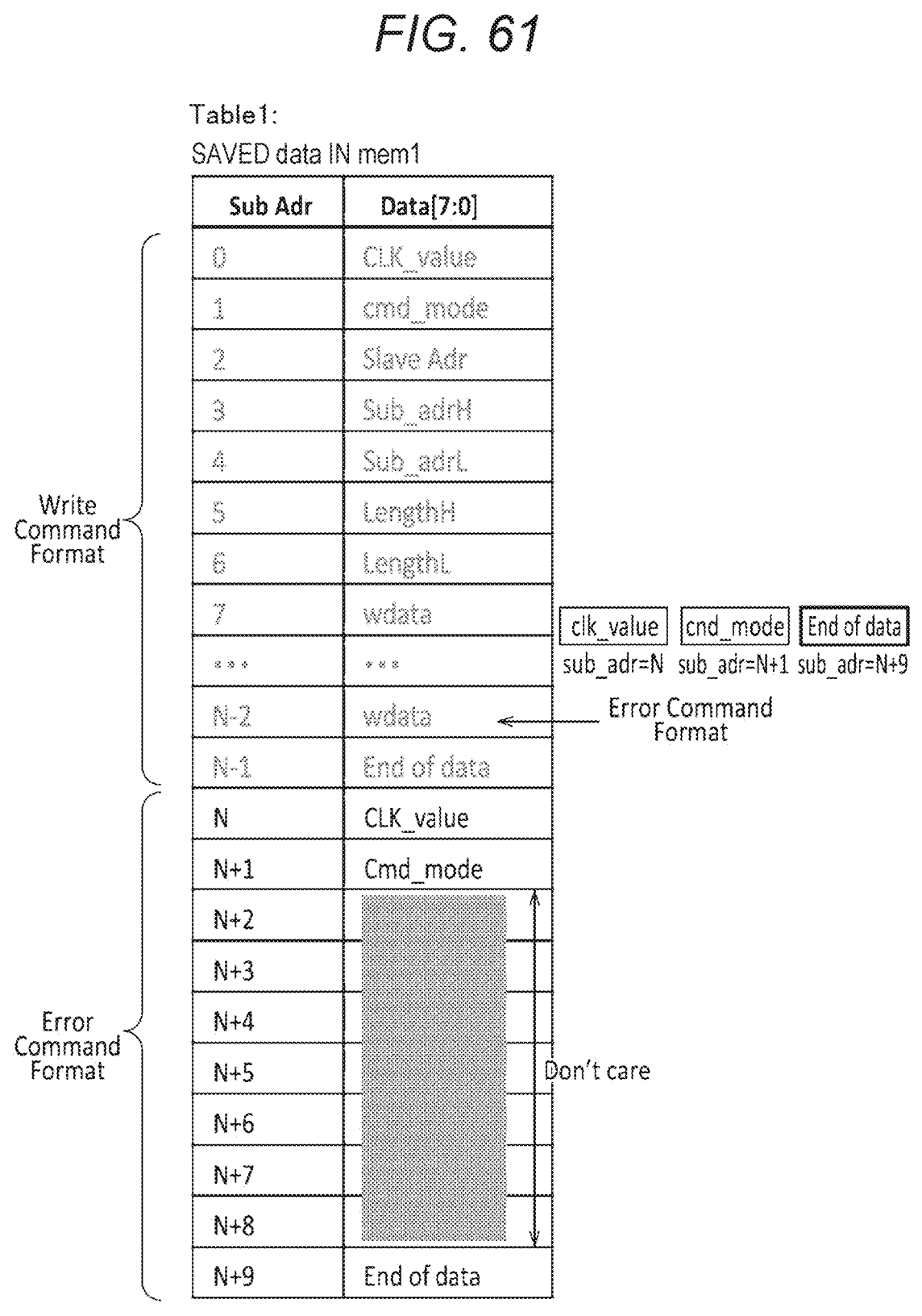

Table1:
SAVED data IN mem1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | |
| N+3 | |
| N+4 | |
| N+5 | |
| N+6 | |
| N+7 | |
| N+8 | |
| N+9 | End of data |

Write Command Format (Sub Adr 0 to N-1)

Error Command Format (Sub Adr N to N+9)

Don't care (N+2 to N+8)

Error Command Format: clk_value (sub_adr=N), cnd_mode (sub_adr=N+1), End of data (sub_adr=N+9)

COMMUNICATION DEVICE AND COMMUNICATION SYSTEM

CROSS REFERENCE TO RELATED APPLICATIONS

This Application is a Continuation Application of the national stage of PCT/JP2021/021436, filed Jun. 4, 2021, which is a Continuation application of U.S. patent application Ser. No. 17/241,614, filed Apr. 27, 2021, now U.S. Pat. No. 11,813,739 issued on Nov. 28, 2023, which claims the benefit of U.S. Provisional Application 63/042,229, filed on Jun. 22, 2020, the contents of which are incorporated herein by reference in their entirety.

TECHNICAL FIELD

The present disclosure relates to a communication device and a communication system.

BACKGROUND ART

A technique for performing serial communication between a SerDes device for a master device and a SerDes device for a slave device in a case of performing data communication between the master device and the slave device has been proposed.

CITATION LIST

Patent Document

Patent Document 1: Japanese Patent Application Laid-Open

SUMMARY OF THE INVENTION

Problems to be Solved by the Invention

In a case where the slave device receives data transmitted from the master device, an ACK signal indicating reception of the data is generally transmitted from the slave device to the master device. However, in a case where two SerDes devices are disposed between the master device and the slave device, the ACK signal passes through these SerDes devices. Therefore, it takes a considerable time from when the slave device transmits the ACK signal to when the master device receives the ACK signal.

In a case where a specification is set such that a new signal cannot be transmitted to the slave device until the master device receives the ACK signal from the slave device, there is a possibility that processing of the master device is delayed because it takes time to receive the ACK signal.

Therefore, the present disclosure provides a communication device and a communication system capable of efficiently performing data communication.

Solutions to Problems

To solve the above-described problem, according to the present disclosure, a communication device is provided, which includes:

a LINK configured to perform protocol conversion of a signal from a Master and output the converted signal to a Slave SerDes, and perform protocol conversion of a signal from the Slave SerDes and output the converted signal to the Master, in which the LINK is capable of alternatively selecting a first mode and a second mode when transmitting the signal from the Master to the Slave SerDes, in the first mode, the LINK repeats processing of converting a 1-byte signal transmitted from the Master into a signal of a first communication standard in units of the 1-byte signal, transmits the converted signal to the Slave SerDes, then receives a signal of the first communication standard including an ACK signal indicating an acknowledgement or a NACK signal indicating a negative acknowledgement, converts the received signal into a signal of a second communication standard, and transmits the converted signal to the Master, and in the second mode, the LINK transmits a signal including the ACK signal or the NACK signal to the Master each time receiving a multi-byte signal transmitted from the Master byte by byte, collectively transmits converted signals to the Slave SerDes after the conversion of the multi-byte signal received from the Master is completed, then receives and retains the signal of the first communication standard including the ACK signal or the NACK signal from the Slave SerDes, and then converts the signal of the first communication standard into a signal of the second communication standard and transmits the converted signal to the Master in response to a readout request from the Master, and the signal transmitted to the Slave SerDes includes command information indicating content transmitted from the Master, and the signal transmitted to the Master includes command information indicating content transmitted from the Slave SerDes.

The number of bytes of the signal transmitted to the Slave SerDes in the first mode may be two bytes or three bytes excluding clock frequency information and an error correction code.

In the first mode, the LINK may transition to a first state when having received a signal including Start Condition from the Master, convert the Start Condition into a signal of the first communication standard and transmit the converted signal to the Slave SerDes when having transitioned to the first state, then, transition to a second state and hold a clock from the Master to a low level when having received signal including 1-byte address information of a final destination device from the Master while the LINK is in the first state, convert the signal including address information into a signal of the first communication standard and transmit the converted signal to the Slave SerDes in the second state, then, recognize write and transition to a third state in a case where a specific bit of the signal including address information is a first bit value when having received the signal including the ACK signal or the NACK signal from the Slave SerDes while the LINK is in the second state, and convert the signal including the ACK signal or the NACK signal received from the Slave SerDes into a signal of the second communication standard and transmit the converted signal to the Master, and then release the hold of the low level of the clock from the Master in the third state.

In the first mode, the LINK may transition to a fourth state when having received a signal including 1-byte write data from the Master while the LINK is in the third state, convert the received signal into a signal of the first communication standard and transmit the converted signal to the Slave SerDes in the fourth state, and then, convert the received signal into a signal of the second communication standard and transmits the converted signal to the Master when having received the signal including the ACK signal or the NACK signal from the Slave SerDes while the LINK is in the fourth state.

In the first mode, the LINK may transition to a fifth state in a case of not receiving the signal including the ACK signal or the NACK signal within a predetermined period from the Slave SerDes while the LINK is in the second state or the fourth state, and perform error processing in the fifth state.

In the first mode, the LINK may transition to a first state when having received a signal including Start Condition or ReStart Condition from the Master, convert the received signal including Start Condition or ReStart Condition into a signal of the first communication standard and transmit the converted signal to the Slave SerDes when having transitioned to the first state, then, transition to a second state and hold a clock from the Master to a low level when having received signal including 1-byte address information of a final destination device from the Master while the LINK is in the first state, convert the signal including address information into a signal of the first communication standard and transmit the converted signal to the Slave SerDes in the second state, then, recognize read and transition to a sixth state in a case where a specific bit of the signal including address information is a second bit value when having received the signal including the ACK signal or the NACK signal from the Slave SerDes while the LINK is in the second state, and convert the signal including the ACK signal or the NACK signal received from the Slave SerDes into a signal of the second communication standard and transmit the converted signal to the Master, and then release the hold of the low level of the clock from the Master in the sixth state.

In the first mode, the LINK may transition to a seventh state when having received a signal including 1-byte readout data from the Slave SerDes while the LINK is in the sixth state, convert the received signal into a signal of the second communication standard and transmit the converted signal to the Master in the seventh state, and then, transition to the sixth state, and convert the received signal into a signal of the first communication standard and transmit the converted signal to the Slave SerDes when having received the signal including the ACK signal or the NACK signal from the Master while the LINK is in the seventh state.

In the first mode, the LINK may transition to an eighth state in a case of not receiving readout data within a predetermined period from the Slave SerDes while the LINK is in the sixth state, transition to the eighth state in a case of not receiving the ACK signal or the NACK signal within a predetermined period from the Master while the LINK is in the seventh state, and avoid deadlock of an entire system including the communication device, the Master, and the Slave SerDes by performing error processing in the eighth state.

In the second mode, the LINK may retain a received signal from when receiving a signal including Start Condition to when receiving a signal including Stop Condition from the Master, and transmit the signal including the ACK signal or the NACK signal to the Master for each byte of the received signal, convert the received signal into a signal of the first communication standard, and transmit the converted signal to the Slave SerDes, and receive and retain the signal including the ACK signal or the NACK signal from the Slave SerDes, and then, convert the signal from the Slave SerDes into a signal of the second communication standard and transmit the converted signal to the Master in response to a readout request from the Master.

The command information may include at least one of first information for selecting the first mode or the second mode, second information for alternatively selecting whether or not the Slave SerDes or the communication device generates a clock signal for transmitting and receiving data by the Slave SerDes or the communication device's own determination or to explicitly specify the clock signal to be used by the Slave SerDes or the communication device in a case where the first mode is selected, third information for instructing whether or not data to be written or read is included in the case where the first mode is selected, fourth information indicating whether or not the NACK signal has been received in the case where the first mode is selected, fifth information indicating whether or not the ACK signal has been received in the case where the first mode is selected, sixth information indicating whether or not Stop Condition instructing stop of information transmission is included in the case where the first mode is selected, or a seventh information indicating whether or not Start Condition instructing start of information transmission or a Repeated Start Condition instructing restart of information transmission is included in the case where the first mode is selected.

The LINK may transmit a signal including the seventh information to the Slave SerDes, and then transmit a signal including address information of a final destination device to the Slave SerDes in the first mode.

The LINK may transmit a signal obtained by combining the seventh information and address information of a final destination device to the Slave SerDes in the first mode.

Each of the signal to the Slave SerDes and the signal to the Master may include at least one of an error correction code, data, clock frequency information, or information indicating a type of a command to be transmitted and received, in addition to the command information.

The signal to the Slave SerDes may include at least one of final destination address information for identifying a final destination device of the signal transmitted from the Master, sub-address information of the final destination device, or data length information indicating a length of data transmitted from the Master.

The command information may include command format information defined in the first communication standard in a case where the second mode is selected, and the command format information may include an error command format.

The command information may include data end determination condition information that designates a condition for end determination of the signal transmitted from the Master in a case where the second mode is selected.

The signal to the Slave SerDes and the signal from the Slave SerDes may include a command obtained by performing protocol conversion of a command of inter-integrated circuit (I2C) communication into the first communication standard.

The protocol conversion by the LINK may be protocol conversion of time division duplex (TDD).

According to the present disclosure, a communication device is provided, which includes:

a LINK configured to perform protocol conversion of a signal from a Master serDes and output the converted signal to a Slave, and perform protocol conversion of a signal from the Slave and output the converted signal to the Master SerDes, in which the LINK is capable of alternatively selecting a first mode and a second mode when transmitting the signal from the Master SerDes to the Slave, in the first mode, the LINK repeats processing of converting a received signal into a signal of a second communication standard in units of the received signal when having received a signal of a first communication standard transmitted from the Master SerDes, transmitting the converted signal to the Slave, then receiving a signal of the second communication standard including an ACK signal indicating an acknowledgement or a NACK signal indicating a negative acknowledgement, and converting the received signal into a signal of the first communication standard and transmitting the converted signal to the Master SerDes, in the second mode, the LINK converts a received signal into a signal of the second communication standard and transmit the converted signal to the Slave byte by byte when having received a multi-byte signal of the first communication standard transmitted from the Master SerDes, and receives and retains the signal of the second communication standard including the ACK signal or the NACK signal from the Slave each time transmitting the converted signal to the Slave byte by byte, and transmits a signal of the first communication standard corresponding to the retained signal to the Master SerDes after completing the transmission of the signal from the Master SerDes to the Slave, and the signal from the Master SerDes includes command information indicating content transmitted from the Master SerDes, and the signal from the Slave includes command information indicating content transmitted from the Slave.

According to the present disclosure, a communication system is provided, which includes:

a Master SerDes provided with a first LINK; and a Slave SerDes provided with a second LINK, in which the first LINK is capable of alternatively selecting a first mode and a second mode when transmitting a signal from the Master to the Slave SerDes, in the first mode, the first LINK repeats processing of converting a 1-byte signal transmitted from the Master into a signal of a first communication standard in units of the 1-byte signal and transmitting the converted signal to the Slave SerDes, then receiving a signal of the first communication standard including an ACK signal indicating an acknowledgement or a NACK signal indicating a negative acknowledgement transmitted from the Slave, and converting the received signal into a signal of a second communication standard and transmitting the converted signal to the Master, in the second mode, the first LINK transmits the signal including the ACK signal or the NACK signal to the Master each time receiving a multi-byte signal transmitted from the Master byte by byte, collectively transmits converted signals to the Slave SerDes after the conversion of the multi-byte signals received from the Master is completed, then receives and retains the signal of the first communication standard including the ACK signal or the NACK signal from the Slave SerDes, and then converts the signal of the first communication standard into a signal of the second communication standard and transmits the converted signal to the Master in response to a readout request from the Master, and the signal transmitted to the Slave SerDes includes command information indicating content transmitted from the Master, and the signal transmitted to the Master includes command information indicating content transmitted from the Slave SerDes, and the second LINK is capable of alternatively selecting the first mode and the second mode when transmitting a signal from the Master SerDes to the Slave, in the first mode, the second LINK repeats processing of converting a signal of the first communication standard transmitted from the Master SerDes into a signal of the second communication standard in units of the received signal and transmitting the converted signal to the Slave, then receiving a signal of the second communication standard including an ACK signal indicating an acknowledgement or a NACK signal indicating a negative acknowledgement, converting the received signal into a signal of the first communication standard and transmitting the converted signal to the Master SerDes, in the second mode, the second LINK converts a received signal into a signal of the second communication standard when receiving a multi-byte signal of the first communication standard transmitted from the Master SerDes, and transmits the converted signal to the Slave byte by byte, receives and retains the signal of the second communication standard including the ACK signal or the NACK signal from the Slave each time transmitting the converted signal to the Slave byte by byte, and transmits a signal of the first communication standard corresponding to the retained signal to the Master SerDes after completing the transmission of the signal from the Master SerDes to the Slave, and the signal from the Master SerDes includes command information indicating content transmitted from the Master SerDes, and the signal from the Slave includes command information indicating content transmitted from the Slave.

BRIEF DESCRIPTION OF DRAWINGS

FIG. 10A is a diagram illustrating an example of cmd_mode in the Bulk I2C mode.

FIG. 10B is a diagram illustrating an example of cmd_mode in the Byte I2C mode.

FIG. 12 is a diagram illustrating types and bit strings of commands to be transmitted on the communication standard X protocol.

FIG. 28 is a diagram illustrating an example of data saved in table1 in mem1 in the Bulk I2C mode.

FIG. 30 is a diagram illustrating an example of table3 in mem2 at the time of a Random Write operation in the Bulk I2C mode.

FIG. 33 is a diagram illustrating a storage area state of mem2 before release of a storage area for the Random Write Command in the Bulk I2C mode.

FIG. 35 is a diagram illustrating state table1 in mem1 after reception of reply data from the Slave SerDes to the Random Write Command in the Bulk I2C mode.

FIG. 38 is a diagram illustrating saved data in mem1 before the storage area for the Random Write Command is released in the Bulk I2C mode.

FIG. 43 is a diagram illustrating saved data of table1 in mem1 at the time of the Random Read operation in the Bulk I2C mode.

FIG. 45 is a diagram illustrating saved data of table3 in mem2 at the time of the Random Read operation in the Bulk I2C mode.

FIG. 47 is a diagram illustrating saved data of table3 in mem2 after the Random Read operation in the Bulk I2C mode.

FIG. 50 is a diagram illustrating an example of data in mem1 after reception of reply data from the Slave SerDes to the Random Read Command in the Bulk I2C mode.

FIG. 52 is a diagram illustrating an example of saved data of table1 in mem1 before a storage area for the Random Read Command is released in the Bulk I2C mode.

FIG. 54 is a diagram illustrating an example of saved data in table3 in mem2 in the case of performing the Random Read Command in the Bulk I2C mode.

FIG. 57 is a diagram illustrating saved data of table3 in mem2 when the Slave SerDes transmits an error command format in the Bulk I2C mode.

FIG. 58 is a diagram illustrating saved data of table1 in mem1 when the Master SerDes receives an error command format in the Bulk I2C mode.

FIG. 60 is a diagram illustrating saved data of table1 in mem1 included in node1 in the Read error case 2.

FIG. 61 is a diagram illustrating saved data of table1 in mem1 included in node1 in a Write error case.

MODE FOR CARRYING OUT THE INVENTION

Hereinafter, embodiments of a communication device and a communication system 3 will be described with reference to the drawings. Hereinafter, principal components of the communication device and the communication system 3 will be mainly described below, but the communication device and the communication system 3 may include configuration parts and functions that are not illustrated or described. The following description does not exclude components or functions not illustrated or described.

Figure 1:
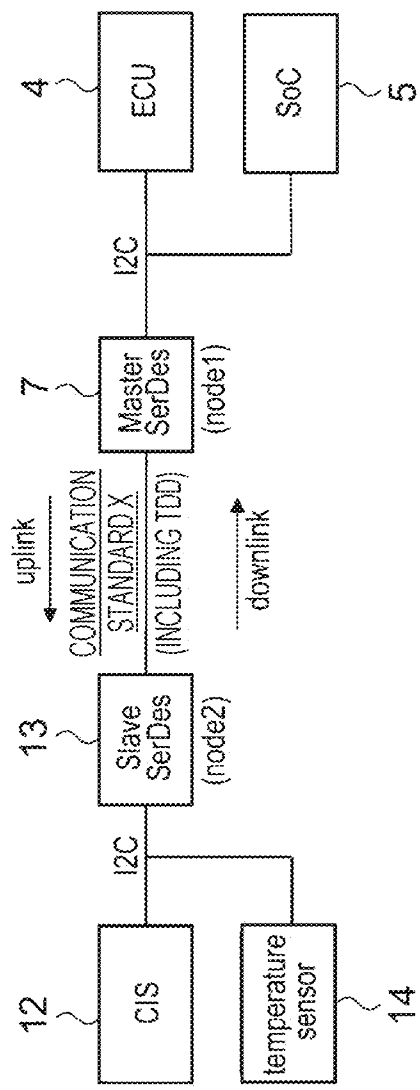
FIG. 1 is a block diagram illustrating a schematic configuration of a communication system including a communication device according to an embodiment.
Figure 2:
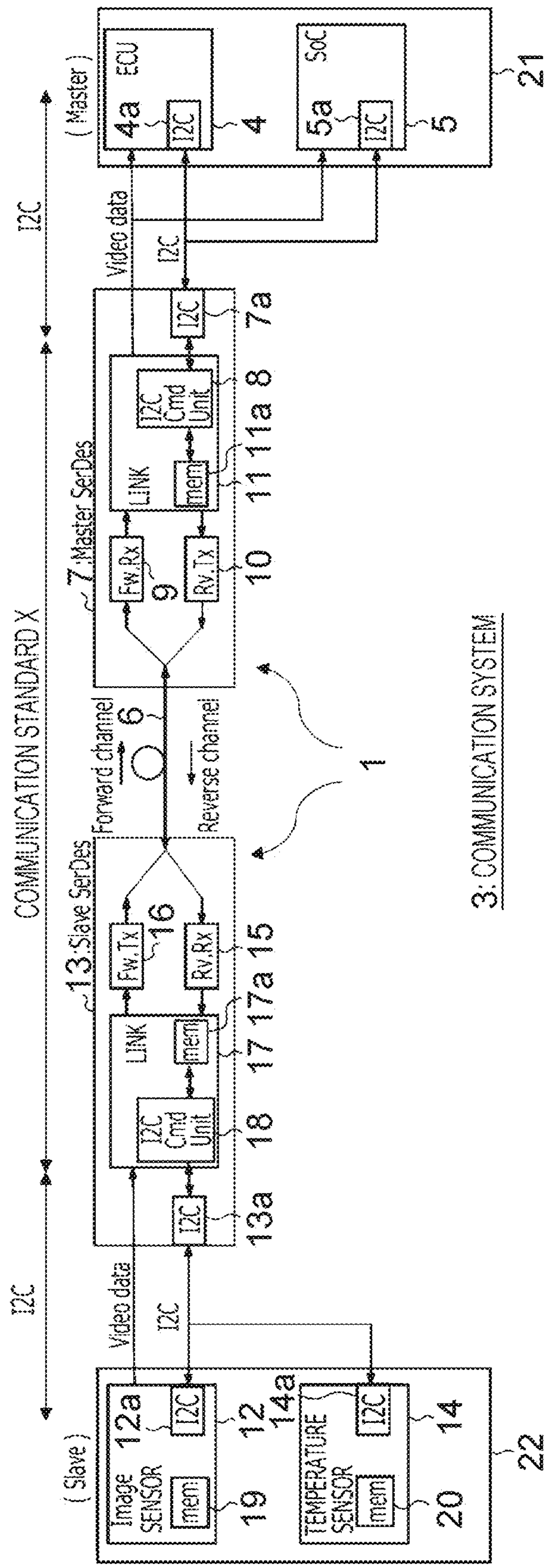
FIG. 2 is a block diagram of a further embodied communication system of the communication system of FIG. 1.

FIG. 1 is a block diagram illustrating a schematic configuration of a communication system including a communication device according to an embodiment, and FIG. 2 is a block diagram of a further embodied communication system of the communication system of FIG. 1. The communication system in FIGS. 1 and 2 is, for example, a camera video recognition system that is a part of an advanced driver assistance system (ADAS).

The communication device in FIGS. 1 and 2 includes an ECU 4 and an SoC 5 that can operate as a Master 21, an image sensor 12 and a temperature sensor 14 that can operate as a Slave 22, a Master SerDes 7, and a Slave SerDes 13.

The Master SerDes 7 and the Slave SerDes 13 are communicably connected to each other according to a predetermined communication standard (hereinafter referred to as a "communication standard X"). Examples of the predetermined communication standard X include, but are not limited to, FPD-Link III, A-phy, ASA, and the like. Each of the Master SerDes 7 and the Slave SerDes 13 corresponds to a communication device according to the present embodiment. In the present specification, the Master SerDes 7 may be referred to as a SerDes 1, and the Slave SerDes 13 may be referred to as a SerDes 2.

The Master 21 and the Master SerDes 7 are communicably connected to each other by, for example, inter-integrated circuit (I2C) communication. Note that the communication between the Master 21 and the Master SerDes 7 is not limited to the I2C communication, and may be communication using general purpose input/output (GPIO), for example.

Similarly, the Slave 22 and the Slave SerDes 13 are communicably connected to each other by, for example, the I2C communication. Note that the communication between the Slave 22 and the Slave SerDes 13 is not limited to the I2C communication, and may be communication using GPIO, for example.

In FIGS. 1 and 2, a signal path on a transmission path 6 through which information is serially transmitted from the Slave SerDes 13 to the Master SerDes 7 is referred to as a downlink or a forward channel, and a signal path on the transmission path 6 through which information is serially transmitted from the Master SerDes 7 to the Slave SerDes 13 is referred to as an uplink or a reverse channel.

The ECU 4 controls the entire communication system 3 and includes an I2C 4*a*. The ECU 4 receives an image signal from the Master SerDes 7 and performs the I2C communication with the Master SerDes 7 via the I2C 4*a*.

The SoC 5 performs, for example, image recognition and video processing, and includes an I2C 5*a*. The SoC 5 receives an image signal from the Master SerDes 7 and performs the I2C communication with the Master SerDes 7 via the I2C 5*a*.

The image sensor 12 captures an image, and includes an I2C 12*a* and a mem 19. The image sensor 12 outputs image data of the captured image to the Slave SerDes 13, and performs the I2C communication with the Slave SerDes 13 via the I2C 12*a*. In the present specification, the image sensor 12 may be referred to as a CMOS image sensor (CIS). The mem 19 can store pixel data captured by the image sensor 12, and can store data transmitted from the Master 21. In the present specification, the mem 19 may be referred to as a mem3.

The temperature sensor 14 measures a temperature of an arbitrary object (for example, the image sensor 12), and includes an I2C 14*a*. The temperature sensor 14 performs the I2C communication with the Slave SerDes 13 via the I2C 14*a*, and transmits temperature data and the like regarding the measured temperature to the Slave SerDes 13.

The Master SerDes 7 converts a format of a signal of an I2C protocol received from the Master 21 into a signal of a communication standard X protocol and transmits the signal to the Slave SerDes 13, and appropriately converts the format of the signal of the communication standard X protocol received from the Slave SerDes 13 to generate image data and an I2C protocol signal, and outputs the image data and the signal to the Master 21. The Master SerDes 7 includes a LINK 11, a forward receiver (Fw. Rx) 9, a reverse transmitter (Rv. Tx) 10, and an I2C 7*a*.

The LINK 11 converts the format of the signal of the I2C protocol received from the Master 21 via the I2C 7*a* into a signal of the communication standard X protocol, and transmits the signal to the Slave SerDes 13 via the Rv.Tx 10. Furthermore, the LINK 11 generates image data from the signal of the communication standard X protocol received from the Slave SerDes 13 via the Fw. Rx 9 and transmits the image data to the Master 21, or generates a signal of the I2C protocol including information other than the image data and outputs the signal to the Master 21 via the I2C 7*a*.

The Slave SerDes 13 converts the format of the signal of the I2C protocol and the image signal received from the Slave 22 into a signal of the communication standard X protocol and transmits the signal to the Master SerDes 7, and appropriately converts the format of the signal of the communication standard X protocol received from the Master SerDes 7 into a signal of the I2C protocol and outputs the signal to the Slave 22. The Slave SerDes 13 includes an I2C 13*a*, a LINK 17, a forward transmitter (Fw. Tx) 16, a reverse receiver (Rv. Rx) 15, and an I2C 13*a*.

The LINK 17 converts the format of the signal of the I2C protocol signal and the image data received from the Slave 22 via the I2C 13*a* into a signal of the communication standard X protocol, and transmits the signal to the Master SerDes 7 via Fw. Tx 16. Furthermore, the LINK 17 converts the signal of the communication standard X protocol received from the Master SerDes 7 via the Rv. Rx 15 into a signal of the I2C standard, and transmits the signal to the Slave 22 via the I2C 13*a*. At this time, the following problems 1) and 2) may occur.

1) In a case where the ECU 4 or the SoC 5 configuring the Master 21 controls the image sensor 12 or the temperature sensor 14 configuring the Slave 22 using the I2C communication, the Master 21 needs to receive an ACK signal or a NACK signal from the Slave 22 every time transmitting an information unit such as 1 byte. At this time, a propagation delay of the I2C communication via the Master SerDes 7 and the Slave SerDes 13 may be generally larger than a cycle of one clock of the I2C communication (a frequency of one clock is 400 kHz, 1 MHz, or the like). In this case, the Master SerDes 7 retains a clock (SCL) of the I2C protocol signal to a Low level until the ACK signal or the NACK signal from the Slave 22 is received from the Slave SerDes 13, the I2C protocol conversion is completed, and preparation for an output of the ACK signal or the NACK signal to the Master 21 via the I2C 7*a* becomes ready. After preparation of an output the ACK signal or the NACK signal transmitted by the Slave 22 to the Master 21 becomes ready, the Master SerDes 7 releases the Low level of the retained clock (SCL) of the I2C protocol signal. As a result, the Master 21 can restart the I2C communication, and can receive the ACK signal or the NACK signal. In the period in which the Master SerDes 7 retains the SCL at the Low level, the Master 21 cannot perform the I2C communication, which causes a problem that it takes time to transfer a command or communication with another Slave 22 connected to an I2C bus (for example, the temperature sensor 14 when waiting for the ACK signal or the NACK signal from the image sensor 12) cannot be performed.

Figure 3:
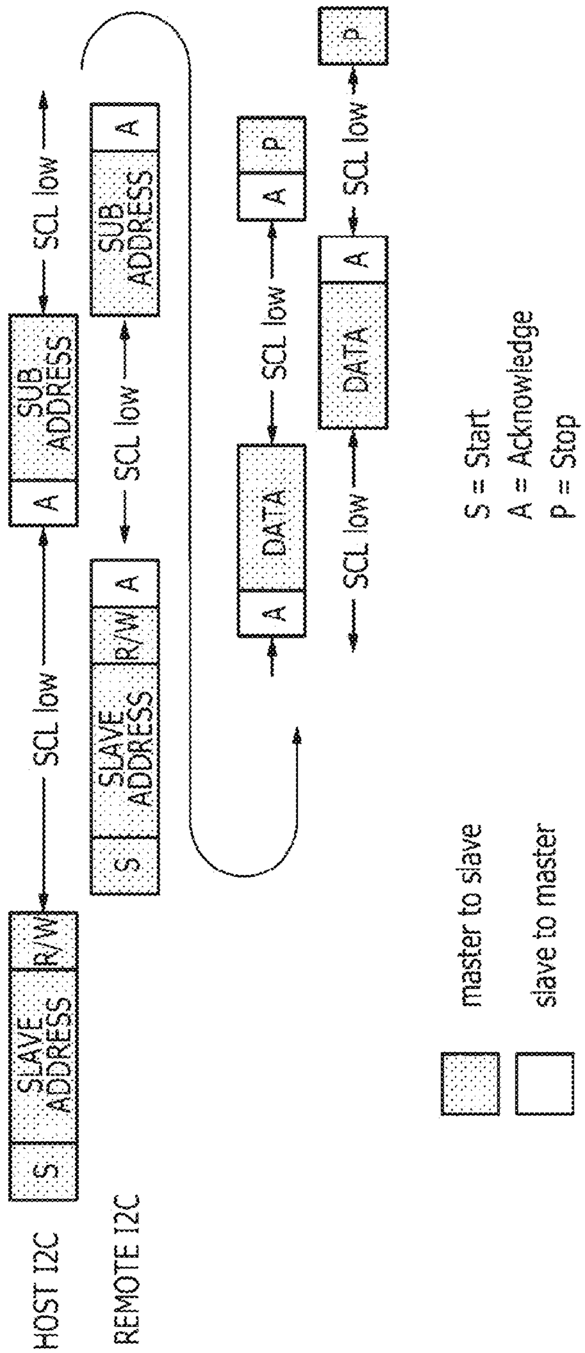
FIG. 3 is a diagram illustrating a write format of a packet in a case where write is performed by I2C communication between a Master and a Slave via a general SerDes device.

FIG. 3 illustrates I2C communication in a case where write is performed by the I2C communication from HOST I2C (for example, the Master 21) to REMOTE I2C (for example, the Slave 22) via the Master SerDes 7 and the Slave SerDes 13. Here, an SCL low section of the HOST I2C indicates that the Master SerDes 7 retains the SCL at a low level until preparation for the output the ACK signal or the NACK signal from the Slave 22 becomes ready, and indicates that the HOST I2C cannot perform the I2C communication during this period.

2) Furthermore, it is favorable to allow various devices other than the image sensor 12 and the temperature sensor 14 to be connected to the Slave SerDes 13 as the Slaves 22. Each of these various Slaves 22 may have a possibility of having different I2C operation clocks. Therefore, the Slave SerDes 13 is assumed to perform the I2C communication with the various Slaves 22, and the I2C operation clock of the Slave 22 (an operation clock of the I2C communication between the Slave 22 and the Slave SerDes 13) may be set to be lower than necessary.

In FIG. 3, in a case where the I2C operation clock frequency of the Slave 22 is set to be lower than necessary as described above, the case means that an I2C operation section of the REMOTE I2C (sections other than SCL low on the REMOTE I2C side in FIG. 3) becomes long, which, in combination with a problem that the SCLLow section on the HOST I2C side becomes long, further increases the time required for completing the I2C communication.

To solve the above-described 1), the communication system 3 in FIGS. 1 and 2 provides a storage device (a mem 11*a* in FIG. 1) in the Master SerDes 7, and when the Master SerDes 7 receives 1 byte from the Master 21, the communication system 3 stores the 1 byte in the storage device, and returns the ACK signal or the NACK signal to the Master 21 instead of the Slave 22. Therefore, the Master 21 can shorten the SCL low period that extends.

Furthermore, to solve the above-described 2), in the communication system 3 in FIG. 1, the Master 21 sets CLK_value (Data [0]) to be described below, and the Slave SerDes 13 performs the I2C communication with the Slave 22 at the frequency designated by CLK_value (Data [0]). Therefore, the Slave 22 and the Slave SerDes 13 can implement the I2C communication at the designated frequency.

The LINK 11 of FIG. 2 includes an I2C Cmd Unit 8 and a mem 11*a*. The I2C Cmd Unit 8 stores table2 in a ROM (not illustrated), and the mem 11*a* stores table1. The mem 11*a* is a volatile memory. In the present specification, the mem 11*a* may be referred to as mem1. Each time the LINK 11 receives 1 byte from the Master 21 via the I2C 7*a*, the LINK 11 writes the 1 byte to the table1 of the mem 11*a*, returns the ACK signal or the NACK signal to the Master 21 instead of the Slave 22, reads the table1 and transmits the table1 to the Slave SerDes 13 via the Rv.Tx 10 when a predetermined condition is satisfied (for example, when data is written to End of data). Furthermore, the LINK 11 writes the signal received from the Slave SerDes 13 via Fw.Rx into the table1 of the mem 11*a*, and reads the table1 and performs the I2C communication with the Master 21 via the I2C 7*a* and simultaneously transmits the image data captured by the image sensor 12 received from the Slave SerDes 13 via the Fw. Rx 9 to the Master 21 when a predetermined condition is satisfied (for example, when data is written to End of data).

The LINK 17 of FIG. 2 includes an I2C Cmd Unit 18 and a mem 17*a*. The I2C Cmd Unit 18 stores table2 in a ROM (not illustrated), and the mem 17*a* stores table3. In the present specification, the mem 17*a* may be referred to as mem2. The LINK 17 writes the signal received from the Master SerDes 7 via the Rv.Rx 15 to the table3 of the mem 17*a*, and reads the table3 and transmits the table3 to the Slave 22 via the I2C 13*a* when a predetermined condition is satisfied (for example, data is written to End of data). Furthermore, when performing the I2C communication with the Slave 22 via the I2C 13*a* and receiving a signal, or when receiving the temperature data converted into the I2C protocol from the temperature sensor 14 via the I2C 13*a*, the LINK 17 writes the received data into the table3 of the mem 17*a*, and reads the table3 and transmits the table3 to the Master SerDes 7 via the Fw.Tx 16 when a predetermined condition is satisfied (for example, the data is written to End of data).

Figure 4:
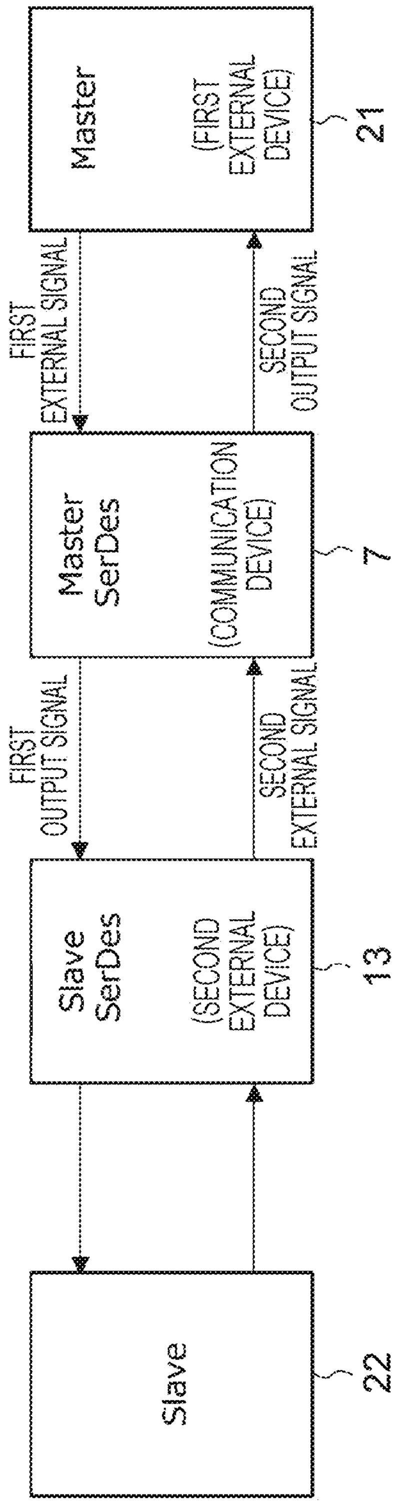
FIG. 4 is an equivalent block diagram when a Master SerDes performs I2C communication between the Master and a Slave SerDes.

FIG. 4 is an equivalent block diagram when the Master SerDes 7 performs the I2C communication between the Master 21 and the Slave SerDes 13 in the communication system 3 of FIGS. 1 and 2. In FIG. 4, it is assumed that the Master SerDes 7 is a communication device, the Master 21 is a first external device, and the Slave SerDes 13 is a second external device.

The communication device (Master SerDes 7) in FIG. 4 generates a first output signal on the basis of a first external signal from the first external device (Master 21) and outputs the first output signal to the second external device (Slave SerDes 13). Furthermore, the communication device (Master SerDes 7) generates a second output signal on the basis of a second external signal from the second external device (Slave SerDes 13) and outputs the second output signal to the first external device (Master 21).

Figure 5:
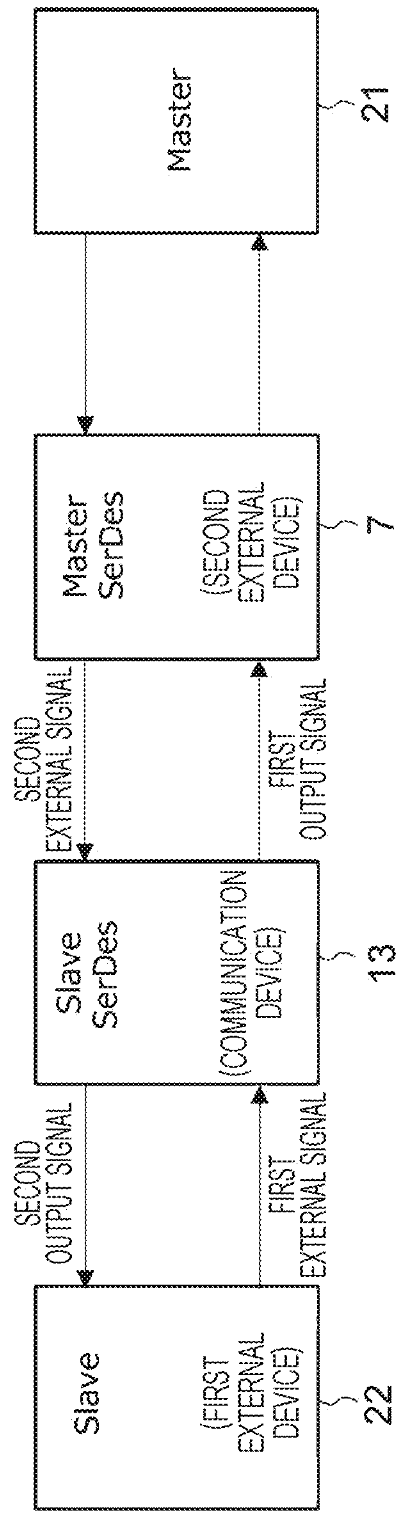
FIG. 5 is an equivalent block diagram when the Slave SerDes performs I2C communication between the Slave and the Master SerDes.

FIG. 5 is an equivalent block diagram when the Slave SerDes 13 performs the I2C communication between the Slave 22 and the Master SerDes 7 in the communication system 3 of FIGS. 1 and 2. In FIG. 5, it is assumed that the Slave SerDes 13 is the communication device, the Slave 22 is the first external device, and the Master SerDes 7 is the second external device.

The communication device (Slave SerDes 13) in FIG. generates the first output signal on the basis of the first external signal from the first external device (Slave 22) and outputs the first output signal to the second external device (Master SerDes 7). Furthermore, the communication device (Slave SerDes 13) generates the second output signal on the basis of the second external signal from the second external device (Master SerDes 7) and outputs the second output signal to the first external device (Slave 22).

Each of the first output signal and the second external signal in FIGS. 4 and 5 includes command information Cmd_mode indicating content of a command transmitted from the first external device, final destination device identification information Slave_Adr for identifying a final destination device of data transmitted from the first external device, internal address information Sub_Adr of the final destination device, data length information Length of the data transmitted from the first external device, and data end position information End of Data transmitted from the first external device.

Slave_Adr may be arranged next to Cmd_mode, Sub_Adr may be arranged next to Slave_Adr, and Length may be arranged next to Sub_Adr.

Cmd_mode may include command format information Cmd_mode [2:0] that defines a command format on the communication standard X including a function to identify a Write command and a Read command. That is, Cmd_mode may include Cmd_mode [2:0] that defines a command format on a predetermined communication standard between the communication device and the second external device.

The Cmd_mode may include at least Cmd_mode [0]-Cmd_mode [7], and data end determination condition information Cmd_mode [7] may specify a condition for end determination of data transmitted from the first external device.

Each of the first output signal and the second external signal may further include communication frequency information CLK_value that specifies a communication frequency between the second external device and the final destination device.

The first output signal and the second external signal may include a command obtained by converting the protocol of a command of the inter-integrated circuit (I2C) communication into a predetermined communication standard between the communication device and the second external device.

The LINK 11 or 17 may transmit the ACK signal indicating an acknowledgement or the NACK signal indicating a negative acknowledgement to the first external device each time receiving each information unit constituting the first external signal from the first external device.

The LINK 11 or 17 includes a storage unit that stores a signal corresponding to the first external signal and a signal corresponding to the second external signal.

The LINK 11 or 17 may generate the first output signal after collectively performing protocol conversion for the first external signals received and stored in the storage unit when reception of the first external signals from the first external device is completed.

The protocol conversion by the LINK 11 or 17 may be protocol conversion compatible with time division duplex (TDD).

When the LINK 11 or 17 transmits the first output signal to the second external device and receives information indicating that the processing for the first output signal is completed from the second external device, the LINK may store a signal indicating processing completion in the storage unit.

The LINK 11 or 17 may release a storage area of the storage unit on the basis of a command from the first external device.

The LINK 11 or 17 may output processing completion information for the second external signal transmitted from the second external device to the first external device in response to a request signal from the first external device, or may output an interrupt request flag for performing interrupt processing for the first external device to the first external device.

The LINK 11 or 17 may receive the first external signal including output instruction information cmd_done instructing output of the first output signal and transmission end information P (STOP condition) indicating transmission end of the first external signal from the first external device.

In a case where a first value is received as the data end determination condition information specifying the condition for end determination of data transmitted from the first external device, the LINK 11 or 17 may recognize that the first external signal transmitted from the first external device has ended when transmission end information P (STOP condition) indicating transmission end of the first external signal is received.

In a case where a second value is received as the data end determination condition information specifying the condition for end determination of data transmitted from the first external device, the LINK 11 or 17 may recognize that the first external signal transmitted from the first external device has ended when the output instruction information instructing output of the first output signal and the transmission end information indicating transmission end of the first external signal are received regardless of the value of the data end determination condition information received thereafter.

The LINK 11 or 17 may release the storage area of the storage unit after transmitting the first output signal to the second external device.

The LINK 11 or 17 may perform at least one of outputting a signal obtained after performing the protocol conversion for the second output signal for the signal based on the second external signal stored in the storage unit to the first external device for each information unit, or receiving each information unit constituting the first external signal output from the first external device, a predetermined number of times or within a predetermined time.

Figure 6:
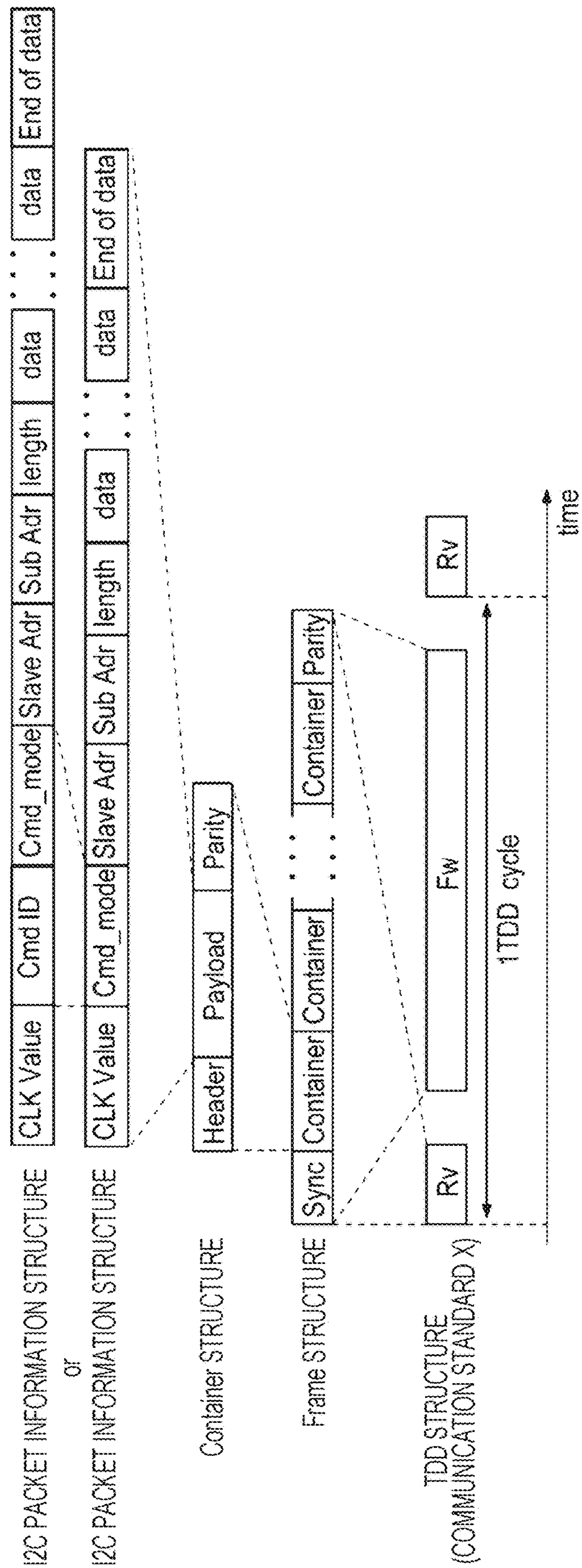
FIG. 6 is a diagram illustrating an example of a frame structure of a signal according to a communication standard X protocol.

FIG. 6 is a diagram illustrating an example of a frame structure of the signal of the communication standard X protocol transmitted and received between the Master SerDes 7 and the Slave SerDes 13.

The frame structure of FIG. 6 includes a plurality of containers between a Sync pattern and a Parity. The Sync pattern is a signal pattern for synchronizing physical layers of the Master SerDes 7 and the Slave SerDes 13. The plurality of containers includes, for example, about two to one hundred containers. The number of containers included in the frame structure changes depending on a signal transmission state. The Parity is a bit or a bit string for error detection or error correction processing.

The structure of the container includes a Header, a Payload, and a Parity. The Header includes address information indicating a transmission destination of the Payload, and the like. The Payload is a main part of a signal to be transmitted and received. The Payload includes operations, administration, maintenance (OAM) for SerDes control in addition to a video signal. The Parity is a bit or a bit string for Payload error detection or error correction processing.

The Palyload includes information of CLK value, Cmd_mode, Slave Adr, length, data, and End of data. The CLK value is an operation clock of the Slave 22, that is, an SCL frequency used by the Slave SerDes 13 in the I2C communication with the Slave 22. Cmd_mode indicates content of a command transmitted from the Master 21. Slave Adr is address information for identifying the Slave 22. length is a length of data transmitted from the Master 21. End of data is an end position of data transmitted from the Master 21.

Note that, in a case where Cmd_mode is extended to two bytes, an upper one byte of Cmd_mode may be allocated to Cmd_ID. Cmd_ID is identification information for distinguishing and identifying a command transmitted from the Master 21.

In a case where data communication is performed between the Master 21 and the Slave 22 by the TDD scheme, a signal ratio of a signal Rv from the Master 21 to the Slave 22 and a signal ratio of a signal Fw from the Slave 22 to the Master 21 within one TDD cycle can be changed by changing the number of containers included in each frame structure. Note that the signal Rv and the signal Fw may have the same or different container sizes.

In the communication system according to the present embodiment, the I2C communication is performed between the Master 21 and the Master SerDes 7, and the I2C communication is also performed between the Slave SerDes 13 and the Slave 22. In the I2C communication, it is possible to select either a first mode (also referred to as Byte I2C mode) of receiving the ACK signal/NAK signal each time transmitting information of a predetermined number of bytes (for example, one byte or two bytes in a case of not transmitting an error correction code, or two bytes or three bytes in a case of transmitting the error correction code), or a second mode (Bulk I2C mode) of receiving the ACK signal/NAK signal each time transmitting bulk information that is a bulk of information of a plurality of bytes.

Figure 8:
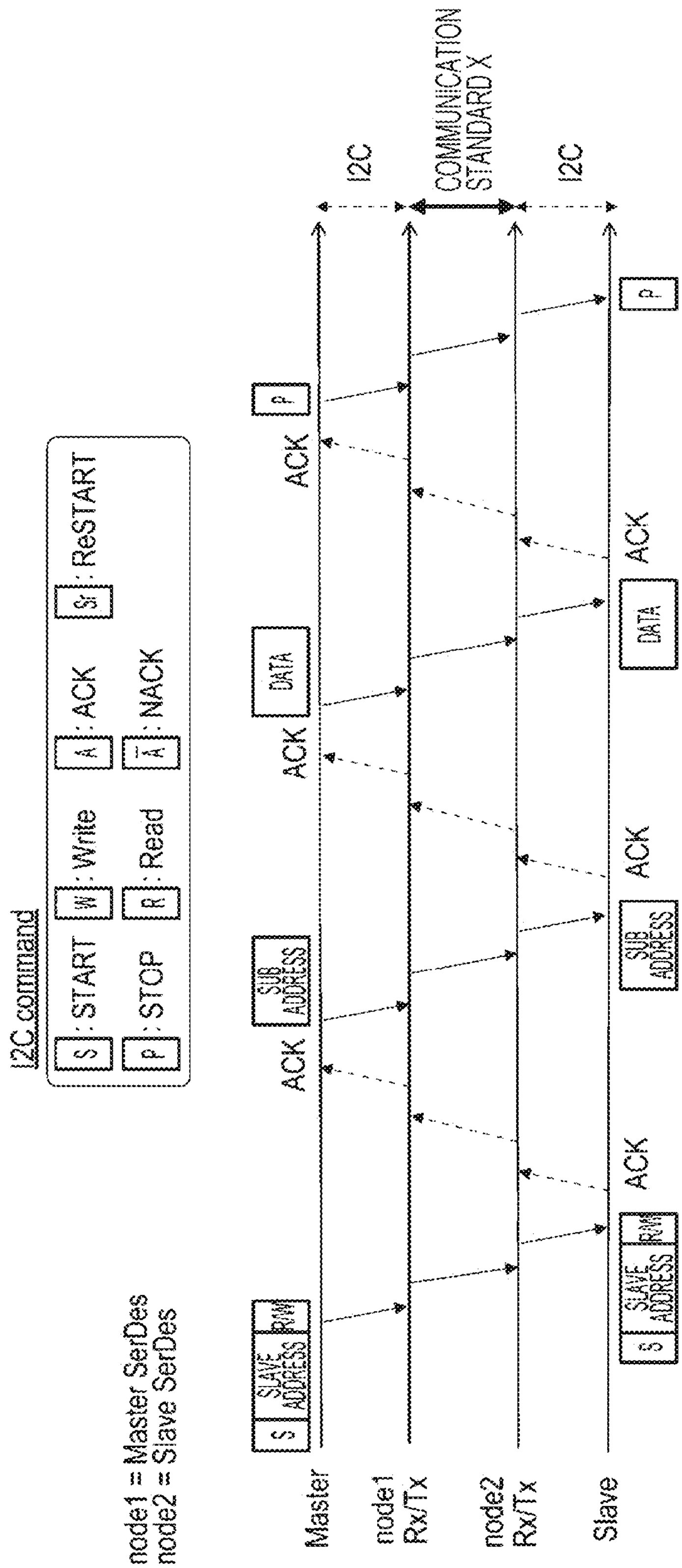
FIG. 8 is a timing chart of performing I2C communication by an FDD scheme between the Master and the Slave.

Meanwhile, in a case where the I2C communication is performed between the Master SerDes 7 and the Slave SerDes 13 by a frequency division duplexing (FDD) scheme, to transmit information to the Slave 22 as a final destination from the Master 21, the operation of receiving the ACK/NACK signal is repeated each time 1-byte data is transmitted, as illustrated in the timing chart of FIG. 8. In the FDD scheme, unlike the TDD scheme, it is not necessary to switch the uplink and the downlink, and information can be transmitted from the Master 21 to the Slave 22 or from the Slave 22 to the Master 21 at arbitrary timing.

Figure 9A:
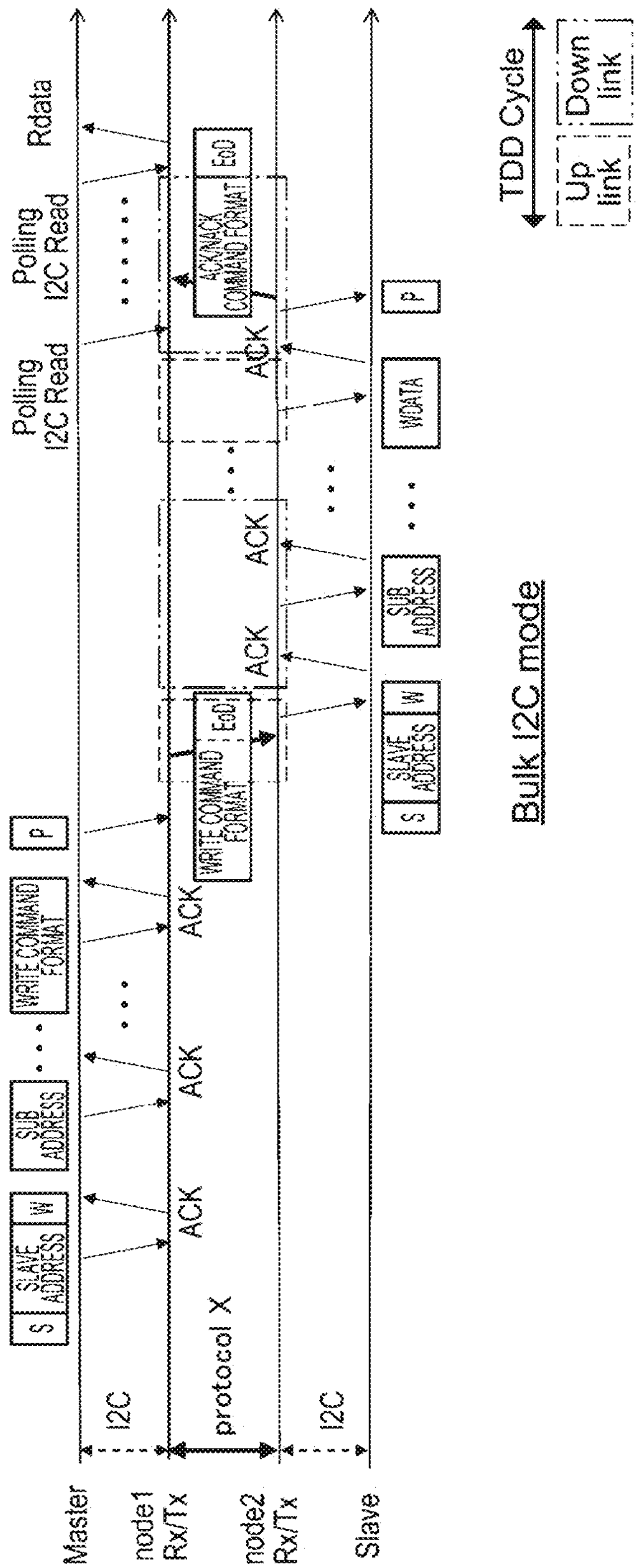
FIG. 9A is a timing chart of a Bulk I2C mode in a TDD scheme.
Figure 9B:
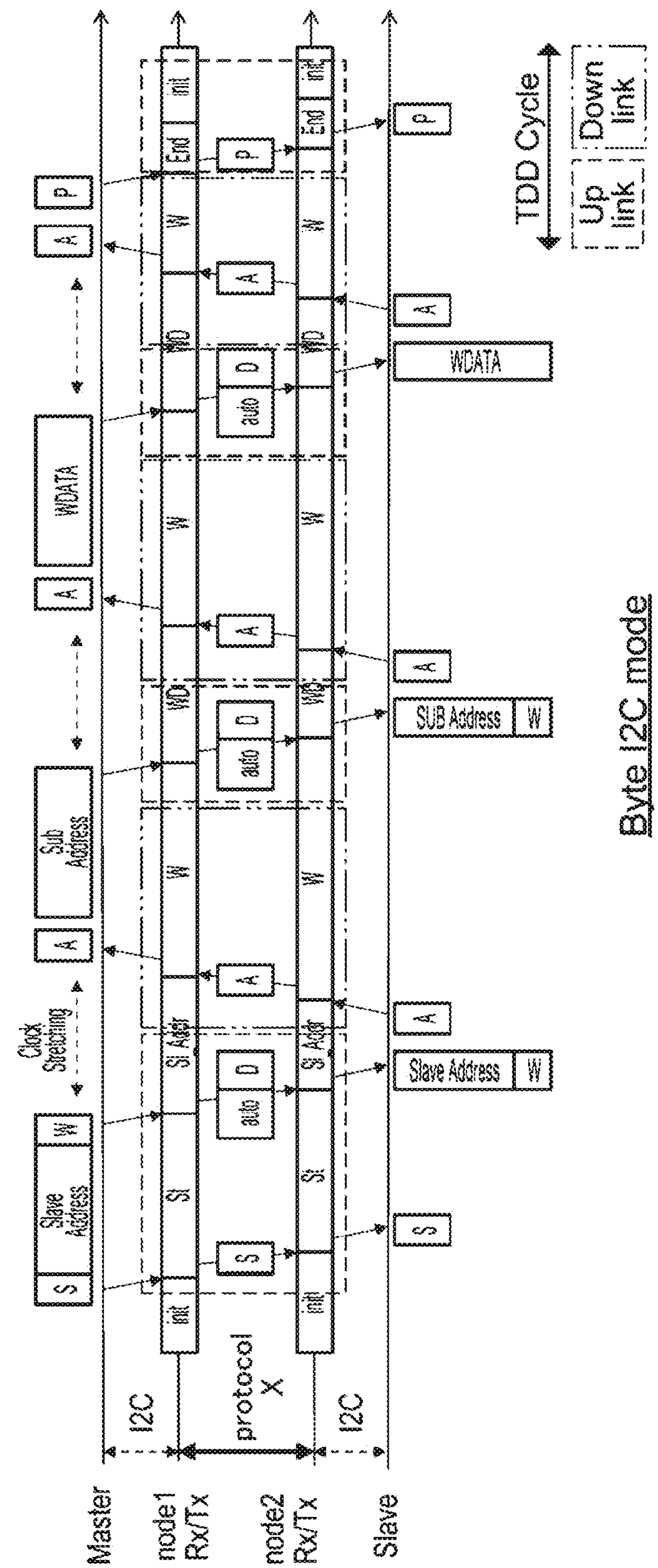
FIG. 9B is a timing chart of a Byte I2C mode in the TDD scheme.

FIG. 9A is a timing chart of the Bulk I2C mode in the TDD scheme, and FIG. 9B is a timing chart of the Byte I2C mode in the TDD scheme. In the Bulk I2C mode, the Master SerDes 7 transmits a signal including the ACK signal or the NACK signal to the Master 21 each time receiving a signal of a plurality of bytes transmitted from the Master 21 byte by byte as illustrated in FIG. 9A. Next, after completing conversion of the signals of the plurality of bytes received from the Master 21, the Master SerDes 7 collectively transmits the converted signals to the Slave SerDes 13. Here, as a specific conversion method, there are a case of sequentially performing the conversion from the I2C protocol to the communication protocol X each time the Master SerDes 7 receives 1-byte data from the Master 21, and a case of collectively performing the conversion from the I2C protocol to the communication protocol X after receiving all the data of the plurality of bytes from the Master 21. Thereafter, the Master SerDes 7 receives and retains the signal of the communication protocol X (first communication standard) including the ACK signal or the NACK signal from the Slave SerDes 13. Thereafter, the Master SerDes 7 converts the signal of the communication protocol X into a signal of the I2C protocol (second communication standard) and transmits the signal to the Master 21 in response to a readout request from the Master 21.

Note that the signal transmitted to the Slave SerDes 13 includes command information indicating content transmitted from the Master 21, and the signal transmitted to the Master 21 includes information transmitted from the Slave SerDes 13.

Furthermore, in the Bulk I2C mode, as illustrated in FIG. 9A, when receiving a signal of a plurality of bytes of the communication protocol X transmitted from the Master SerDes 7, the Slave SerDes 13 converts the received signal into a signal of the I2C protocol and transmits the converted signal to the Slave 22 byte by byte. Each time the converted signal is transmitted to the Slave 22 byte by byte, signals of the I2C protocol including the ACK signal or the NACK signal from the Slave 22 are received and retained. After the transmission of the signal from the Master SerDes 7 to the Slave 22 is completed, a signal of the communication protocol X corresponding to the retained signal is transmitted to the Master SerDes 7.

Meanwhile, in the Byte I2C mode, as illustrated in FIG. 9B, the Master SerDes 7 converts a 1-byte signal transmitted from the Master 21 into a signal of the first communication standard in units of the 1-byte signal and transmits the converted signal to the Slave SerDes 13, then receives a signal of the first communication standard including the ACK signal indicating an acknowledgement or then NACK signal indicating a negative acknowledgement transmitted from the Slave SerDes 13, and converts the received signal into a signal of the second communication standard and transmits the signal to the Master 21.

Furthermore, in the Byte I2C mode, as illustrated in FIG. 9B, when receiving a signal of the first communication standard transmitted from the Master SerDes 7, the Slave SerDes 13 converts the received signal into a signal of the second communication standard in units of the received signal and transmits the converted signal to the Slave 22, then receives a signal of the second communication standard including the ACK signal indicating an acknowledgement or the NACK signal indicating a negative acknowledgement transmitted from the Slave 22, and converts the received signal into a signal of the first communication standard and transmits the signal to the Master SerDes 7.

The information of Cmd_mode in the frame structure illustrated in FIG. 6 is different between the Bulk I2C mode and the Byte I2C mode. In the present specification, Cmd_mode may be referred to as command information. Cmd_mode is, for example, 1-byte information, and information of each bit is different between the Bulk I2C mode and the Byte I2C mode.

FIG. 10A is a diagram illustrating an example of cmd_mode in the Bulk I2C mode. Bit [7] of cmd_mode in FIG. 10A is above-described selection of mode, and indicates the Byte I2C mode in the case of 1 and indicates the Bulk I2C mode in the case of 0. Bit [6] is a bit designating whether or not to perform retry at the time of receiving the NACK signal in the Slave-side I2C communication, and 1 indicates retry and 0 indicates no retry. Bit [5] is a bit indicating an operation of the Slave SerDes 13 when the Slave SerDes 13 receives the NACK signal during the access to the Slave 22. 1 indicates continuing outputting RAW data for write in a case of write by performing processing ignoring NACK, and 0 indicates to perform normal processing. Bit [4] indicates a batch transmission mode of an I2C command. 1 indicates End of data and to perform transmission at the time of cmd_doen. 0 indicates that end determination is made for each End of data and transmission is performed. Bit [3] is selection of an I2C address mode on the Slave side. 1 indicates an address of a current location without an offset address, and 0 indicates the address of the current location with the offset address. Bit [2:0] is an I2C format type of the communication standard X. 111 indicates an error command format, 110 indicates a special command format, 10X indicates a reserve, 011 indicates a Read response format, 010 indicates an AC/NACK format, 001 indicates a Read command format, and 000 indicates a Write command format.

FIG. 10B is a diagram illustrating an example of cmd_mode in the Byte I2C mode. Bit [7] of cmd_mode in FIG. 10B is the same as the bit [7] in FIG. 10A, and may be referred to as first information in the present specification. Bit [6:5] is selection of a clock mode, and may be referred to as second information in the present specification. The clock mode includes a mode in which node2 automatically generates a clock signal and a mode in which node1 calculates and provides notification of the number of cycles 9/8/1 of the used clock CLK of the node2 instead of the node2, where the Master SerDes 7 is the node1 and the Slave SerDes 13 is the node2. 11 indicates that the node2 generates nine clock signals including the ACK/NACK signal and data. 10 indicates that the node2 generates eight clock signals including data. 01 indicates that the node2 generates one clock signal including the ACK/NACK signal. 00 indicates that the node2 automatically generates 9/8/1 clock signals.

Bit [4:0] is an I2C packet type that defines packetized I2C data. The bit [4] is information instructing whether or not data is data for Write or Read or other data, and may be referred to as third information in the present specification. 1 of the bit [4] indicates that a Write/Read data packet follows next. 0 of the bit [4] indicates that the Write/Read data packet is not present. The bit [3] is information indicating whether or not the NACK signal has been received, and may be referred to as fourth information in the present specification. 1 of the bit [3] indicates that the NACK signal has been received from the Slave 22 or the Master 21, and 0 indicates that the NACK signal has not been received. The bit [2] is information indicating whether or not the ACK signal has been received, and may be referred to as fifth information in the present specification. 1 of the bit [2] indicates that the ACK signal has been received from the Slave 22 or the Master 21, and 0 indicates that the ACK signal has not been received. The bit [1] is information indicating whether or not a STOP command is included, and may be referred to as sixth information in the present specification. 1 of the bit [1] indicates that the STOP command has been detected, and 0 indicates that the STOP command has not been detected. The bit [0] is information indicating whether or not a START/ReSTART command is included, and may be referred to as seventh information in the present specification. 1 of the bit [0] indicates that the START/ReSTART command has been detected, and 0 indicates that the START/ReSTART command has not been detected.

cmd_mode illustrated in FIGS. 10A and 10B is an example, and what information is allocated to each bit of cmd_mode is arbitrary. Furthermore, cmd_mode may have a byte length of 2 bytes or more.

Figure 11A:
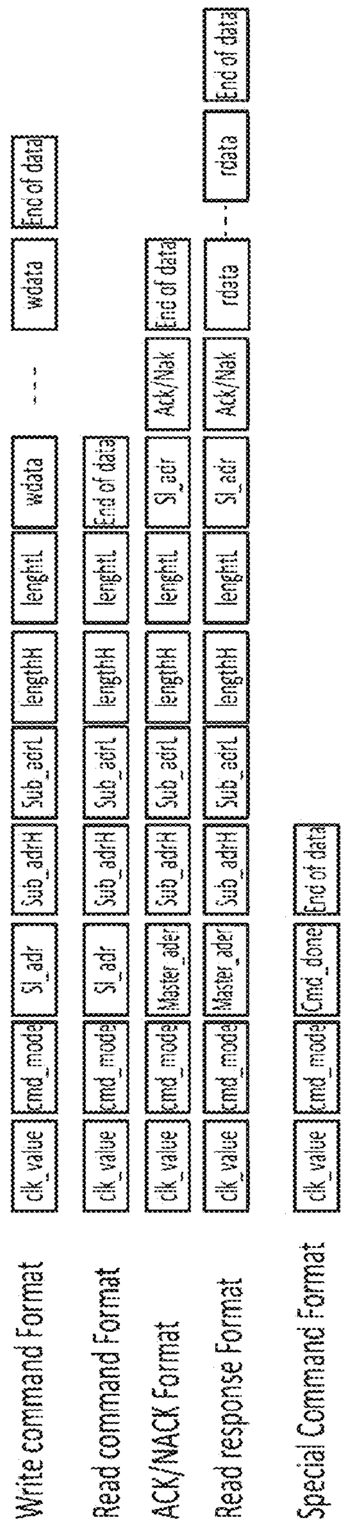
FIG. 11A is a diagram illustrating a first example of a command format to be transmitted and received in the I2C communication when the Bulk I2C mode is selected.

FIG. 11A is a diagram illustrating a first example of the command format to be transmitted and received in the I2C communication when the Bulk I2C mode is selected. As illustrated in FIG. 11A, when the Bulk I2C mode is selected, there are the Write command format, the Read command format, the ACK/NACK command format, the Read response format, and the special command format. The Write command format includes clk_value, cmd_mode, Sl_adr, Sub_adrH, Sub_adrL, lengthH, lengthL, WDATA, and End of data. The Read command format is the same as the Write command format except that WDATA is not included. The ACK/NACK command format includes clk_value, cmd_mode, Master_adr, Sub_adrH, Sub_adrL, lengthH, lengthL, Sl_adr, ACK/NACK, and End of data. The Read response format is obtained by adding RDATA to the ACK/NACK command format. The special command format includes clk_value, cmd_mode, Cmd_done, and End of data.

Figure 11B:
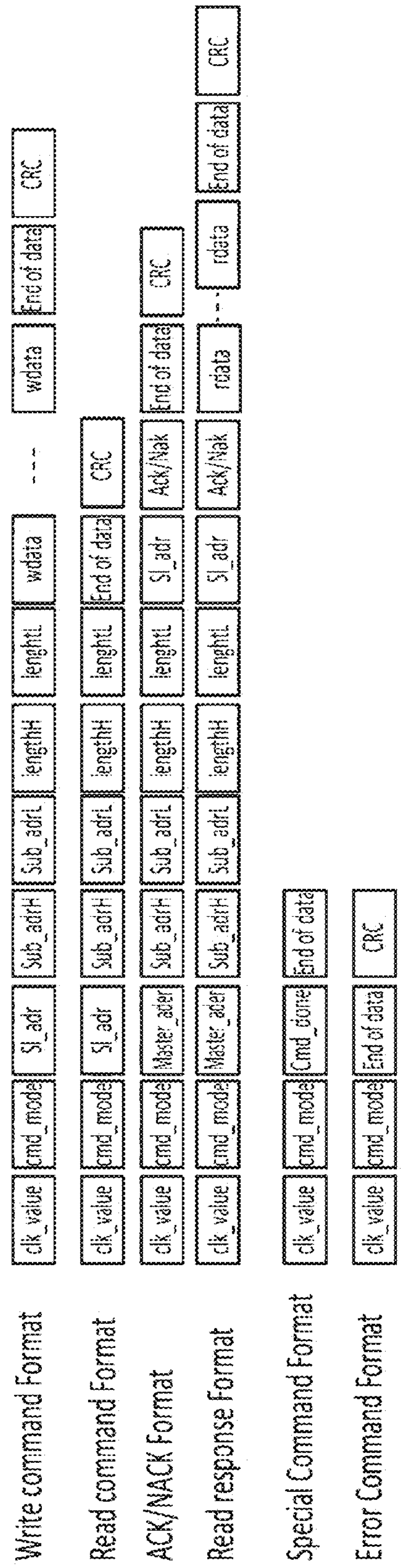
FIG. 11B is a diagram illustrating a second example of the command format to be transmitted and received in the I2C communication when the Bulk I2C mode is selected.

FIG. 11B is a diagram illustrating a second example of the command format to be transmitted and received in the I2C communication when the Bulk I2C mode is selected. In the second example illustrated in FIG. 11B, CRC that is an error correction code is added after End of Data at the end of each command format illustrated in FIG. 11A. Furthermore, in the second example of FIG. 11B, an error command format that does not exist in the first example of FIG. 11A is newly added. The error command format includes clk_value, cmd_mode, End of data, and CRC. The error command format will be described below.

Figure 11C:
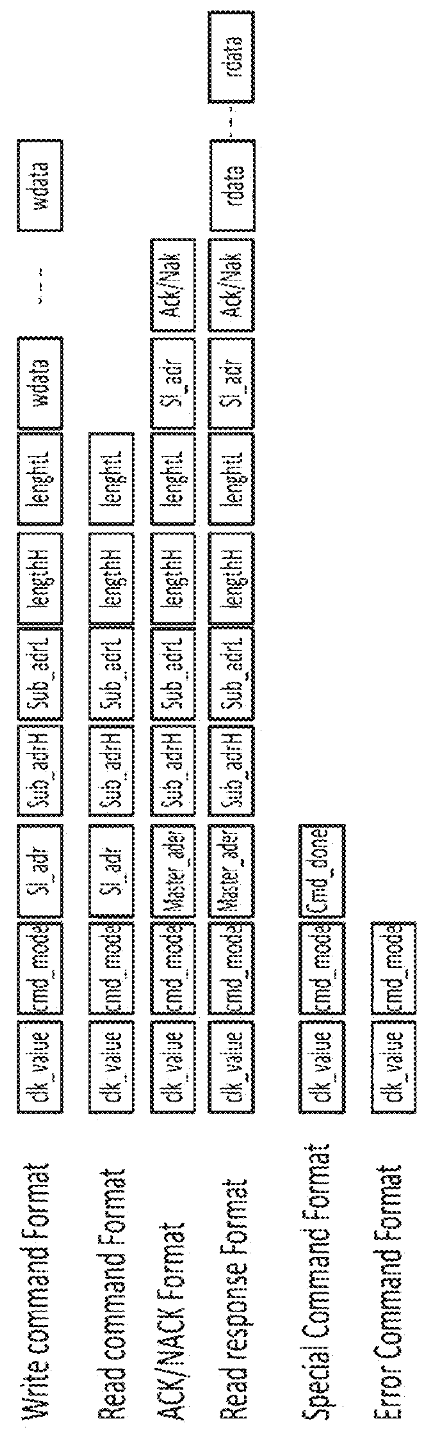
FIG. 11C is a diagram illustrating a third example of the command format to be transmitted and received in the I2C communication when the Bulk I2C mode is selected.

FIGS. 11A and 11B include End of Data (EoD) near the end of each command format, but the EoD can be omitted. FIG. 11C is a diagram illustrating a third example of the command format to be transmitted and received through the I2C communication when the Bulk I2C mode is selected, in which EoD is omitted from each format in FIG. 11A. Even if the information of EoD is used inside the Master SerDes 7 and the Slave SerDes 13, data end position can be calculated on the reception side from the information of cmd_mode, lengthH, and lengthL, even if there is no EoD in the communication format between the Master SerDes 7 and the Slave SerDes 22.

Figure 11D:
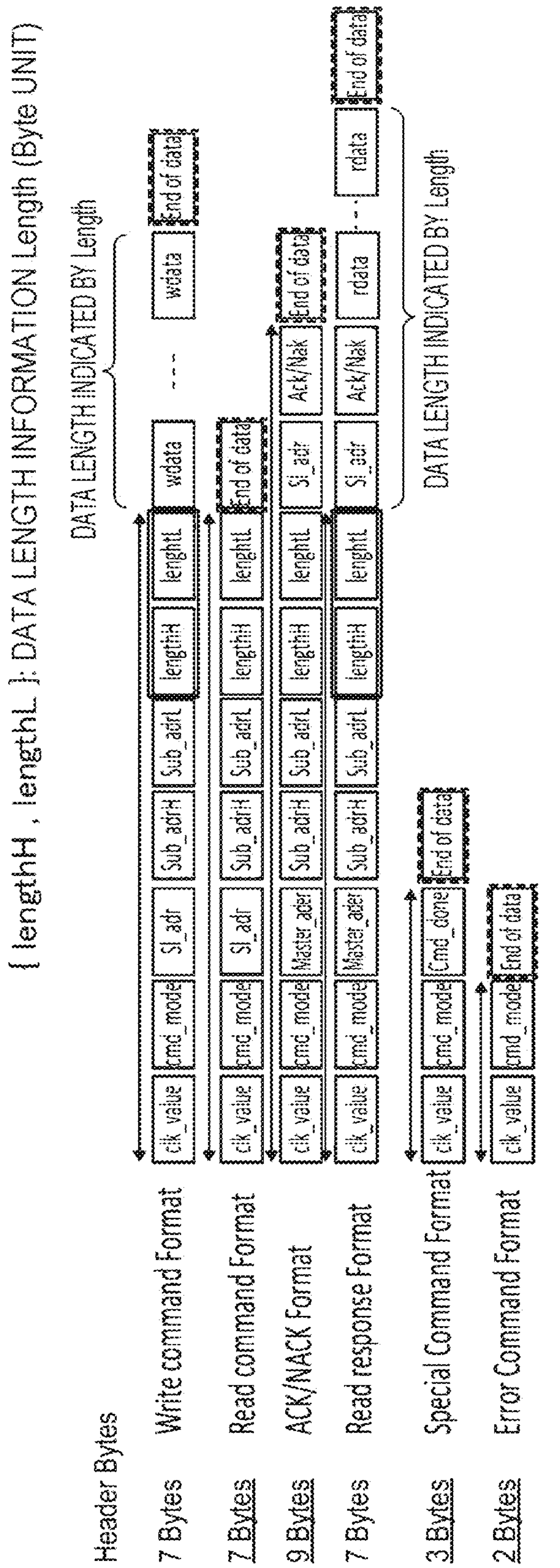
FIG. 11D is a diagram for describing a method of calculating a position of End of Data in the third example of FIG. 11C.

FIG. 11D is a diagram for describing a method of calculating a position of End of Data in the third example of FIG. 11C. Each of the Read command format, the ACK/NACK format, the special command format, and the error command format has a fixed byte length. More specifically, the Read command format is 7 bytes, the ACK/NACK format is 9 bytes, the special command format is 3 bytes, and the error command format is 2 bytes. Therefore, even if there is no EnD, an end position of each format can be specified. Note that the ACK/NACK format is not necessarily fixed to 9 bytes. All ACKs/NACKs received during the I2C communication may be appended.

Meanwhile, the Write command format and the Read response format include variable-length data WDATA or RDATA, but the length of WDATA or RDATA is a total value of lengthH and lenghL. Therefore, the position of End of Data can be specified from the values of lengthH and lengthL. For example, in a case where the Write command format is header of 7 bytes+WDATA is 64 bytes=71 bytes and the Read response format is header of 7 bytes+RDATA is 64 bytes=71 bytes, the total value of lengthH and lengthL is 64. Therefore, even if there is no EoD, the end position of each format can be specified.

Figure 11E:
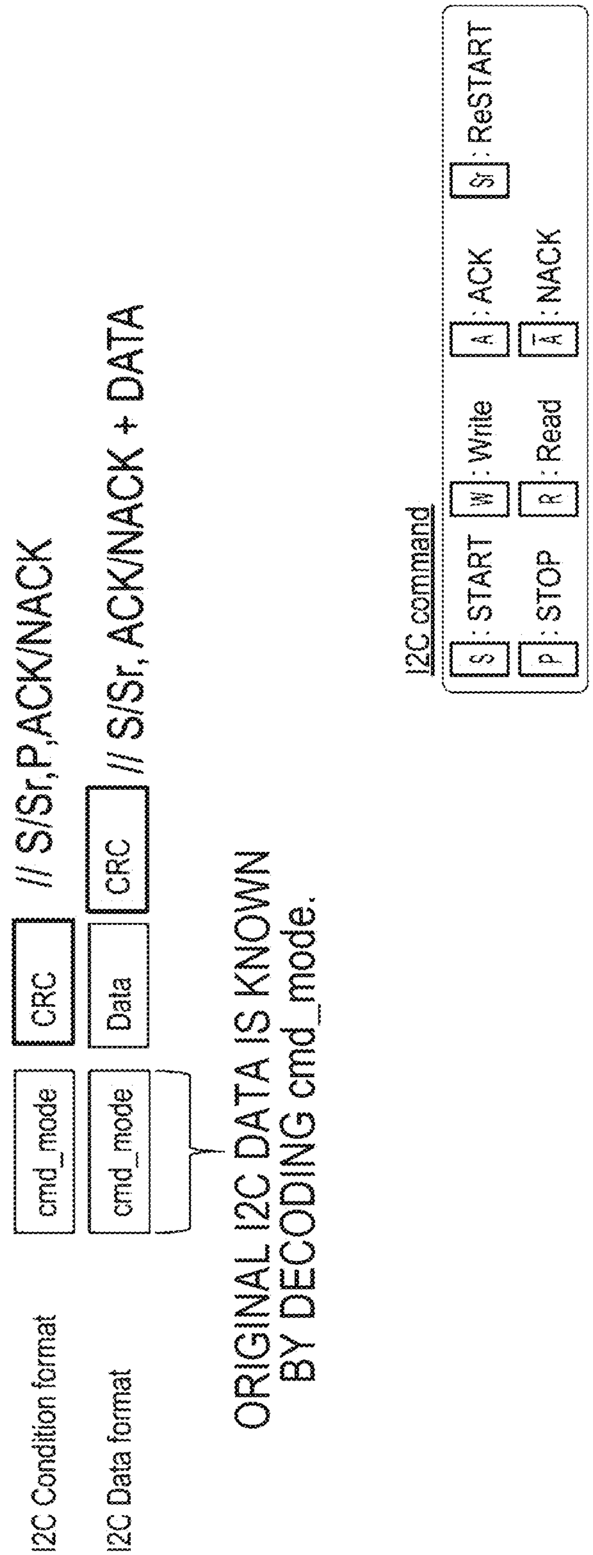
FIG. 11E is a diagram illustrating a first example of a command format when the Byte I2C mode is selected.

FIG. 11E is a diagram illustrating a first example of a command format when the Byte I2C mode is selected. As illustrated in FIG. 11E, an I2C condition format or an I2C data format is selected when the Byte I2C mode is selected.

Figure 11F:
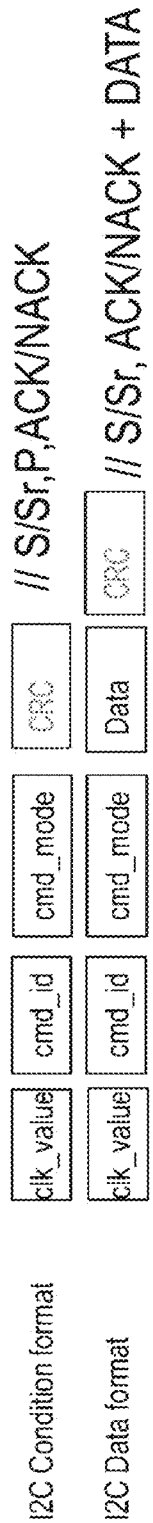
FIG. 11F is a diagram illustrating a second example of a command format when the Byte I2C mode is selected.

The I2C condition format includes cmd_mode and CRC. The I2C command to be transmitted in the I2C condition format is START(S), ReSTART (Sr), STOP (P), and ACK/NACK. The I2C data format includes cmd_mode, Data, and CRC. The I2C command to be transmitted in the I2C data format is START(S), ReSTART (Sr), STOP (P), and ACK/NACK+data.

clk_value or cmd_id may be added to the command format of FIG. 11E. FIG. 11F is a diagram illustrating a second example of the command format when the Byte I2C mode is selected. The second example in FIG. 11F illustrates an example in which clk_value and cmd_id are added immediately before cmd_mode in the first example in FIG. 11E. Whether or not to add CRC to the end of each format in the second example of FIG. 11F is arbitrary. The same similarly applies to the first example of FIG. 11E.

FIG. 12 is a diagram illustrating types and bit strings of the I2C commands to be transmitted on the communication standard X protocol in the Bulk I2C mode. In FIG. 12, ACK is an acknowledgement, indicating that processing has been normally completed. NACK is a negative acknowledgement, indicating that the processing has not been normally ended.

Repeated_start is a start flag indicating that the signal of the I2C protocol continues. Specifically, Repeated_start corresponds to Sr in a combined format of I2C illustrated in FIG. 7. Sr is a flag issued before starting the next I2C communication in a case of starting the next I2C communication without ending the I2C communication (without issuing STOP condition (P)) after starting the I2C communication from the Master 21 to the Master SerDes 7 (after issuing START condition(S)).

End of data in the I2C command transmitted on the communication standard X protocol indicates the P (STOP condition). In a case where Cmd_mode [4]=0 in the Bulk I2C mode, the case indicates that the signal of the I2C protocol from S (START condition) to P (STOP condition) is transmitted to the Slave SerDes 13.

cmd_done in the I2C command to be transmitted on the communication standard X protocol is a special command when the next data is 0xFF in the case of Cmd_mode [4]=1 in the Bulk I2C mode. cmd_done is information instructing transmission of one or more sets to the Slave SerDes 13, where signals of the I2C protocol from S (START condition) to P (STOP condition) is one set.

Rsv_command in the I2C command to be transmitted on the communication standard X protocol is Reserved and is not defined at present. The data in the I2C command indicates data to be written to the Slave 22 or data read from the Slave 22.

FIG. 12 illustrates an example in which the I2C command to be transmitted on the communication standard X protocol is expressed by 8 bits, but the present embodiment is not limited thereto, and the I2C command may be expressed by 9 bits or more. For example, in the case where the I2C command is expressed by 9 bits, one bit on the MSB side is set to "0" in a case where the signal of the I2C protocol is "data", and one bit on the MSB side is set to "1" in a case where the signal of the I2C protocol is other than "data", so that it is possible to easily determine whether or not the signal of the I2C protocol is "data" or other than "data".

(Detailed Operation in Byte I2C Mode)

Figure 13A:
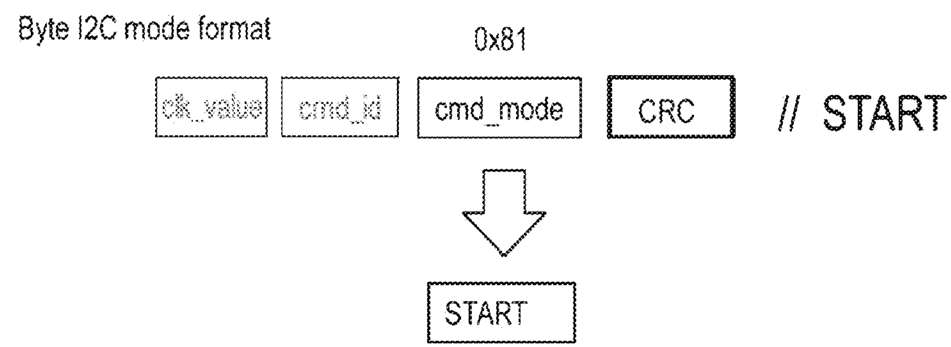
FIG. 13A is a diagram illustrating a setting example of cmd-mode in a case of transmitting condition information and an instruction for the Slave SerDes to automatically generate the number of clocks CLK in the Byte I2C mode.
Figure 13B:
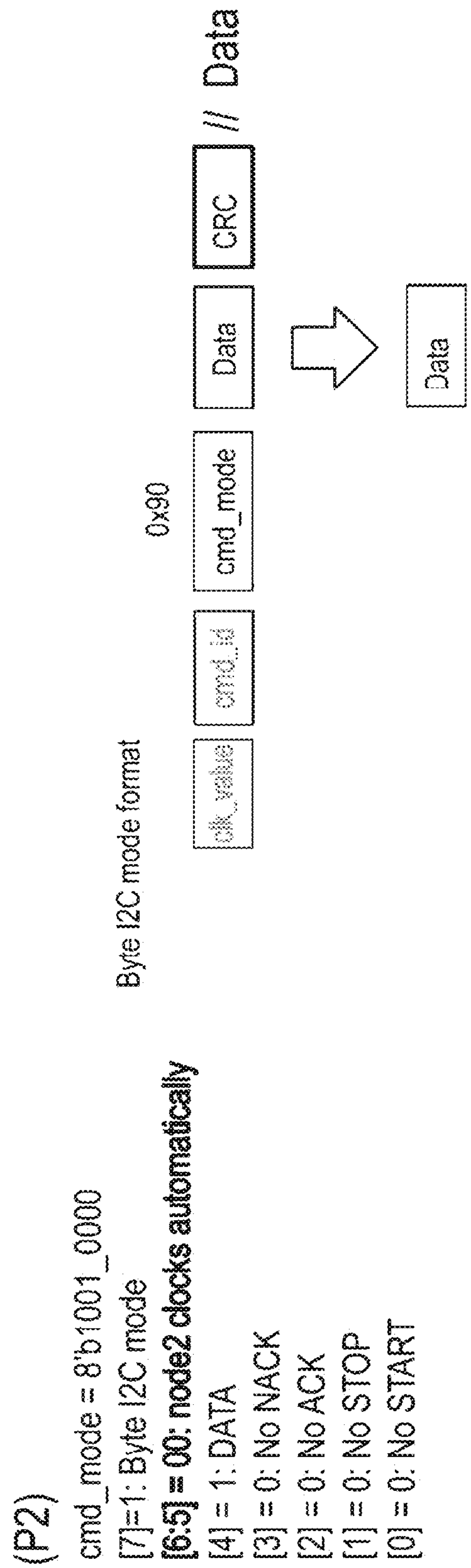
FIG. 13B is a diagram illustrating a setting example of the cmd-mode in a case of transmitting data and an instruction for the Slave SerDes to automatically generate the number of clocks CLK in the Byte I2C mode.

FIGS. 13A and 13B are diagrams illustrating setting examples of cmd-mode in a case where the Slave SerDes 13 that is the node2 automatically generates a clock CLK. FIG.

13A illustrates a setting example of cmd-mode in a case of transmitting condition information and an instruction for the Slave SerDes 13 to automatically generate the number of clocks CLK in the Byte I2C mode. cmd_mode of 1-byte data is set to 8'b1000_0001. Each bit of cmd_mode is set according to FIG. 10B. Among the bits, the bit [7]=1 indicates the Byte I2C mode. The bit [6:5]=00 indicates that the node2 automatically generates the clock CLK. The bit [4]=0 indicates that no data is included. The bit [3]=0 indicates that the NACK signal is not received. The bit [2]=0 indicates that the ACK signal is not received. The bit [1]=0 indicates that the STOP command is not included. The bit [0]=1 indicates that the START command is included.

FIG. 13B illustrates a setting example of the cmd-mode in a case of transmitting data and an instruction for the Slave SerDes 13 to automatically generate the number of clocks CLK in the Byte I2C mode. cmd_mode is set to 8'b1001_0000. Among the bits, the bit [7]=1 indicates the Byte I2C mode. The bit [6:5]=00 indicates that the node2 automatically generates the clock CLK. The bit [4]=1 indicates that data is included. The bit [3]=0 indicates that the NACK signal is not received. The bit [2]=0 indicates that the ACK signal is not received. The bit [1]=0 indicates that the STOP command is not included. The bit [0]=0 indicates that the START command is not included.

As illustrated in FIGS. 13A and 13B, the number of bytes of the signal transmitted from the Master SerDes 7 to the Slave SerDes 13 in the Byte I2C mode is 2 bytes or 3 bytes excluding the clock frequency information clk_value and the error correction code CRC.

Figure 14A:
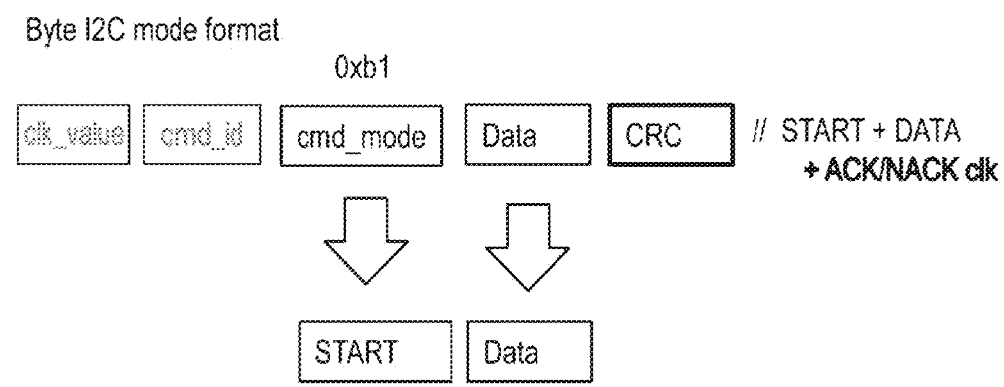
FIG. 14A is a diagram illustrating a setting example 1 of the cmd-mode in a case of transmitting condition information, data, and designation of the number of clocks CLK generated by the Slave SerDes in the Byte I2C mode.
Figure 14B:
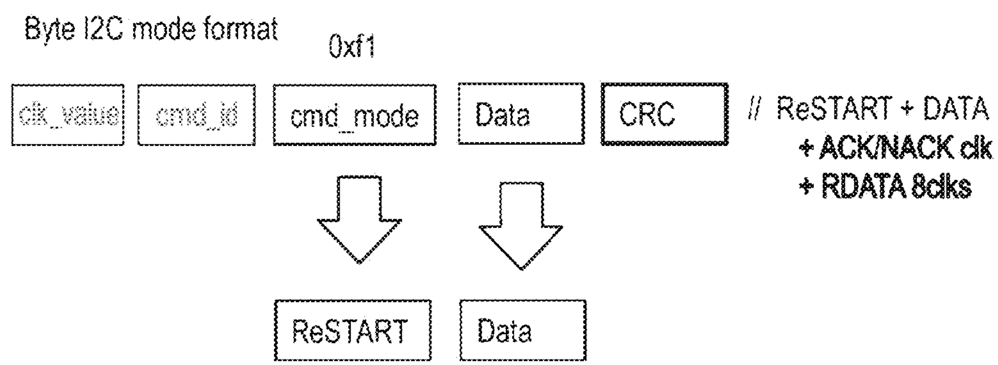
FIG. 14B is a diagram illustrating a setting example 2 of the cmd-mode in the case of transmitting condition information, data, and designation of the number of clocks CLK generated by the Slave SerDes in the Byte I2C mode.

FIGS. 14A and 14B are diagrams illustrating examples in which the Slave SerDes 13 that is the node2 manually generates the clock CLK on the basis of the number of cycles instructed by the Master SerDes 7 that is the node1. FIG. 14A illustrates a setting example 1 of the cmd-mode in a case of transmitting condition information, data, and designation of the number of clocks CLK generated by the Slave SerDes in the Byte I2C mode. FIG. 14B illustrates a setting example 2 of the cmd-mode in a case of transmitting condition information, data, and designation of the number of clocks CLK generated by the Slave SerDes in the Byte I2C mode. cmd_mode in FIG. 14A is set to 8'b1000_0001. The bit [6:5]=01 of cmd_mode indicates that the node2 instructs generation of the clock CLK of one cycle. The bit [4]=1 indicates that data is included. The other bits are similar to those in FIG. 13A.

cmd_mode in FIG. 14B is set to 8'b1111_0001. The bit [6:5]=11 of cmd_mode indicates that the node2 instructs generation of the clock CLK of nine cycles. The other bits are similar to those in FIG. 14A.

Figure 15A:
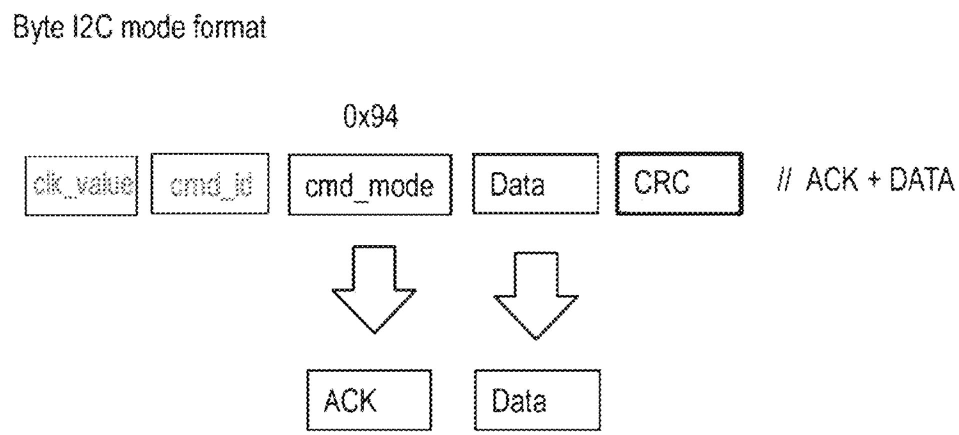
FIG. 15A is a diagram illustrating an example of transmitting an ACK and data in the Byte I2C mode.

Similarly, FIG. 15A illustrates an example of transmitting an ACK and data in the Byte I2C mode.

Figure 15B:
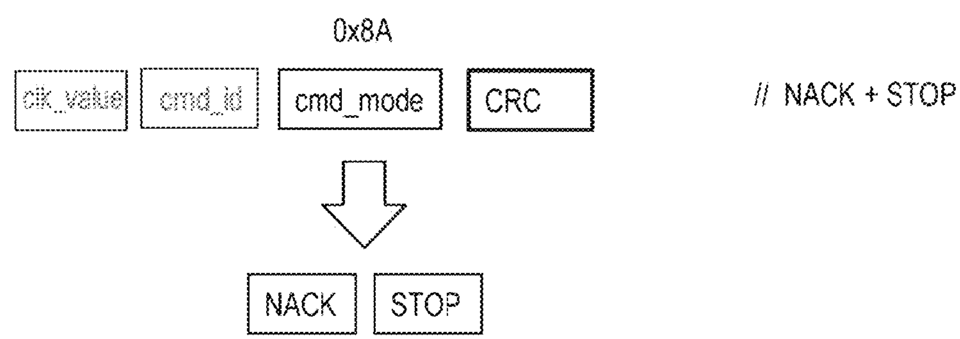
FIG. 15B is a diagram illustrating an example of transmitting a NACK and a STOP command in the Byte I2C mode.

FIG. 15B illustrates an example of transmitting a NACK and a STOP command in the Byte I2C mode.

Figure 16:
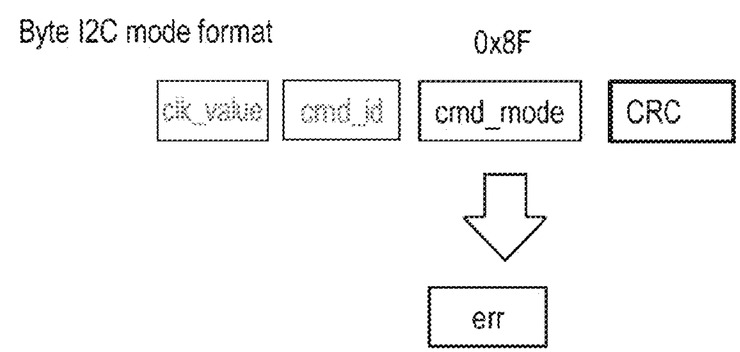
FIG. 16 is a diagram illustrating a setting example of the cmd_mode in a case where an error occurs.

FIG. 16 is a diagram illustrating a setting example of the cmd_mode in a case where an error occurs. cmd_mode in FIG. 16 is set to 8'b1xx0_1111. The bit [6:5]=xx of cmd_mode indicates don't care. Bit [3:0]=1111 is set. As described above, when all the lower four bits of cmd_mode become 1, it indicates that an error has occurred during execution of the Byte I2C mode.

Figure 17:
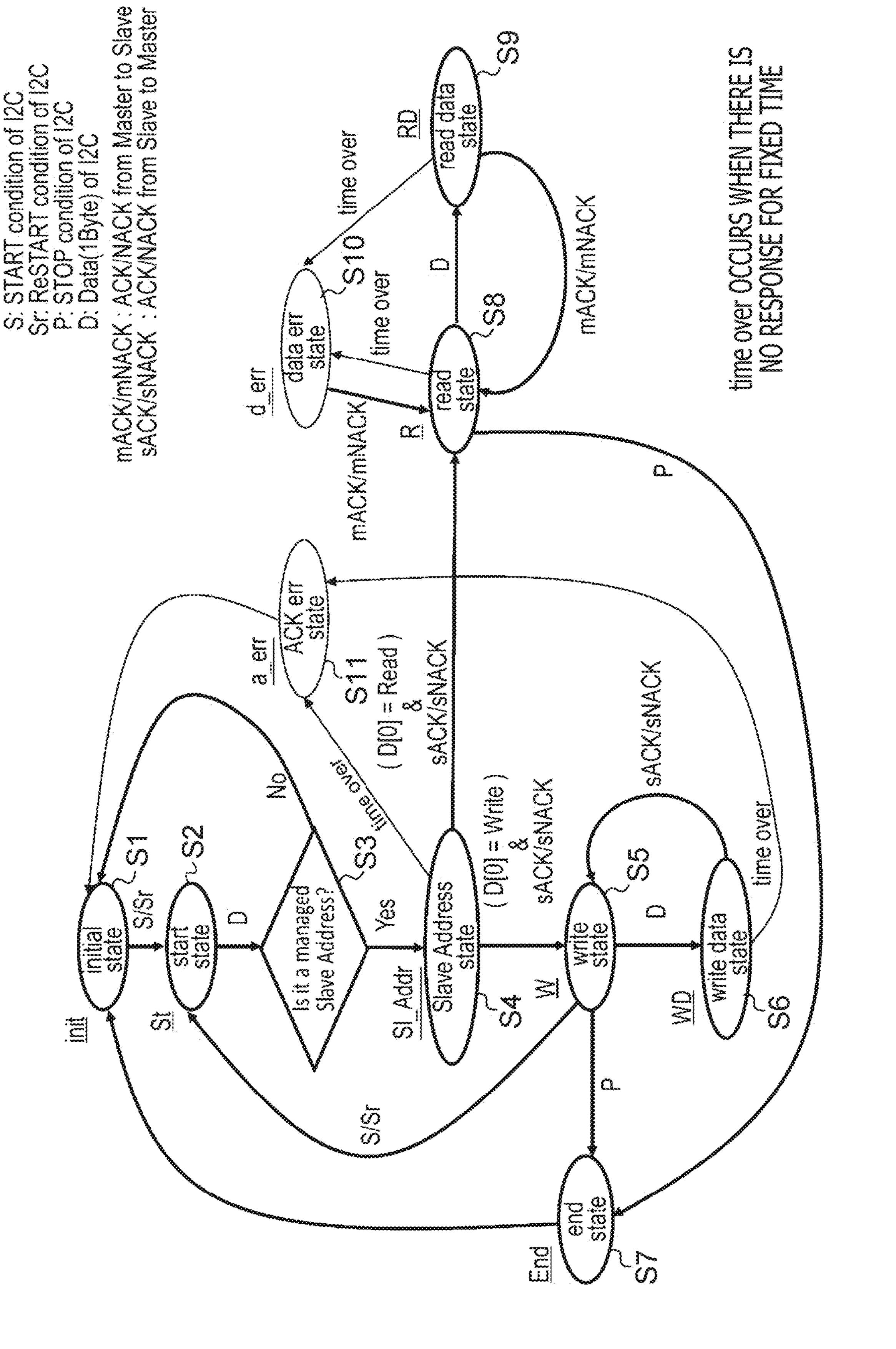
FIG. 17 is a state transition diagram of the Master SerDes that is node1 and the Slave SerDes that is node2.

FIG. 17 is a state transition diagram of the Master SerDes 7 that is the node1 and the Slave SerDes 13 that is the node2. The states of both the node1 and node2 transition on the basis of the state transition diagram illustrated in FIG. 17. The state transition diagram of FIG. 17 illustrates the state transition during the Byte I2C mode of FIG. 9B. Note that, during the Bulk I2C mode in FIG. 9A, transmission and reception are collectively performed from S (START condition) to P (STOP condition), and thus it is not necessary to consider the state transition. Hereinafter, the transition of the states of the node1 and node2 during the Byte I2C mode will be described with reference to FIG. 17.

The node1 and node2 transition to an initial state init when power is ON (state S1). When a START/ReSTART (S/Sr) command of the I2C protocol is received from the Master 21 in the initial state init, the node1 transitions to a START state ST (state S2). In the START state ST, the node1 converts the S/Sr (START/ReSTART) command of the I2C protocol received in the state S1 into a packet of the communication standard X in FIG. 13A and transmits the packet to the node2. When receiving the S/Sr (START/ReSTART) command from the node1, the node2 transitions to the Start state ST and transmits the S/Sr (START/ReSTART) command converted into the I2C protocol to the Slave 22.

When receiving data D from the Master 21 in the Start state ST, the node1 determines whether or not the data is a Slave address (state S3). In a case where the data is not a Slave address, the node1 returns to the state S1. In a case where the data is a Slave address, the node1 transitions to a Slave address state S1 Addr (state S4). In the Slave address state S1 Addr, the node1 instructs the Master 21 to perform clock stretching. The clock stretching means holding the clock from the Master 21 at a low level. During a clock stretching period, the Master 21 cannot transmit new information to the node1. Furthermore, in the Slave address state S1 Addr, the node1 converts the Slave address of the I2C protocol into a packet of the communication standard X and transmits the packet to the node2. When receiving the Slave address from the node1, the node2 transitions to a Slave address state S1 Addr and transmits the Slave address converted into the I2C protocol to the Slave 22. When receiving the ACK/NACK signal from the Slave 22 in the Slave address state S1 Addr, the node2 transitions to a Write state W, converts the ACK/NACK signal into the protocol of the communication standard X, and transmits the converted ACK/NACK signal to the node1.

When receiving the ACK/NACK signal from the node2 in the Slave address state S1 Addr, the node1 transitions to the Write state W (state S5). In the Write state W, the node1 instructs the Master 21 to release the clock stretching, and converts the ACK/NACK signal from the node2 into the I2C protocol and transmits the ACK/NACK signal to the Master 21. When receiving the data D from the Master 21 in the Write state W, the node1 transitions to a Write data state WD (state S6). In this state, when returning the ACK/NACK signal to the Master 21, the state returns to the Write state W. When receiving the P (STOP) command from the Master 21 in the Write state W, the node1 transitions to an End state End (state S7). In the End state End, when the node1 converts the P (STOP) command of the I2C protocol into a packet of the communication protocol X, and transmits the packet to the node2, the state returns to the initial state init.

When receiving ACK or NACK from the Slave 22 when having received the Slave address including a Read bit and having transitioned to the Slave address state S1 Addr in state S4, the node2 transitions to a Read state R (state S8). Thereafter, the node2 converts the ACK or NACK of the I2C protocol into a packet of the communication protocol X and transmits the packet to the node1. When receiving the data D from Slave in the Read state R, the state transitions to a Read data state RD (state S9). The node2 converts Read data into a packet of the I2C protocol of the communication protocol X and transmits the packet to the node1. When receiving an ACK/NACK packet from the node 2, the node1 transitions to the Read state R and transmits the ACK or NACK to the Master 21. Thereafter, when receiving a Read data packet, the node1 transitions to the Read data state RD and transmits the Read data the Master 21.

In a case where the ACK/NACK signal is not received within a time limit in the Read data state RD, it becomes timeout and the state transitions to a data error state (state S10). Similarly, also in a case where the data D from the Slave is not received within a time limit in the Read state R, it becomes timeout and the state transitions to the data error state of the state S10. When a dummy data signal is returned to the Master 21 in the data error state, the state returns to the Read state R of the state S8.

Meanwhile, in a case where the ACK/NACK signal from Slave is not received within the time limit in the Write data state WD in the state S6, it becomes timeout and the state transitions to an ACK error state a_err (state S11). In addition, when the ACK/NACK signal from Slave is not received within the time limit in the Slave address state S1 Addr of the state S4, the state transitions to the ACK error state a_err of the state S11. When predetermined error processing is performed in the ACK error state a_err, the state returns to the state S1.

The state transition when the Master SerDes 7 performs write in the Byte I2C mode is summarized as follows. When receiving a signal including the Start Condition from the Master 21, LINK 11 in the Master SerDes 7 transitions to the Start state ST (first state). When transitioning to the Start state ST, the LINK 11 converts the Start Condition into a signal of the communication protocol X (first communication standard) and transmits the signal to the Slave SerDes 13. Thereafter, when receiving a signal including 1-byte address information (Slave address) of a final destination device from the Master 21 while being in the Start state ST, the LINK 11 transitions to the Slave address state S1 Addr (second state) and holds a clock from the Master 21 to a low level. In the Slave address state S1 Addr, the LINK 11 converts the signal including the address information into a signal of the communication protocol X and transmits the signal to the Slave SerDes 13. Thereafter, when receiving a signal including the ACK signal or the NACK signal from the Slave SerDes 13 while being in the Slave address state S1 Addr, the LINK 11 recognizes write in a case where a specific bit of the signal including the address information is a first bit value and transitions to the Write state W (third state). In the Write state W, the LINK 11 converts the signal including the ACK signal or the NACK signal received from the Slave SerDes 13 into a signal of the I2C protocol (second communication standard) and transmits the signal to the Master 21, and then releases the hold of the low level of the clock from the Master 21.

Furthermore, when receiving a signal including 1-byte write data from the Master 21 while being in the Write state W, the LINK 11 transitions to the Write data state WD (fourth state). In the Write data state WD, the LINK 11 converts the received signal into a signal of the communication protocol X and transmits the signal to the Slave SerDes 13. Thereafter, when receiving the signal including the ACK signal or the NACK signal from the Slave SerDes 13 while being in the Write data state WD, the LINK 11 transitions to the Write state W, converts the received ACK/NACK signal into a signal of the I2C protocol, and transmits the signal to the Master 21.

Furthermore, in a case of not receiving the signal including the ACK signal or the NACK signal from the Slave 22 within a predetermined period while being in the Slave address state S1_Addr or the Write data state WD, the LINK 11 transitions to the ACK error state a_err (fifth state) and performs error processing in the ACK error state a_err.

Meanwhile, the state transition when the Master SerDes 7 performs readout in the Byte I2C mode is summarized as follows. When receiving a signal including the Start Condition or ReStart Condition from the Master 21, the LINK 11 in the Master SerDes 7 transitions to the Start state ST. When transitioning to the Start state ST, the LINK 11 converts the received signal including the Start Condition or ReStart Condition into a signal of the communication protocol X and transmits the signal to the Slave SerDes 13. Thereafter, when receiving a signal including 1-byte address information of a final destination device from the Master 21 while being in the Start state ST, the LINK 11 transitions to the Slave address state S1_Addr and holds a clock from the Master 21 to a low level. In the Slave address state S1_Addr, the LINK 11 converts the signal including the address information into a signal of the communication protocol X and transmits the signal to the Slave SerDes 13. Thereafter, when receiving the signal including the ACK signal or the NACK signal from the Slave SerDes 13 while being in the Slave address state S1_Addr, the LINK 11 recognizes readout in a case where a specific bit of the signal including the address information is a second bit value and transitions to the Read state R (sixth state). In the Read state R, the LINK 11 converts the signal including the ACK signal or the NACK signal received from the Slave SerDes 13 into a signal of the I2C protocol and transmits the signal to the Master 21, and then releases the hold of the low level of the clock from the Master 21.

Furthermore, when receiving a signal including 1-byte readout data from the Slave SerDes 13 while being in the Read state R, the LINK 11 transitions to the Read data state RD (seventh state). In the Read data state RD, the LINK 11 converts the received signal into a signal of the I2C protocol and transmits the signal to the Master 21. Thereafter, when receiving the signal including the ACK signal or the NACK signal from the Master 21 while being in the Read data state RD, the LINK 11 transitions to the Read state R, and converts the received signal into a signal of the communication protocol X and transmits the signal to the Slave SerDes 13.

Furthermore, in a case of not receiving the readout data within a predetermined period from the Slave SerDes 13 while being in the Read state R, the LINK 11 transitions to the data error state d_err (eighth state). Furthermore, in a case of not receiving the ACK signal or the NACK signal within a predetermined period from the Master 21 while being in the Read data state RD, the LINK 11 transitions to the data error state d_err. The LINK 11 avoids deadlock of the entire system including the communication device, the Master 21, and the Slave SerDes 13 by performing the error processing in the data error state d_err.

Meanwhile, the state transition of the Master SerDes 7 in the Bulk I2C mode is summarized as follows. The LINK 11 in the Master SerDes 7 holds received signals from when receiving the signal including the Start Condition from the Master 21 to when receiving the signal including the Stop Condition, and transmits the signal including the ACK signal or the NACK signal to the Master 21 for each byte of the received signal. The LINK 11 converts the received signal into a signal of the communication protocol X and transmits the converted signal to the Slave SerDes 13. The LINK 11 receives and holds, from the Slave SerDes 13, the signal including the ACK signal or the NACK signal from the Slave 22, and then converts the signal from the Slave SerDes 13 into a signal of the I2C protocol and transmits the signal to the Master 21 in response to a readout request from the Master 21.

Figure 18:
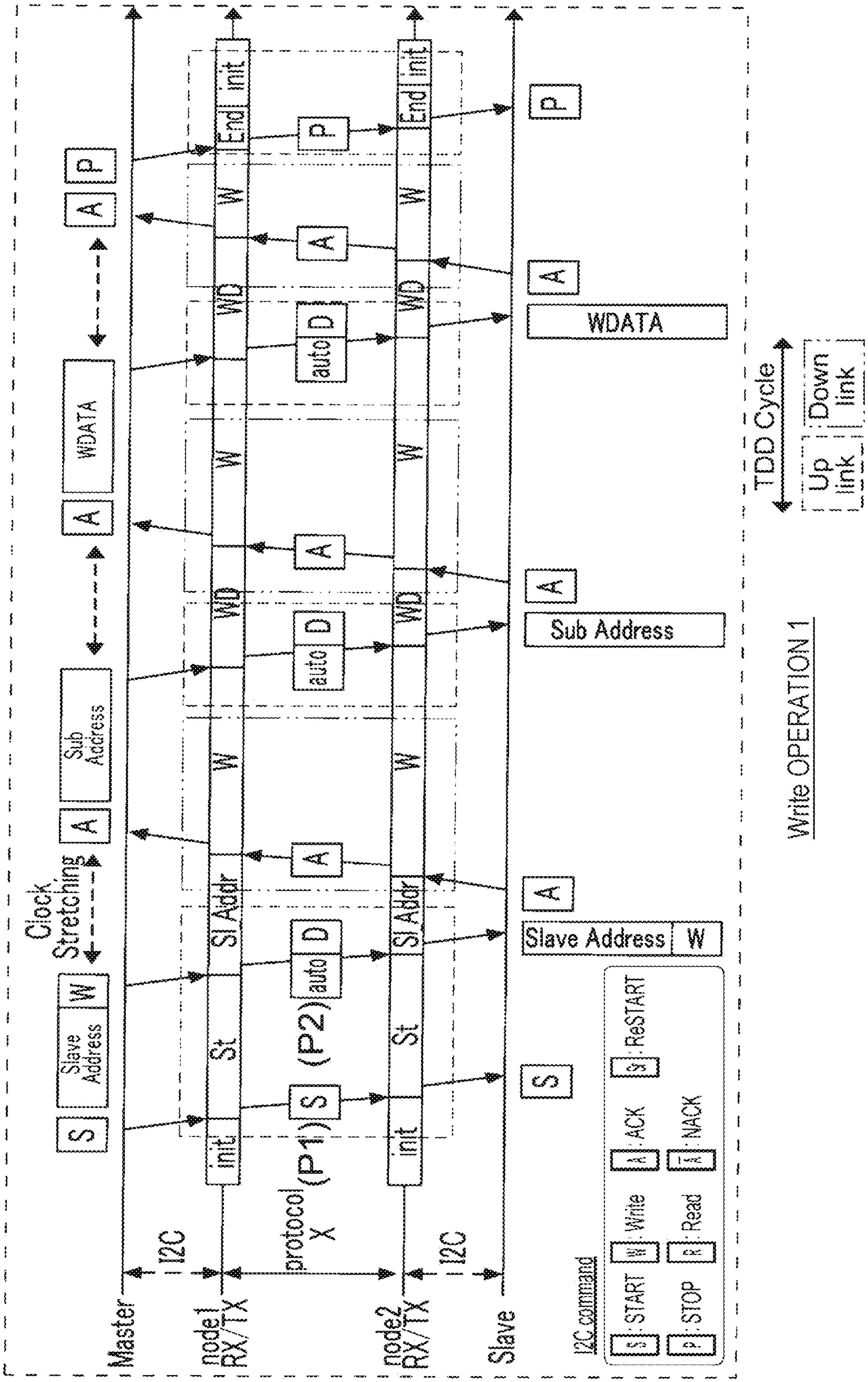
FIG. 18 is a timing chart of a basic Write model in which the Slave SerDes automatically generates the number of clocks CLK in the Byte I2C mode.

FIG. 18 is a timing chart of a basic Write model (hereinafter referred to as Write operation 1) in which the Slave SerDes automatically generates the number of clocks CLK in the Byte I2C mode. In the Write operation 1, the node2 receives the signal from the node1, understands cmd_mode [6:5]=2'b00 in the received signal, and automatically generates the clock CLK. The node2 can transmit Write data to the Slave 22 or receive the ACK signal from the Slave 22 by using the clock CLK.

As illustrated in FIG. 18, when the Slave address from the Master 21 is transmitted to the Slave 22, the ACK signal is returned from the Slave 22 to the Master 21. Next, when the offset address from the Master 21 is transmitted to the Slave 22, the ACK signal is returned from the Slave 22 to the Master 21. Next, when WDATA from the Master 21 is transmitted to the Slave 22, the ACK signal is returned from the Slave 22 to the Master 21. Thereafter, the transmission of WDATA and the return of the ACK signal are repeated in units of one byte until the STOP command is transmitted.

Figure 19:
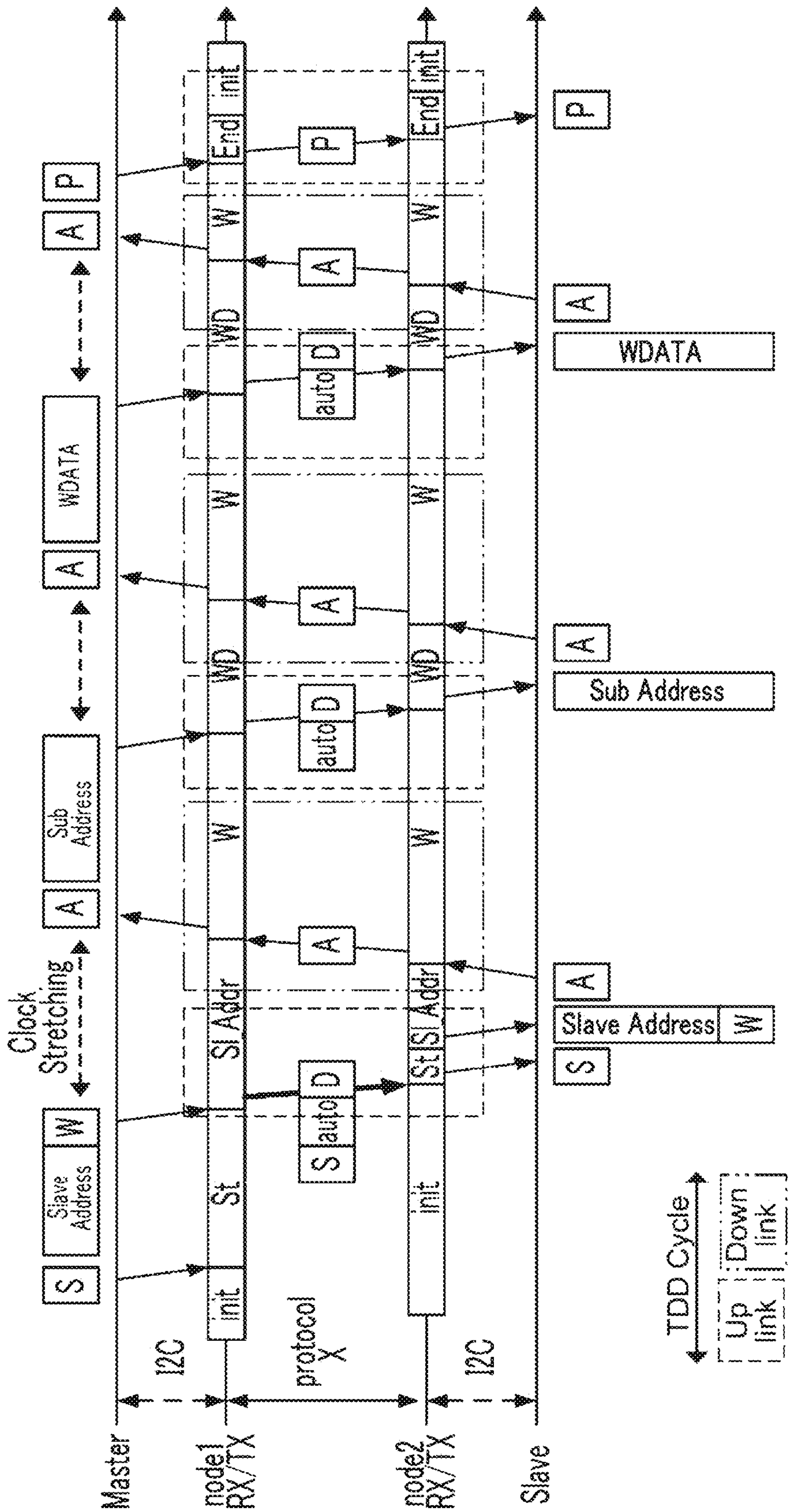
FIG. 19 is a timing chart of a Write operation 2 that is a modification of a Write operation 1 of FIG. 18.

FIG. 19 is a timing chart of a Write operation 2 that is a modification of the Write operation 1 of FIG. 18. In the Write operation 1 of FIG. 18, the START command is transmitted to the node2 when the node1 is in the START state St, but in the Write operation 2, the START command and the data D are collectively transmitted to the node2 when the node1 is in the Slave address state S1_Addr. As a result, transactions of the communication protocol X can be reduced as compared with the Write operation 1 of FIG. 18.

Figure 20:
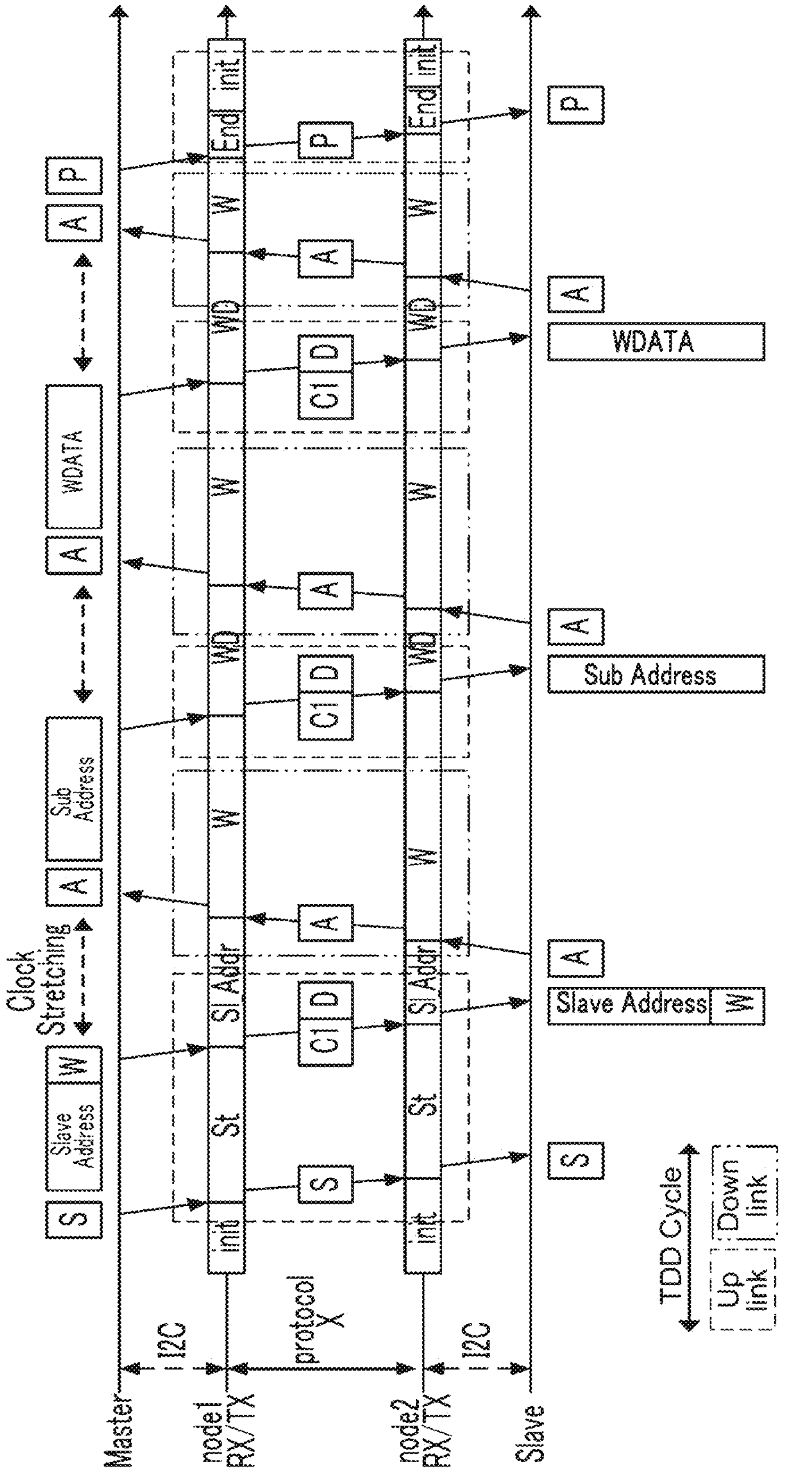
FIG. 20 is a timing chart of a basic Write operation 3 for designating the number of clocks CLK in the Byte I2C mode.

FIG. 20 is a timing chart of a basic Write operation 3 for designating the number of clocks CLK in the Byte I2C mode. In the Write operation 3 of FIG. 19, unlike the Write operations 1 and 2, the node1 designates information of the number of cycles of the clock CLK used by the node2 in cmd_mode. In this case, one cycle is designated. The node2 understands the signal cmd_mode [6:5]=2'b01 received from the node1, and generates the clock CLK for ACK for one cycle at appropriate timing for the Slave 22. The node2 receives the ACK signal from the Slave 22 using the clock CLK. FIG. 20 is adopted in a case where, for example, processing performance of the node2 is low. The node1 calculates the necessary number of cycles of the clock CLK instead of the node2.

Figure 21:
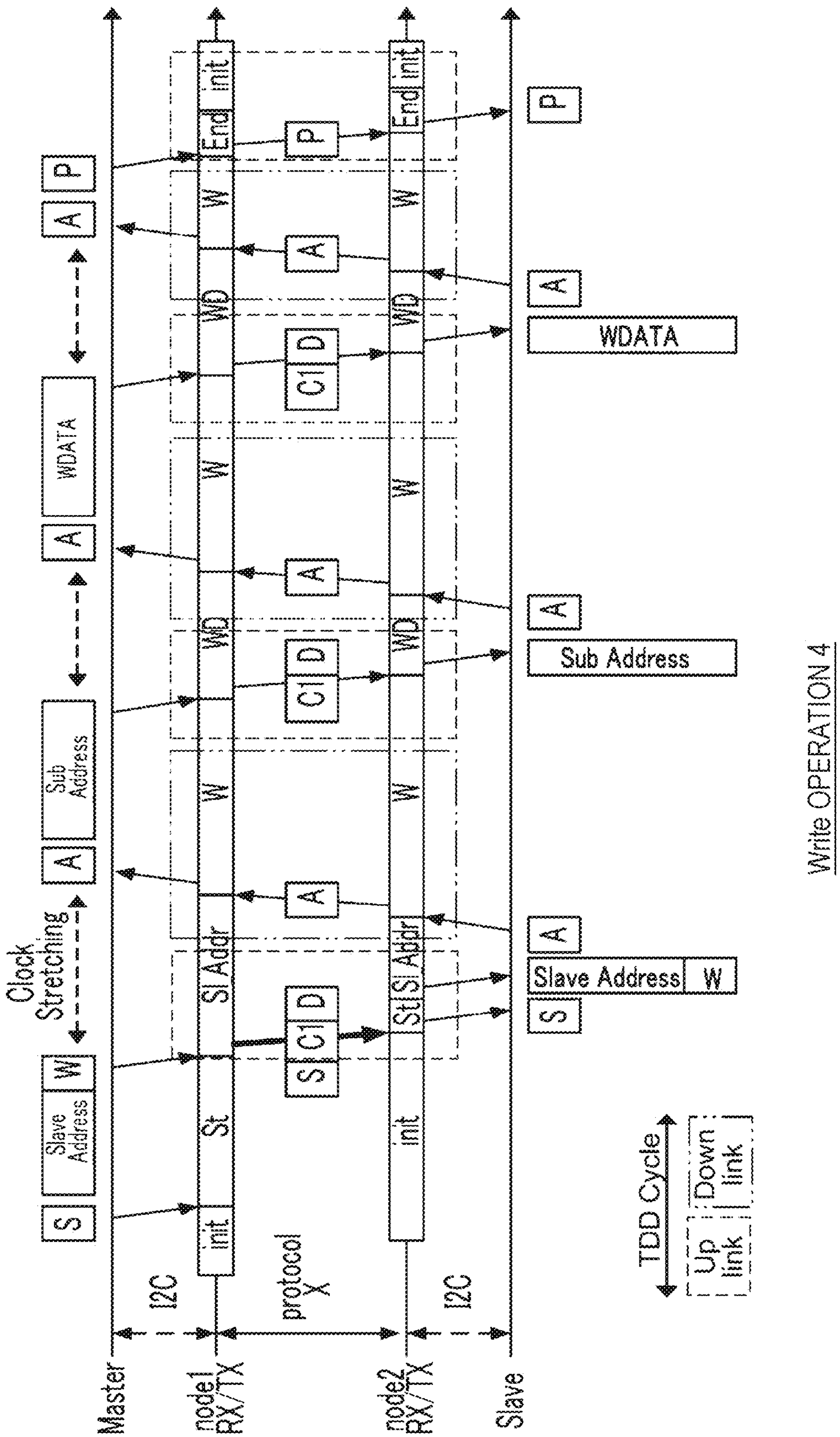
FIG. 21 is a timing chart of a Write operation 4 that is a modification of the Write operation 3 of FIG. 20.

FIG. 21 is a timing chart of a Write operation 4 that is a modification of the Write operation 3 of FIG. 20. In the Write operation 3 of FIG. 20, the START command is transmitted to the node2 when the node1 is in the START state St, but in the Write operation 4, the START command and the data D are collectively transmitted to the node2 when the node1 is in the Slave address state S1_Addr. As a result, transactions of the specific protocol X can be reduced as compared with the Write operation 3.

Figure 22:
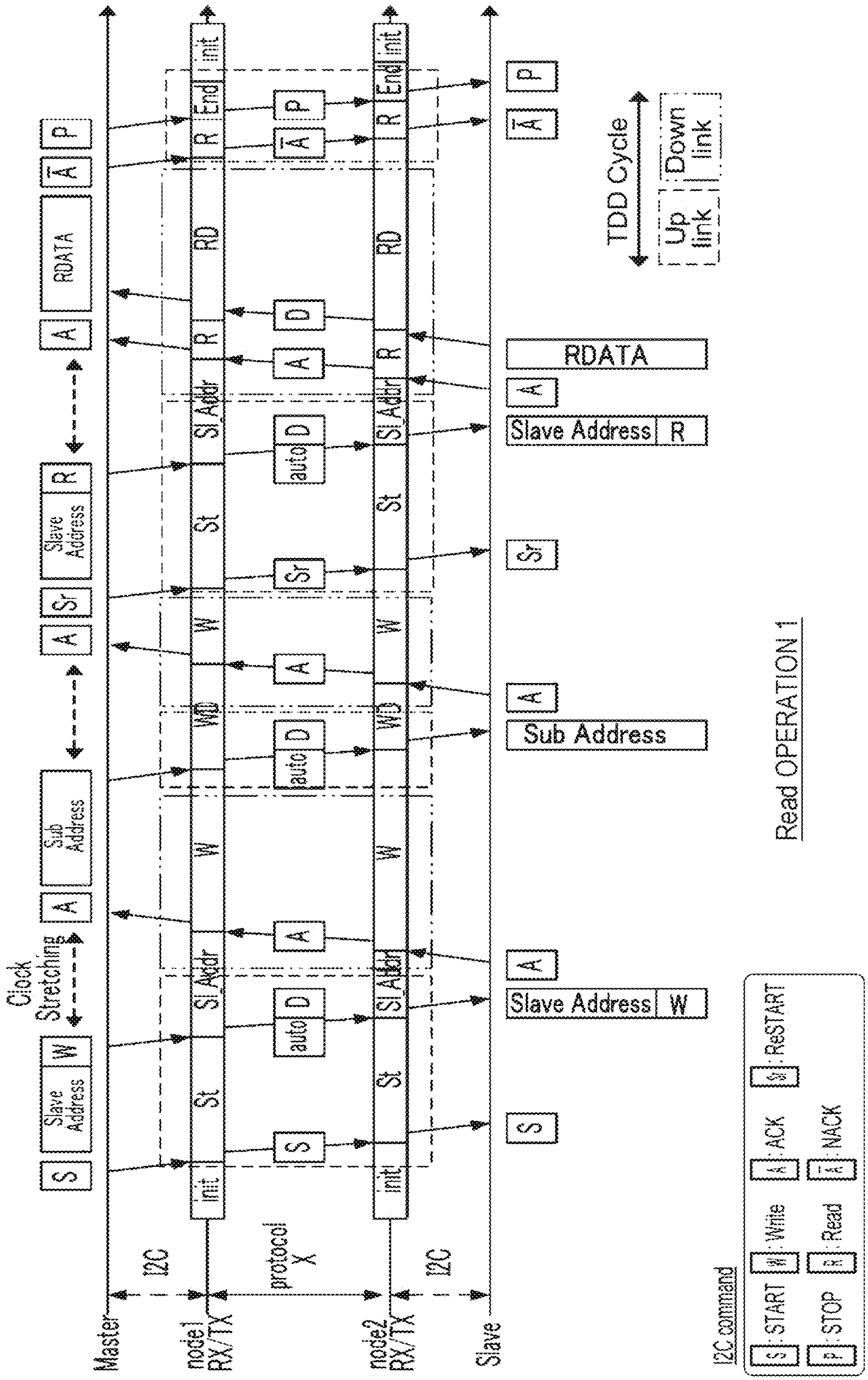
FIG. 22 is a timing chart of a basic Read model in which the Slave SerDes automatically generates the number of clocks CLK in the Byte I2C mode.

FIG. 22 is a timing chart of a basic Read model (hereinafter referred to as Read operation 1) in which the Slave SerDes automatically generates the number of clocks CLK in the Byte I2C mode. In the Read operation 1, the node2 receives the signal from the node1, understands cmd_mode [6:5]=2'b00 in the received signal, and automatically generates the clock CLK. As a result, the node2 receives the ACK signal from the Slave 22 or receives the RDATA and transmits the RDATA to the node1, using the clock CLK generated by the node2 itself.

As illustrated in FIG. 22, in the Read operation 1, first, the Slave address and the offset address are transmitted to the Slave 22 by a Write command, and then, the same Slave address and Read command as those of the previous time are transmitted.

Figure 23:
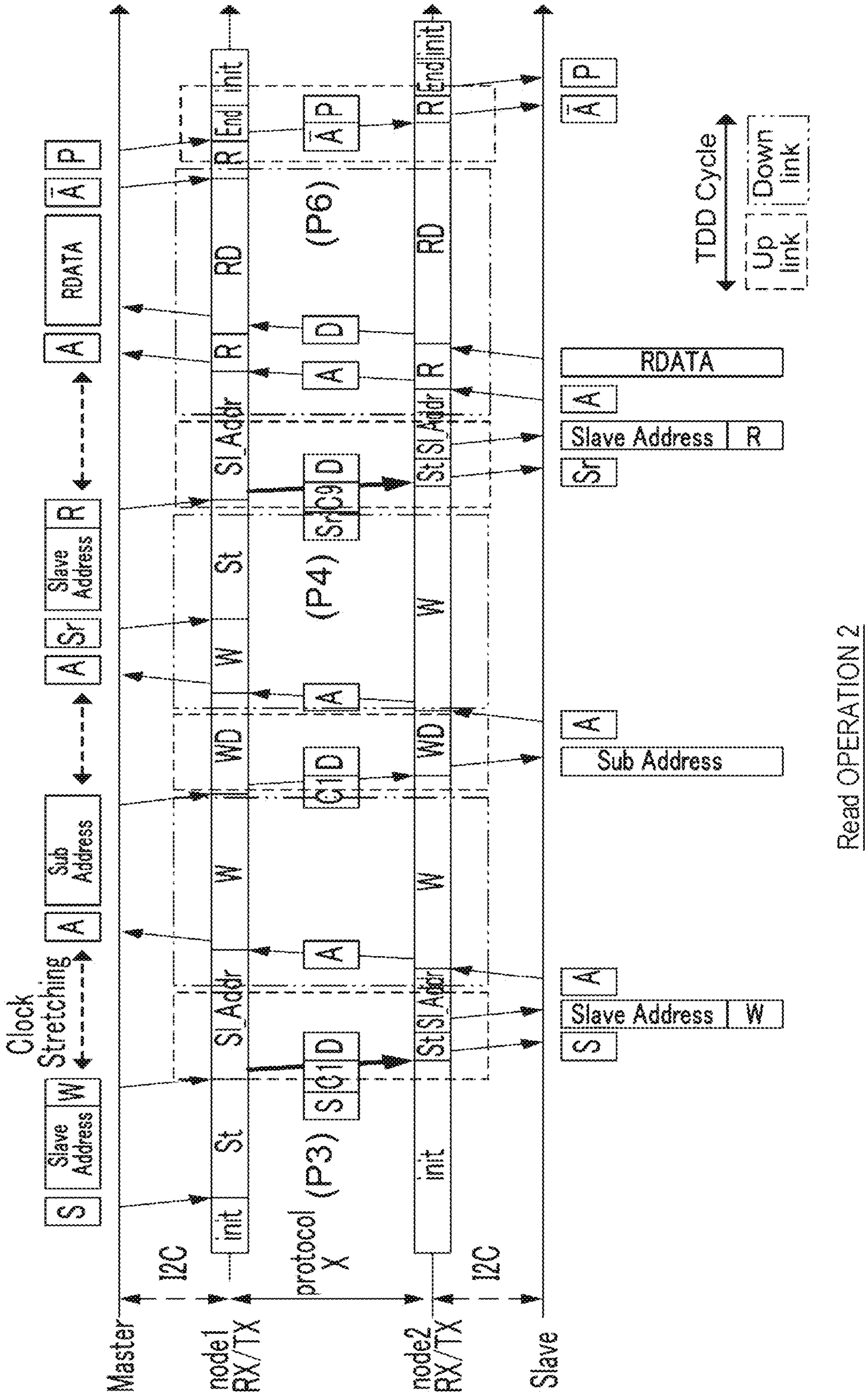
FIG. 23 is a timing chart of a Read operation 2 that is a modification of a Read operation 1 of FIG. 22.

FIG. 23 is a timing chart of a Read operation 2 that is a modification of the Read operation 1 of FIG. 22. In the Read operation 2, the node1 designates information on the number of cycles of the clock CLK used by the node2 in cmd_mode. The node2 understands the signal cmd_mode [6:5]=2'b01 received from the node1, and generates the clock CLK for ACK for one cycle at appropriate timing for the Slave 22, in cmd_mode described in C1 in FIG. 23. The node2 receives the ACK signal from the Slave 22 using the clock CLK. The node2 understands the signal cmd_mode [6:5]=2'b11 received from the node1 in cmd_mode described as C9, and generates the clock CLK for ACK and RDATA signals for nine cycles at appropriate timing for the Slave 22. The node2 receives the ACK and RDATA signals from the Slave 22 using the clocks CLK. As described above, in FIG. 23, since the processing performance of the node2 is low, the node1 calculates and provides notification of the number of cycles of the clock CLK used in the node2.

Figure 24:
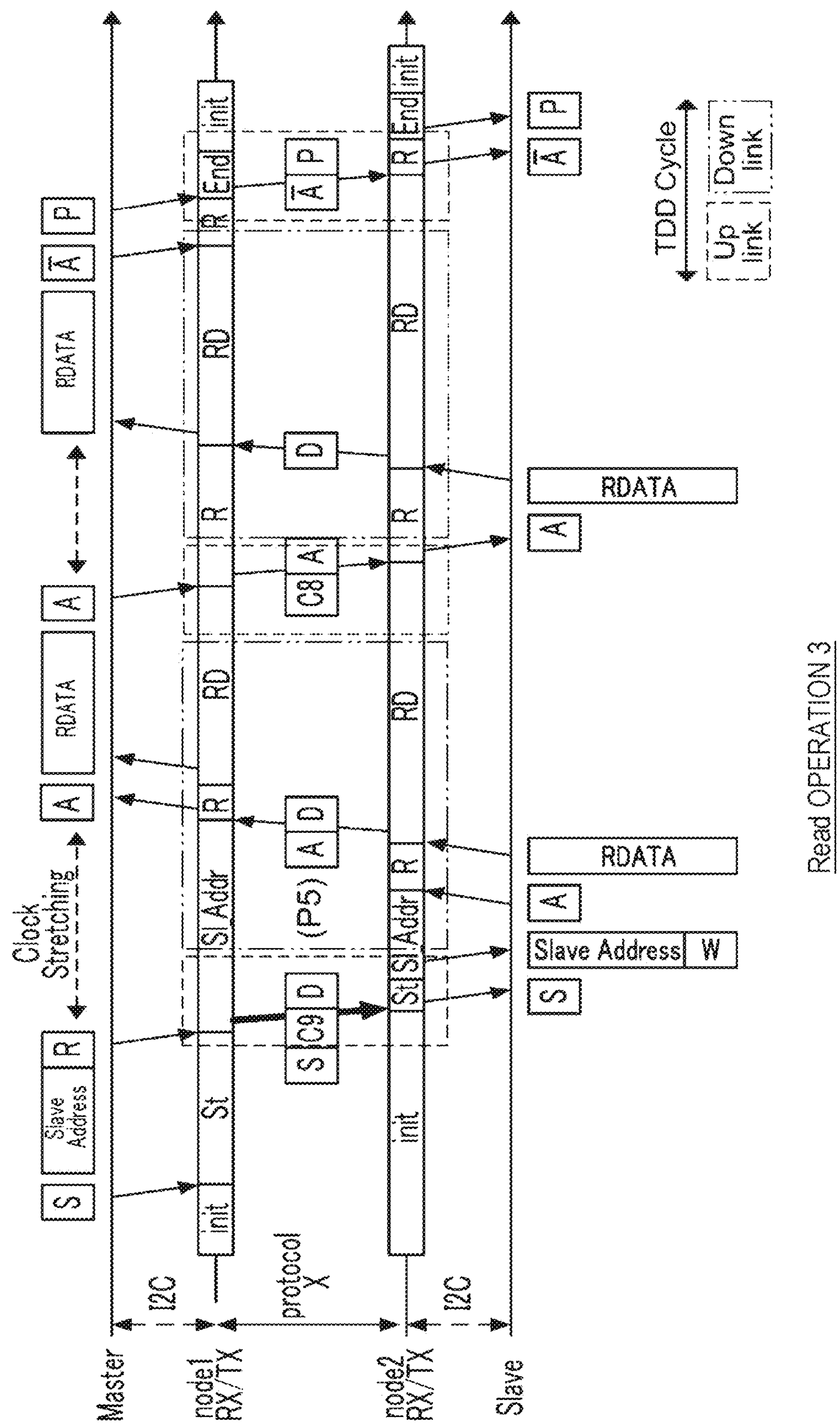
FIG. 24 is a timing chart of a Read operation 3 in a case of absence of Sub Address.

FIG. 24 is a timing chart of a Read operation 3 in a case of absence of Sub Address. Unlike the Read operations 1 and 2, the Read operation 3 illustrates an example in which no offset address exists after the Slave address. In FIGS. 22 and 23, the Slave address is first transmitted by the Write command, but in the Read operation 3, the Slave address is transmitted by the Read command from the beginning. When the node2 transmits the Slave address to the Slave 22, the node2 receives the ACK signal and the RDATA transmitted from the Slave 22 and transmits the ACK signal and the RDATA to the node1. The node1 transmits the ACK signal and the RDATA from the node2 to the Master 21. In cmd_mode indicated as C8 in FIG. 24, the node2 understands the signal cmd_mode [6:5]=2'b10 received from the node1, and generates the clock CLK for the RDATA signal for eight cycles at appropriate timing for the Slave 22. The clock CLK is used for the node2 to receive RDATA from the Slave 22.

Figure 25:
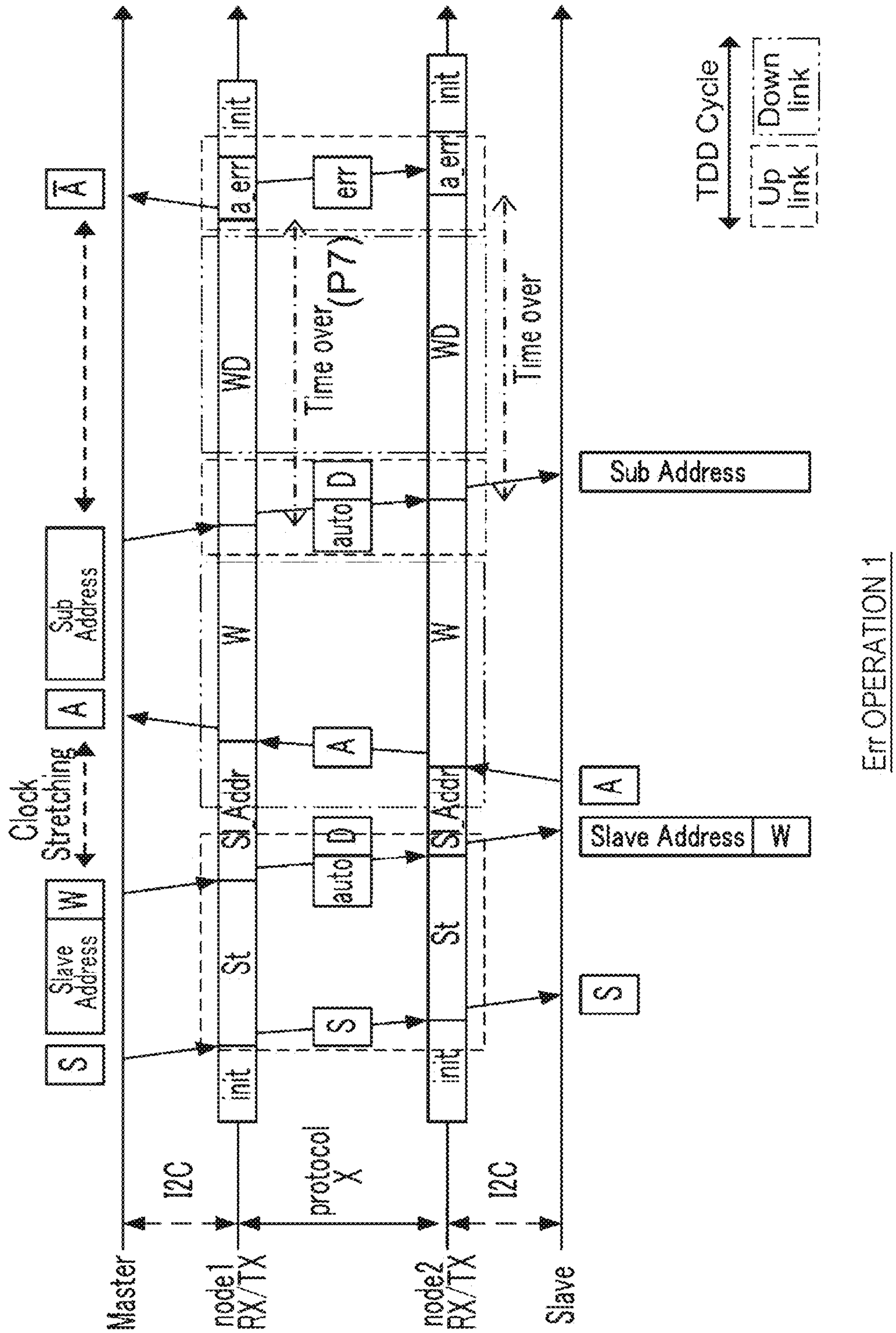
FIG. 25 is a timing chart of an Err operation 1 in the Byte I2C mode.

FIG. 25 is a timing chart of an Err operation 1 in the Byte I2C mode. The Err operation 1 is performed in a case where the ACK/NACK signal from the Slave 22 does not arrive within a time limit. In a case where the ACK/NACK signal does not reach the node2 from the Slave 22, it becomes timeout and the node1 and the node2 transition to an ACK_err state a_err due, perform the error processing, and then return to the initial state init. When transitioning to the ACK_err state a_err, the node1 returns the NACK signal to the Master 21 and transfers an err packet to the node2. At this time, the node1 may register that the node1 is in the ACK_err state a_err in an err register.

Figure 26:
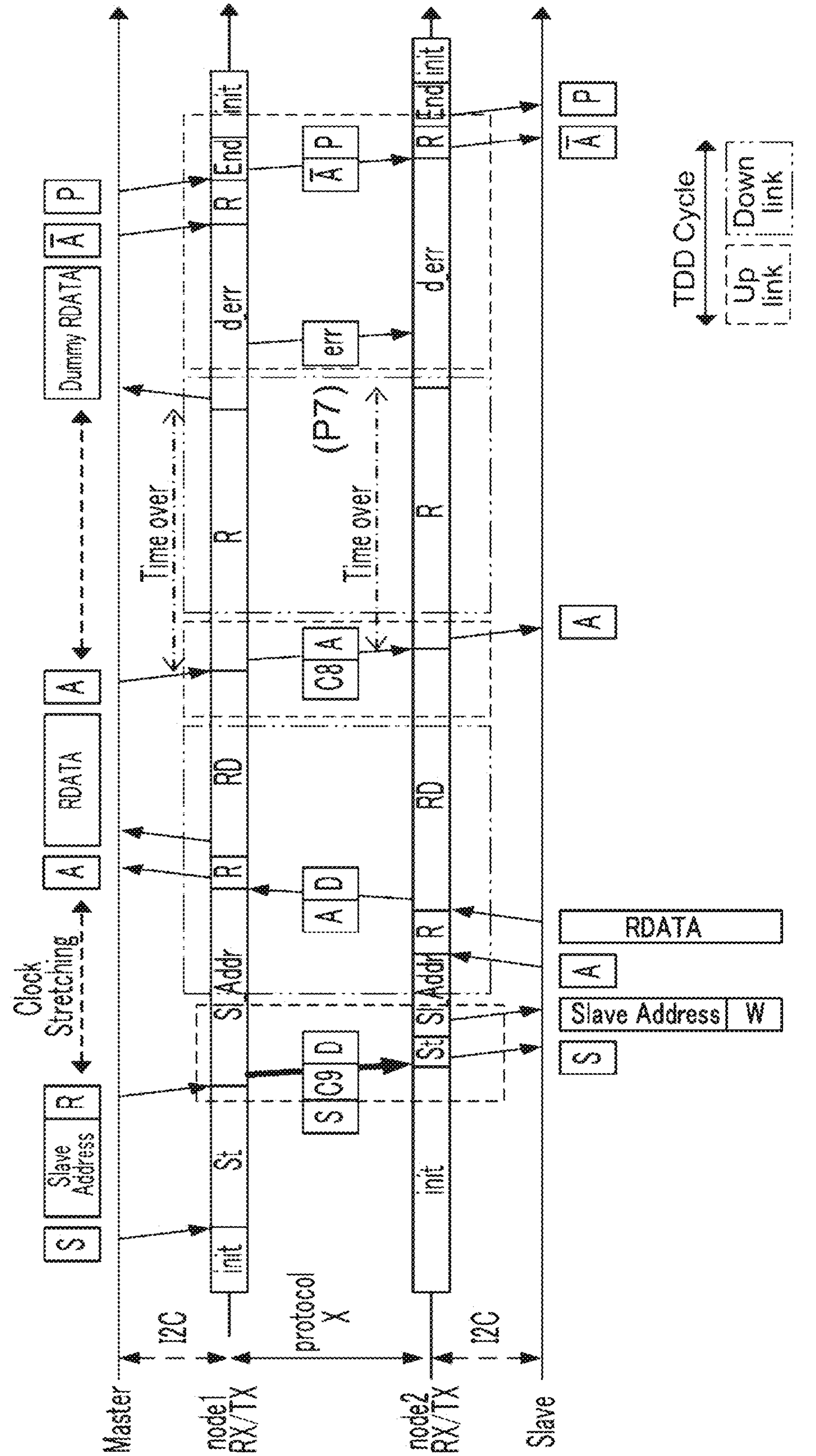
FIG. 26 is a timing chart of an Err operation 2 in the Byte I2C mode.

FIG. 26 is a timing chart of an Err operation 2 in the Byte I2C mode. The Err operation 2 is performed in a case where the RDATA from the Slave 22 does not arrive or in a case where a part of the RDATA is insufficient. In the case where the RDATA does not arrive from the Slave 22 to the node2 within a time limit, or in the case where a part of the RDATA is insufficient, it becomes timeout and the node1 and the node2 transition to a data_err state d_err. When transitioning to the data_err state d_err, the node1 returns dummy RDATA to the Master 21 and transfers the err packet to the node2. At this time, the node1 may register the data_err state d_err in the err register.

Since the Master 21 can grasp that the RDATA has arrived after the timeout, it is possible to determine whether or not the RDATA after the timeout is dummy data or normal data by reading the err register of the node1 as necessary.

The detailed operation of the Byte I2C mode has been described above. Next, a detailed operation of the Bulk I2C mode will be described.

(Detailed Operation in Bulk I2C Mode)

Figure 7:
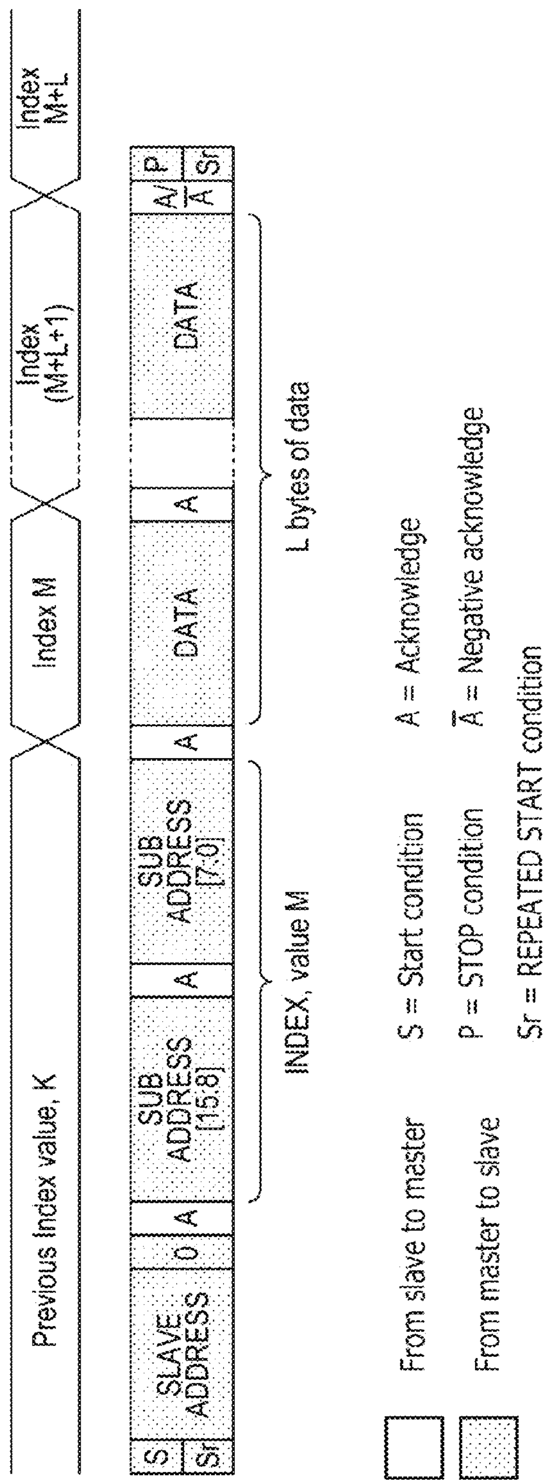
FIG. 7 is a diagram illustrating a protocol of I2C communication at the time of Random Write.

Hereinafter, a case where Random Write is performed from the Master 21 to the Slave 22 will be described. When performing Random Write to the Slave 22, the Master 21 first transmits a command set to the Master SerDes 7 by I2C communication. The protocol of the I2C communication at the time of Random Write is illustrated in FIG. 7 described above, and the Master 21 transmits the command set to the Master SerDes 7 in accordance with the protocol.

Figure 27:
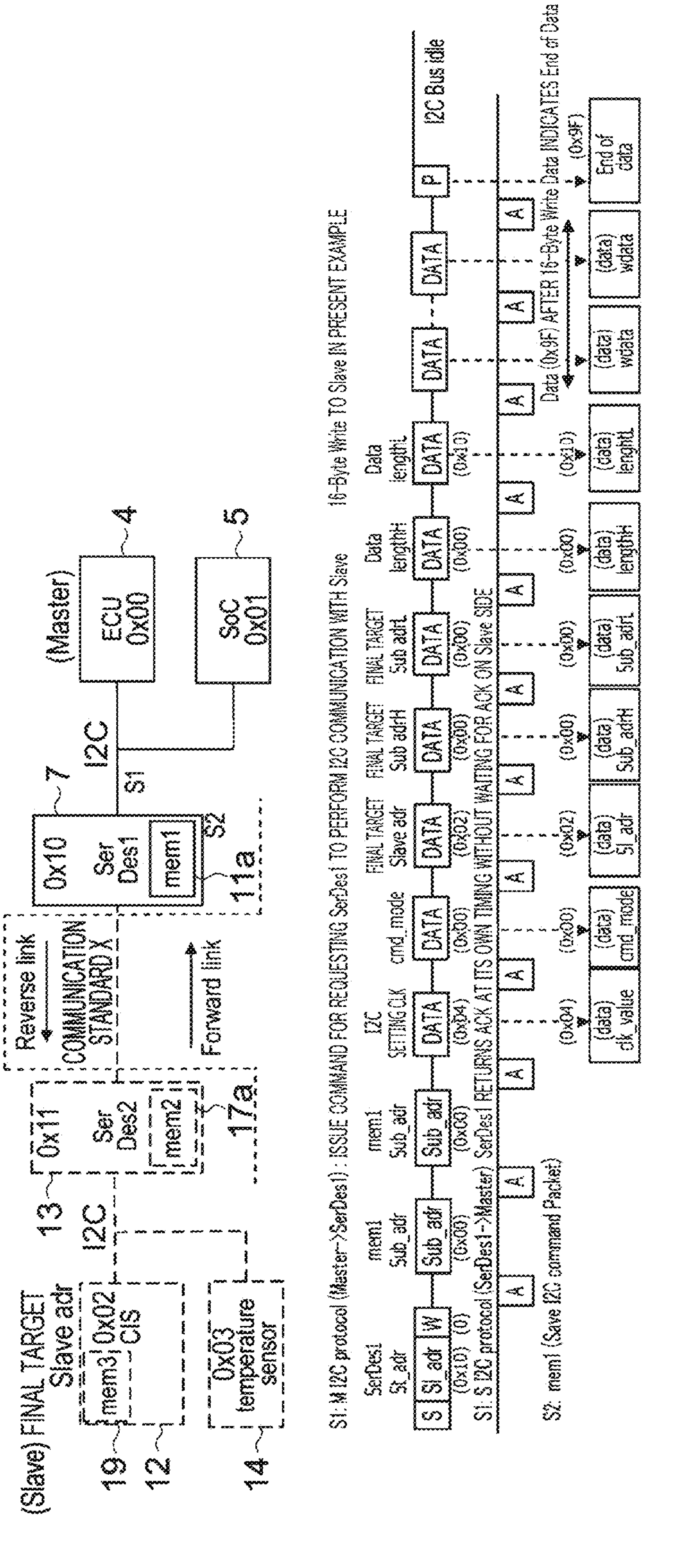
FIG. 27 is a diagram illustrating signals transmitted and received between the Master and the Master SerDes in the Bulk I2C mode.

FIG. 27 is a diagram illustrating signals transmitted and received between the Master 21 and the Master SerDes 7 in a case where the Random Write is performed from the Master 21 to the Slave 22 in the Bulk I2C mode. In the present specification, the signal of the I2C protocol from the Master 21 to the Master SerDes 7 is referred to as M I2C protocol. As illustrated in FIG. 27, the M I2C protocol includes S (START condition), SerDes1 St_adr, W, mem1 Sub_adr, mem1 Sub_adr, I2C setting CLK, Cmd_mode, final target Slave adr, final target Sub adrH, final target Sub adrL, Data lengthH, Data lengthL, Data×2, and P (STOP condition). Details of these pieces of information will be described below.

The data in the I2C protocol transmitted from the Master 21 is saved in table1 in mem1 of the Master SerDes 7. FIG. 28 is a table illustrating an example of data saved in table1 in mem1 in the Bulk I2C mode. In each data, CLK_value that is a setting value of an I2C setting clock CLK is stored in an address of mem1 indicated by Sub_Adr transmitted by the M I2C protocol, and thereafter, data transmitted by the M I2C protocol is stored in an incremented address of mem1. The CLK_value is 1-byte information indicating the SCL frequency as described above, and the Slave 22 performs the I2C communication with the Slave SerDes 13 at the operation frequency designated by CLK_value.

Cmd_mode of Sub_Adr [1] is 1-byte information indicating content of an instruction received by the Master SerDes 7 from the Master 21.

Slave_Adr of Sub_Adr [2] in table1 of FIG. 28 is 1-byte information indicating the address (for example, 0x02 in the case of the image sensor 12) of the Slave 22 to be written or read.

Sub_adrH of Sub_Adr [3] is upper 1-byte information of an address indicating which Sub_adr of mem 19 (mem 3) in the image sensor 12 is to be accessed or which Sub_adr of mem 20 in the temperature sensor 14 is to be accessed.

Sub_adrL of Sub_Adr [4] is lower 1-byte information of an address indicating which Sub_adr of mem 19 (mem 3) in the image sensor 12 is to be accessed or which Sub_adr of mem 20 in the temperature sensor 14 is to be accessed.

LengthH of Sub_Adr [5] is upper 1-byte information of a data length of WDATA (Data [N−2:7]). LengthL of Sub_Adr [6] is lower 1-byte information of the data length of WDATA (Data [N−2:7]).

WDATA of Sub_Adr [N−2:7] is data to be written to the Slave 22. One byte of data is stored for each bit of Sub_Adr.

When P (STOP condition) is received from the Master 21, 0x9F is written in the End of Data of Sub_Adr [N−1]. As a default, an initial value such as 0x00 is written.

Figure 29:
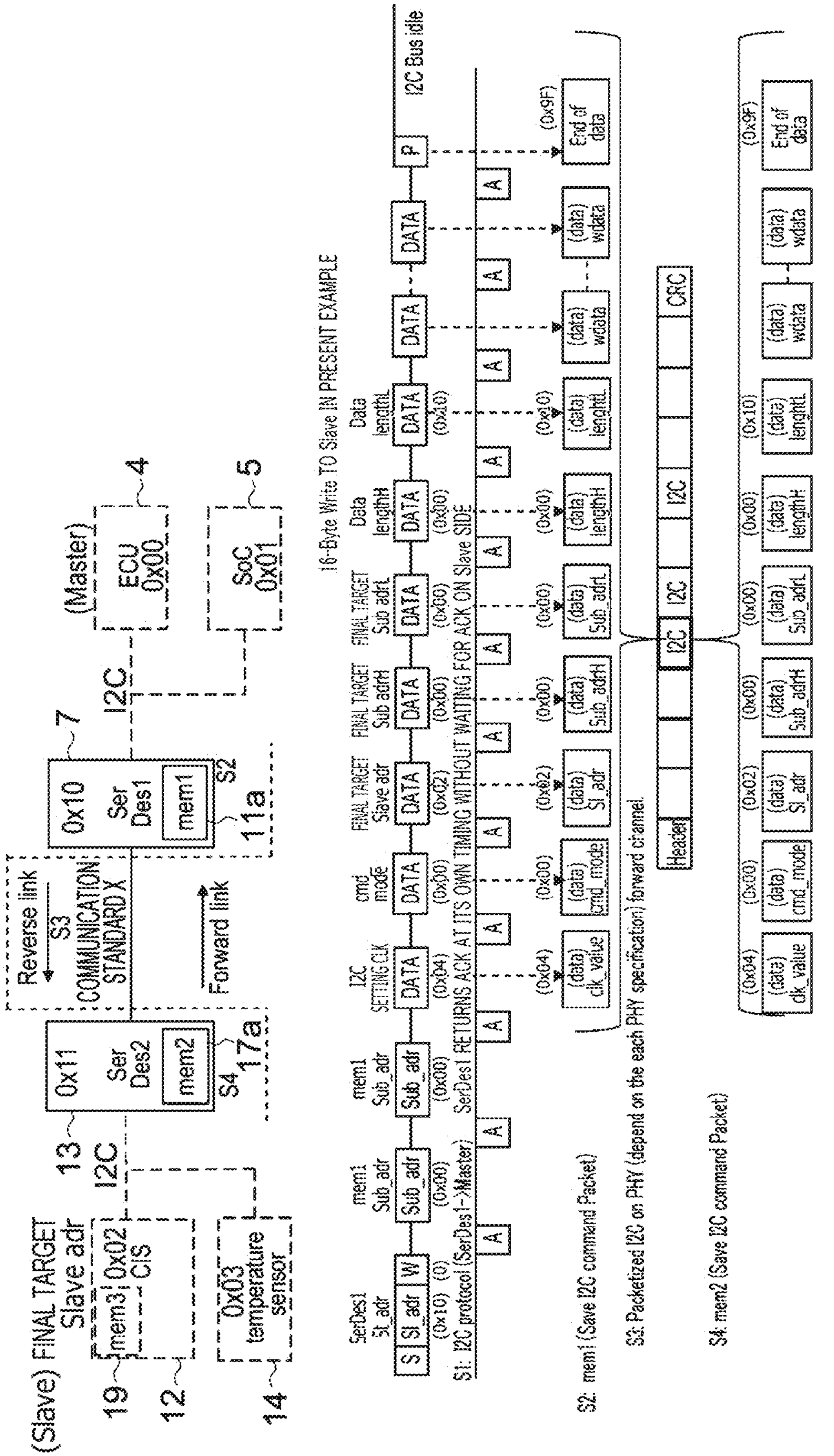
FIG. 29 is a diagram illustrating processing of transmitting a Random Write Command from the Master SerDes to the Slave SerDes in the Bulk I2C mode according to the communication standard X.

FIG. 29 is a diagram following FIG. 27 and illustrating processing of transmitting a Random Write Command from the Master SerDes 7 to the Slave SerDes 13 in the Bulk I2C mode according to the communication standard X. The I2C protocol and mem1 (Save I2C command Packet) (steps S1 and S2) in FIG. 29 are the same as those described in FIG. 27.

The Master SerDes 7 reads data in table1 in FIG. 28, performs protocol conversion for the data into a signal of the communication standard X protocol, and transmits the signal to the Slave SerDes 13 through a Packetized I2C on PHY (depend on the each PHY specification) forward channel (step S3).

In a case of Cmd_mode=0x00, "end determination for each End of data is set in"Cmd_mode [7]=0. Therefore, when receiving "End of data (0x9F)", the LINK 11 of the Master SerDes 7 writes "End of data (0x9F)" in table1 of FIG. 28, and reads table1 of FIG. 28 and transmits the table1 to the Slave SerDes 13 via Rv. Tx10.

In the case of Cmd_mode=0x80, at the stage where the End of data and cmd_done are written, the data of mem1 (table1 in FIG. 28) is collectively converted into the I2C command and transmitted to the Slave SerDes 13 via Rv.Tx10.

The Slave SerDes 13 extracts the I2C command packet from the received signal of the communication standard X protocol, and writes the I2C command packet into table3 in mem2. In FIG. 29, this is called mem2 (Save I2C command Packet) (step S4). FIG. 30 is a diagram illustrating an example of table3 in mem2 at the time of a Random Write operation in the Bulk I2C mode.

Information having the same content as table1 in FIG. 28 is written to table3.

The Slave SerDes 13 performs protocol conversion for received data of Reverse link, and restores original saved data of mem1 in mem2. The Slave SerDes 13 determines restoration end of the I2C command packet in the restoration of the End of data.

Figure 31:
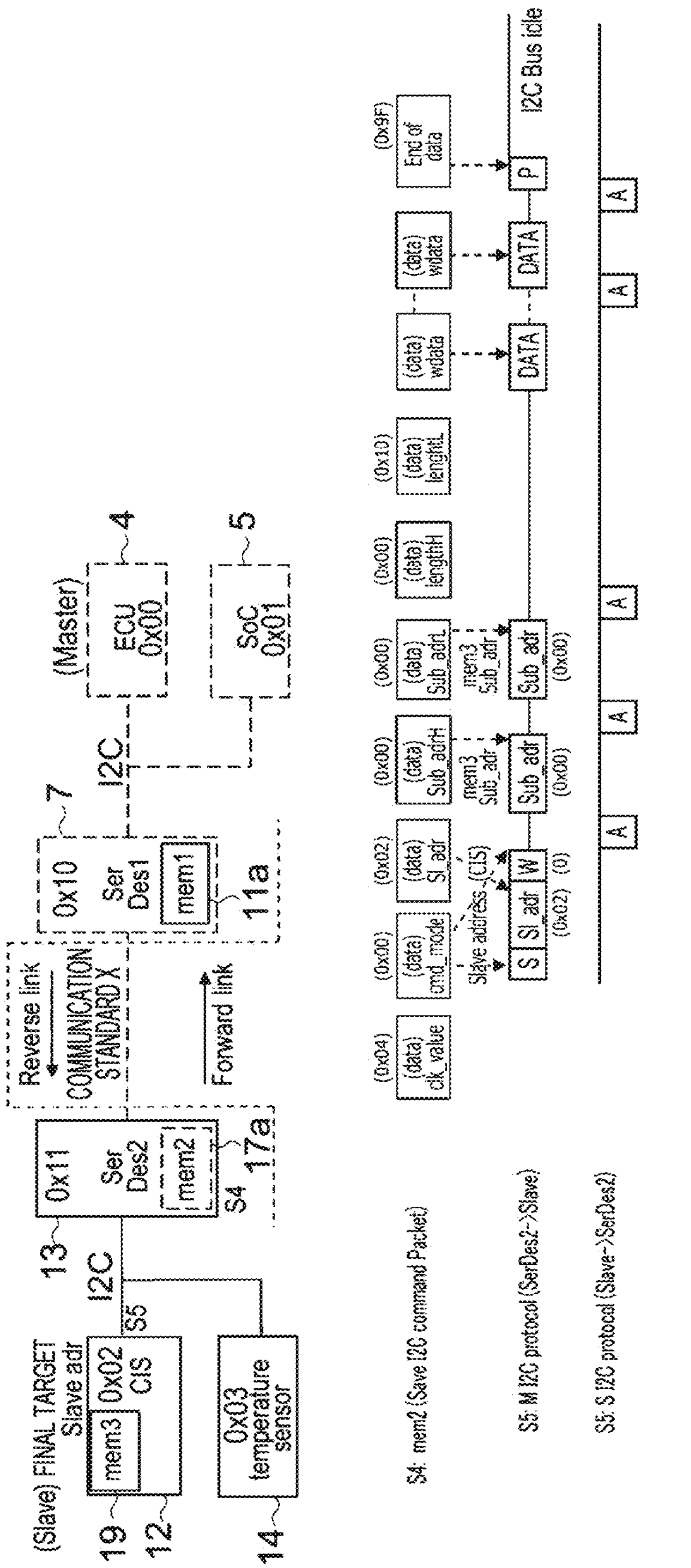
FIG. 31 is a diagram illustrating processing in which the Slave SerDes and the Slave transmit and receive data in the I2C communication in the Bulk I2C mode.
Figure 32:
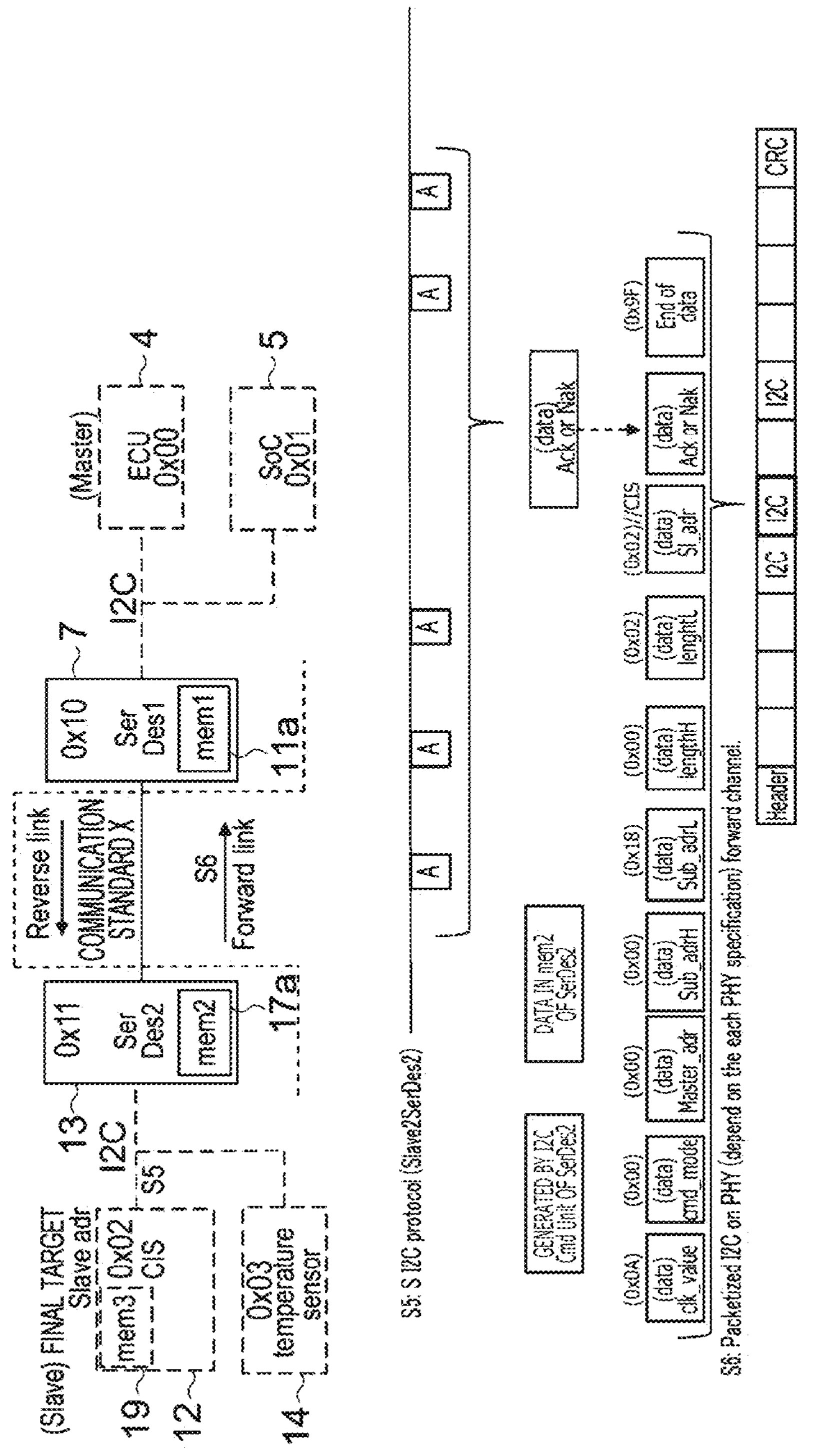
FIG. 32 is a diagram illustrating processing of returning the Random Write Command from the Slave SerDes to the Master SerDes with the communication protocol X in the Bulk I2C mode.

FIGS. 31 to 32 are diagrams following FIG. 29 and illustrating processing of transmitting data from the Slave SerDes 13 to the Slave 22 by the I2C communication. mem2 (Save I2C command Packet) (step S4) in FIGS. 31 and 32 has been described with reference to FIG. 29. FIG. 31 illustrates processing in which the Slave SerDes 13 and the Slave 22 transmit and receive data in the I2C communication in the Bulk I2C mode.

When the End of data is written in table3 in mem2 illustrated in FIG. 30, the Slave SerDes 13 reads the table3, converts the format into a signal of the I2C protocol, and transmits the signal to the Slave 22 via the I2C 13*a* in the M I2C protocol (step S5).

(data) Cmd_mode (0x00) issues S (START condition), and generates a W (Write) command or a R (Read) command according to the value of Cmd_mode [0] after the next Sl_adr is issued.

(data) Sl_adr (0x02) indicates that "0x02" is designated as the above-described Sl_adr. Since "0x02", the image sensor 12 has been selected.

(data) Sub_adrH (0x00) indicates that "0x00" is designated as a high-order bit of the address of mem3 (the target to be finally accessed) in the image sensor 12. (data) Sub_adrL (0x00) indicates that "0x00" is designated as a low-order bit of the address of mem3 (the target to be finally accessed) in the image sensor 12. (data) WDATA×2 indicates data of 16 bytes.

The Slave 22 sequentially returns the ACK signal indicating that the signal has been normally received to the Slave SerDes 13 in the S I2C protocol (step S5).

Note that, while data is transmitted and received from the Slave SerDes 13 to the Slave 22 by the I2C communication, information similar to that in FIG. 30 is saved in table3 in mem2.

The Slave SerDes 13 writes ACK in a case where Cmd_mode [6]=0 and all the signals returned from the Slave 22 are the ACK signals, and writes NACK in Sub_Adr=N in table3 in a case where there is one or more NACK signals.

The Slave SerDes 13 writes ACK in Sub_Adr=N in table3 in a case where Cmd_mode [6]=1 and all the signals returned from the Slave 22 are the ACK signals, and performs rewrite in a case where there is one or more NACK signals. In a case where the NACK signal is given again in the second time, NACK is written in Sub_Adr=N in table3. FIG. 33 illustrates a storage area state of mem2 before release of the storage area for the Random Write Command in the Bulk I2C mode, in which the I2C communication between the Slave SerDes 13 and the Slave 22 has been completed and ACK or NACK has been written in the Sub_Adr=N.

As a method of generating ACK or NACK to be written to Sub_Adr=N in table3 in mem2, for example, a logical product of the ACK signal and the NACK signal returned from the Slave 22 may be obtained.

FIG. 32 is a diagram following FIG. 31 and illustrating processing of performing a reply to the Random Write Command from the Slave SerDes 13 to the Master SerDes 7 with the communication protocol X in the Bulk I2C mode. The S I2C protocol (step S5) in FIG. 32 has been described with reference to FIG. 31.

The Slave SerDes 13 performs protocol conversion for an I2C communication result with the Slave 22 into a signal of the communication standard X protocol, and transmits the signal to the Master SerDes 7 through the Packetized I2C on PHY (depend on the each PHY specification) forward channel (step S6). When the Slave SerDes 13 writes ACK or NACK in Sub_Adr=N in table3 in mem2, the Slave SerDes 13 reads table3 (0 to N in Sub_Adr) and transmits necessary information (in the present embodiment, Data [7:0] in a case where Sub_Adr is 2 and N, and Cmd_ID is also included in a case where Cmd_mode is extended to 2 bytes) to the Master SerDes 7. When the transmission is completed, the Slave SerDes 13 releases the storage area of mem2 illustrated in FIG. 33.

Here, since mem1 and mem2 occupy the same memory area (Sub_Adr=0 to N−1), the Slave SerDes 13 knows Sub_Adr to be written next to mem1 (Sub_Adr that has a space in mem2 and in which ACK/NACK has been written). Furthermore, the Slave SerDes 13 understands that it is necessary to return 2 bytes (the I2C communication result with Slave adr that has performed the I2C communication) to the Master SerDes 7 in a case where the Slave SerDes itself has performed write in the Slave 22.

Figure 34:
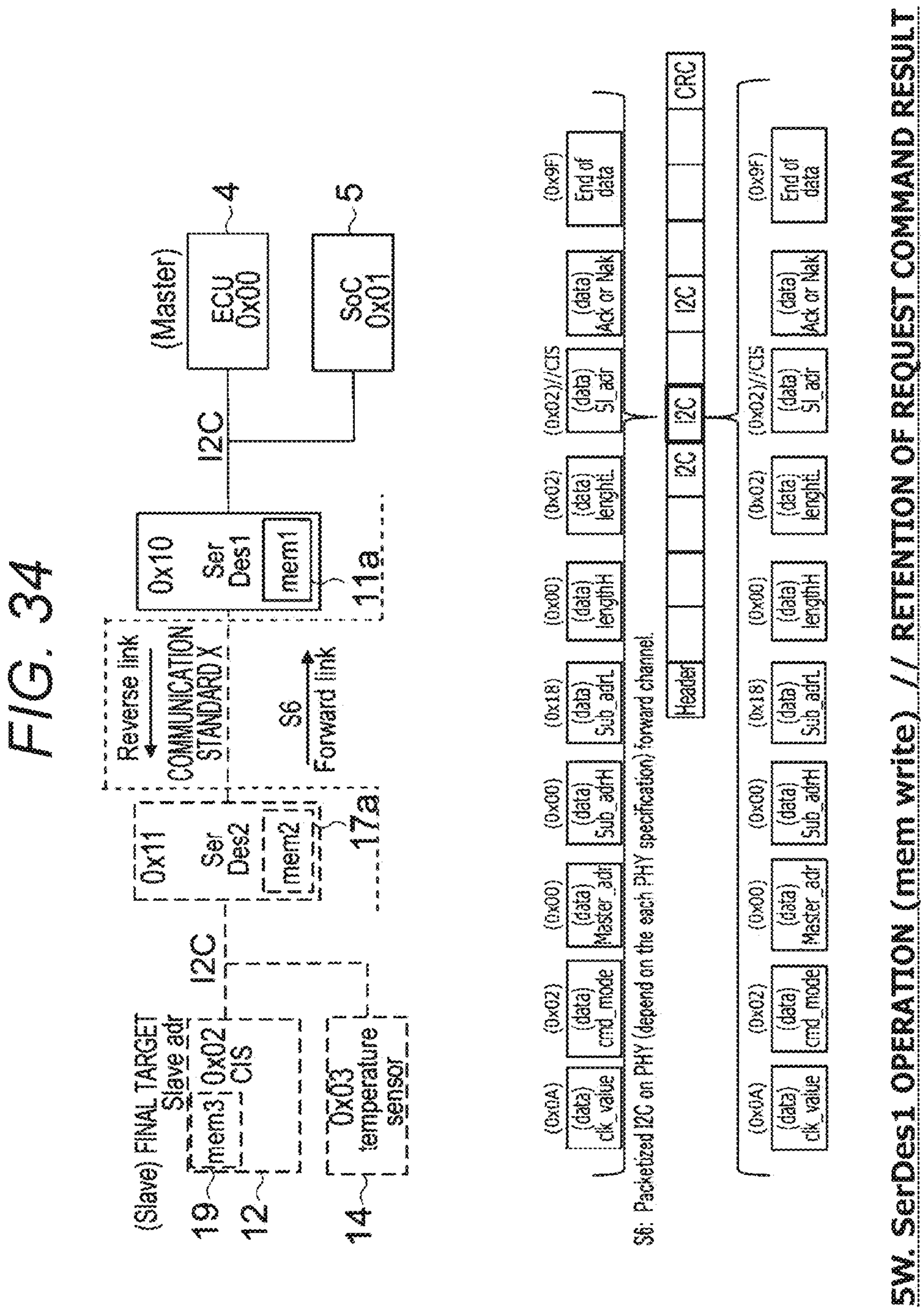
FIG. 34 is a diagram illustrating an operation of the Master SerDes in the Bulk I2C mode.

FIG. 34 is a diagram following FIG. 32 and illustrating the operation of the Master SerDes 7 in the Bulk I2C mode. The Packetized I2C on PHY (depend on the each PHY specification) forward channel (step S6) in FIG. 34 has been described with reference to FIG. 32. The Master SerDes 7 extracts the I2C command packet from the signal of the communication standard X protocol received from the Slave SerDes 13, and writes the I2C command packet in N to N+9 of Sub_Adr in table1 in mem1.

FIG. 35 is a diagram illustrating table1 in mem1 after reception of reply data from the Slave SerDes to the Random Write Command in the Bulk I2C mode. The I2C command packet generated by the I2C Cmd Unit in the Slave SerDes 13 in FIG. 32 is saved in sub_Adr N to N+6 and N+9 in table1. Furthermore, sub_Adr N+7 and N+8 in table1 in FIG. 35 have content obtained by reading and transferring Slave adr of sub_Adr (2) and ACK or NACK of sub_Adr (N) in mem2.

Figure 36:
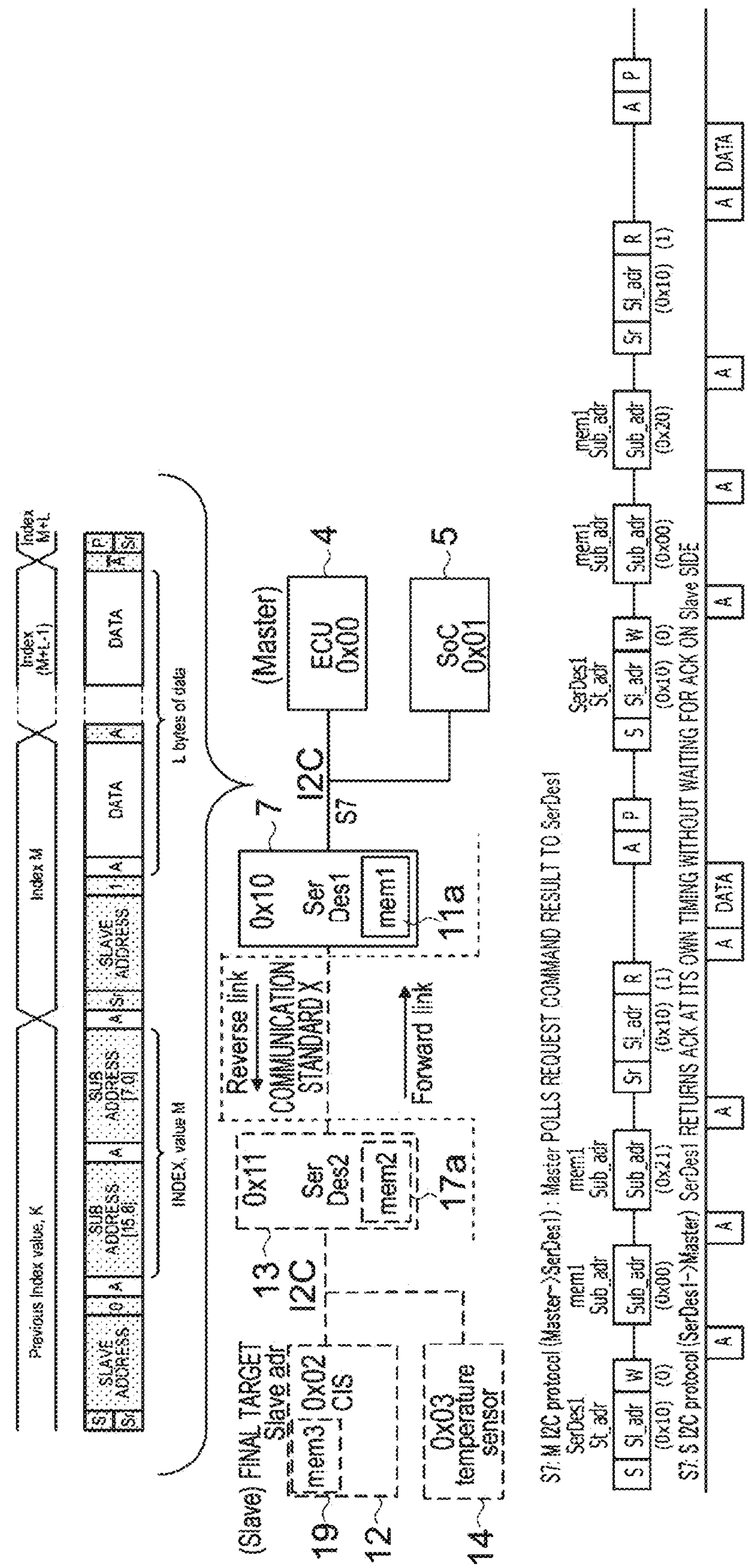
FIG. 36 is a diagram illustrating processing in a case where the Master performs polling for the Master SerDes for the Random Write Command in the Bulk I2C mode and reads an execution result.

FIG. 36 is a diagram illustrating processing in a case where the Master 21 performs polling for the Master SerDes 7 for the Random Write Command in the Bulk I2C mode and reads an execution result. The Master 21 polls a request command result to the Master SerDes 7 in the M I2C protocol (step S7). The Master 21 polls Sub_Adr=N+9 in table1, reads Sub_Adr=N+8 in a case of 0x9F, and determines either ACK or NACK.

For example, if the "16-byte write to the Slave 22" requested to the Master SerDes 7 has been completed, End of Data (0x9F) and ACK (0x81) as a result thereof can be read. Note that, in the present example, polling is determined by reading 1 byte and seeing the result of End of Data, and reading ACK or NACK by reading 1 byte again. However, it may also be possible to read 2 bytes at a time and determine the polling result and the I2C communication result to the Slave 22. In a case where NACK is returned, the Master 21 can check whether or not the corresponding Slave 22 has transmitted NACK by reading Slave adr of Sub_adr (N+7).

FIG. 35 is a table illustrating an example of saved data in mem1. Since the Master 21 itself issues the write command to the Master SerDes 7, the Master 21 knows an access point of mem1 of the Master SerDes 7. Similarly, since the Master SerDes 7 itself stores data in mem1, the Master SerDes 7 knows the access point of mem1. For example, in a case where data is written in the Slave 22 and a reply thereto is 2B, Header is 7 bytes+2 bytes+EoD (1 byte)=10 bytes, and next Sub_Adr is N+10=34.

Figure 37:
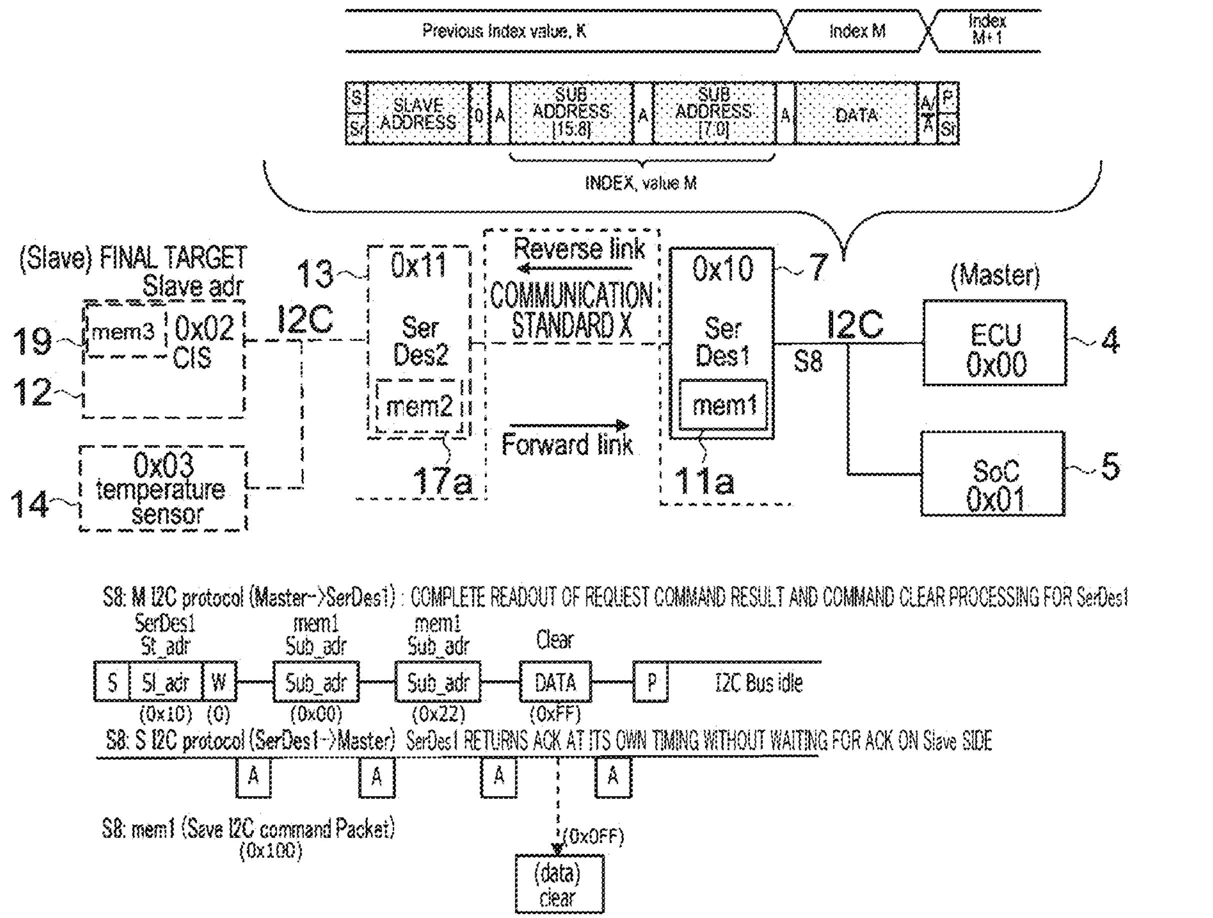
FIG. 37 is a diagram illustrating transmission of a signal for releasing a storage area of mem1 from the Master to the Master SerDes as Random Write operation termination processing in the Bulk I2C mode.

FIG. 37 is a diagram illustrating transmission of a signal for releasing the storage area of mem1 from the Master 21 to the Master SerDes 7 as Random Write operation termination processing in the Bulk I2C mode. FIG. 38 is a diagram illustrating saved data in mem1 before the storage area for the Random Write Command is released. The Master 21 performs M I2C protocol processing, S I2C protocol processing, and mem1 (Save I2C command packet) processing to read Sub_Adr=N+8 in table1, and writes Clear in Sub_Adr=N+10 in table1 in mem1 as illustrated in FIG. 38 in a case of ACK (step S8). When this Clear is written to the Master SerDes 7, the memory area of table1 in mem1 is released.

When 0xFF is written to Sub_adr (N+10) in mem1, the Master SerDes 7 releases the used storage area of mem1 as termination processing of the request command.

Alternatively, the storage area of mem1 may be released according to a write command for initializing the memory area used by the Master 21.

Figure 39:
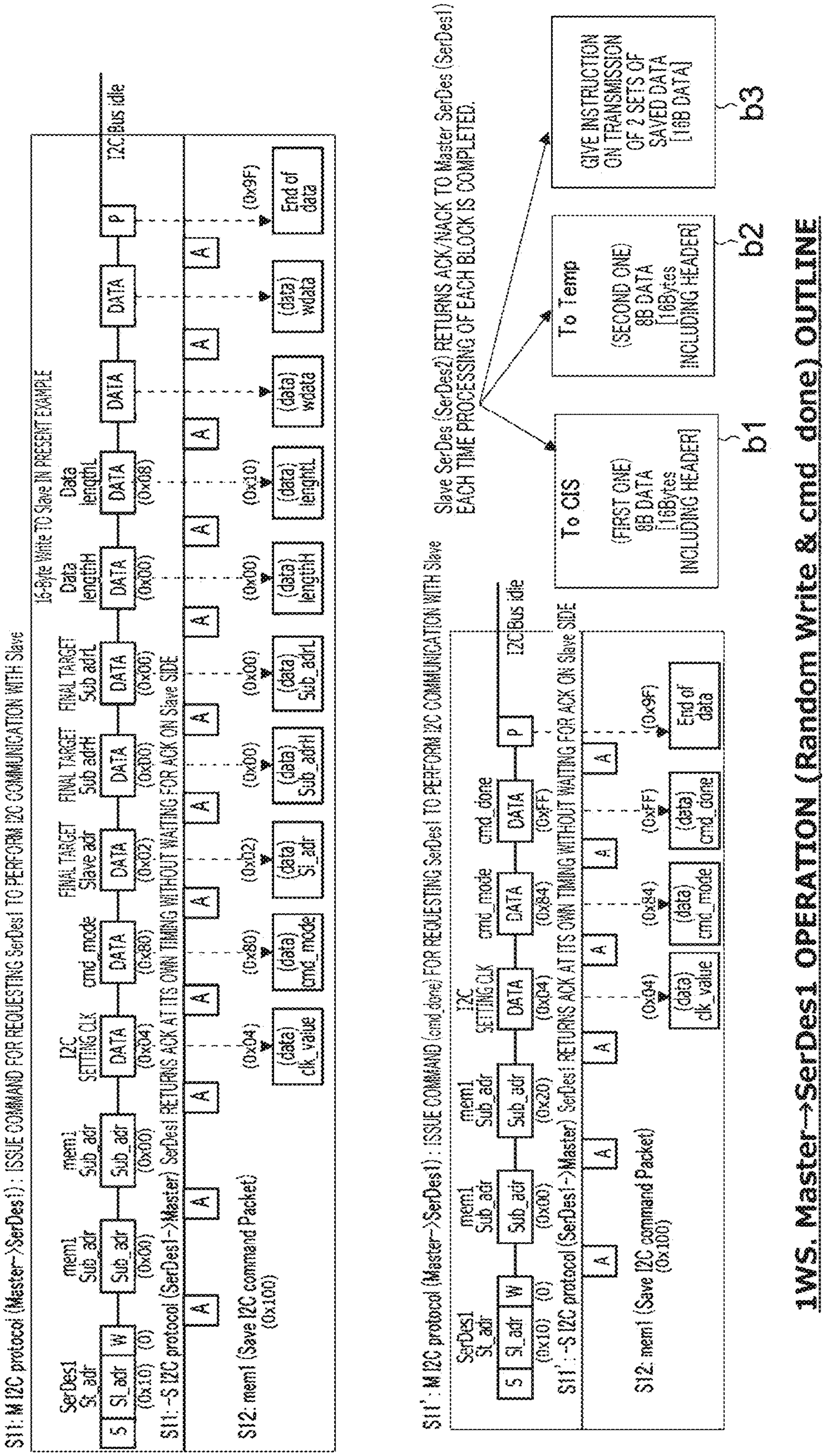
FIG. 39 is a diagram illustrating batch command transmission with Cmd_mode [7]=1 in the Bulk I2C mode.
Figure 40:
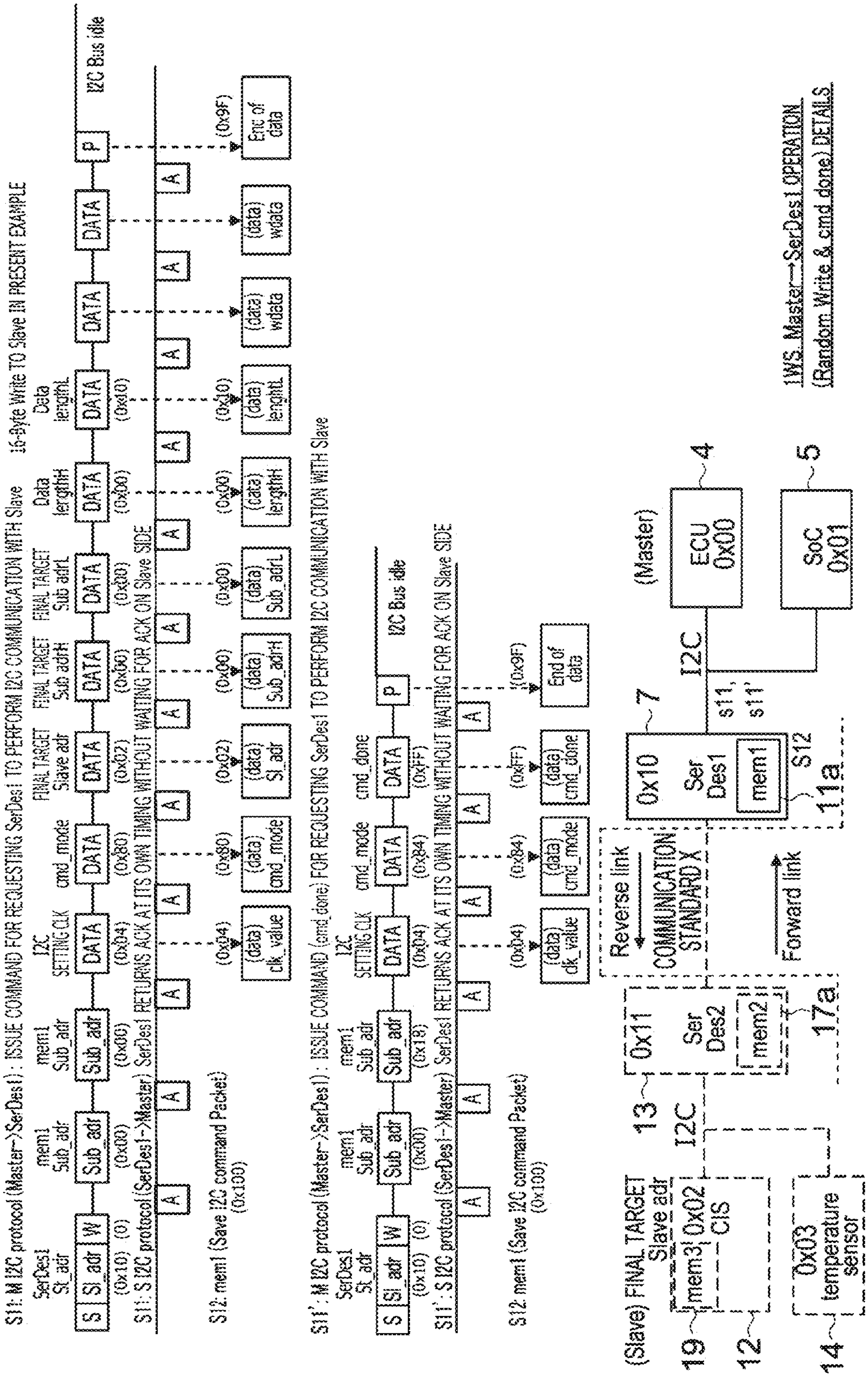
FIG. 40 is a diagram following FIG. 39.
Figure 41:
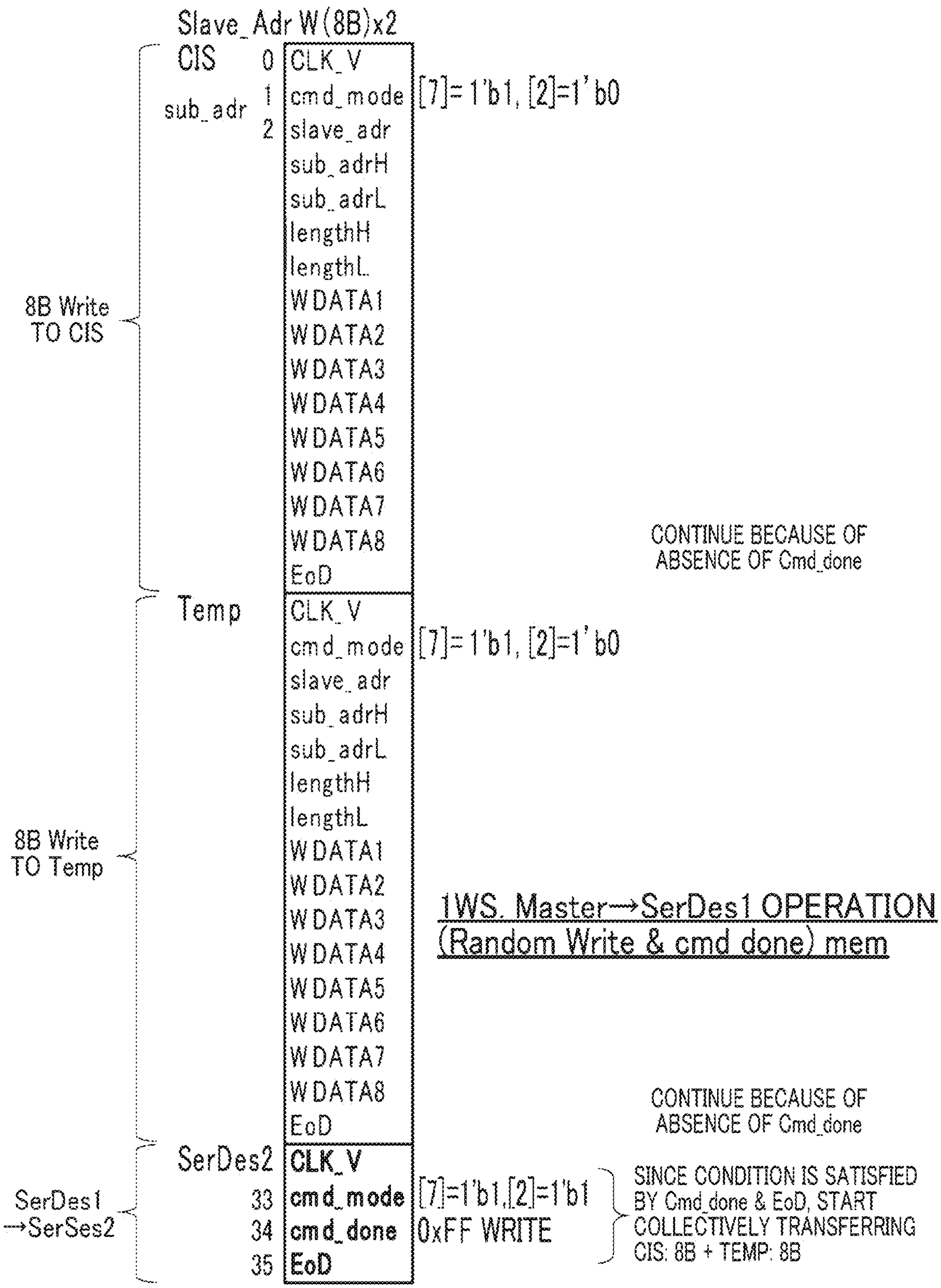
FIG. 41 is a diagram illustrating details of saved data of table1 in mem1 at the time of batch command transmission with Cmd_mode [7]=1 in the Bulk I2C mode.

FIGS. 39 to 41 are diagrams illustrating an I2C command batch transmission operation. FIGS. 39 and 40 are diagrams illustrating batch command transmission with Cmd_mode [7]=1 in the Bulk I2C mode. FIG. 41 is a diagram illustrating details of saved data of table1 in mem1 at the time of batch command transmission with Cmd_mode [7]=1 in the Bulk I2C mode. The I2C command batch transmission operation is a write operation in a case of Cmd_mode [2:0]=000 and Cmd_mode [7]=1. Specifically, a case where the Master 21 collectively writes data of 8 bytes to each of the image sensor 12 (Sl_adr=0x02) and the temperature sensor 14 (Sl_adr=0x03) is illustrated.

Block b1 in FIG. 39 indicates an 8-byte data write operation for the image sensor 12 (Sl_adr=0x02), and block b2 indicates an 8-byte data write operation for the temperature sensor 14 (Sl_adr=0x03). Block b3 indicates the end of the batch operation by cmd_done and P (STOP condition).

More specifically, as illustrated in FIGS. 39 and 40, first, in the operation of b1, the Master 21 issues a command requesting the I2C communication with the Slave 22 to the Master SerDes 7 in the M I2C protocol (step S11). When receiving the data from the Master 21, the Master SerDes 7 returns ACK at its own timing according to the S I2C protocol (step S11).

Since this request command indicates the I2C command batch operation of Cmd_mode [2:0]=000 and Cmd_mode [7]=1, even if End of Data is saved in mem1, transfer to Slave SerDes 13 is not started. The subsequent operation of b2 is the same except that Slave_adr of b1 is changed to the temperature sensor 14 (Sl_adr=0x03). The last b3 indicates that Cmd_code [2]=1 is a special code, and the following Data indicates the special code. In this example, by continuously receiving special cmd_done (0xFF) indicating the end of the command and STOP condition (step S12), the Master SerDes 7 collectively transmits the received data (FIG. 41) saved in mem1 to the Slave SerDes 13 as the I2C command batch transmission.

Note that, in the present embodiment, in a case where the Master 21 sets Cmd_mode [7]=1, Cmd_mode [7]=0 should not be set until 0xFF is subsequently written to cmd_done.

FIGS. 42 to 52 illustrate a Random Read operation (Read operation in the case of Cmd_mode [3:0]=0001 and [7]=0). The Random Read operation is substantially different from the Random Write operation in the following points.

Figure 44:
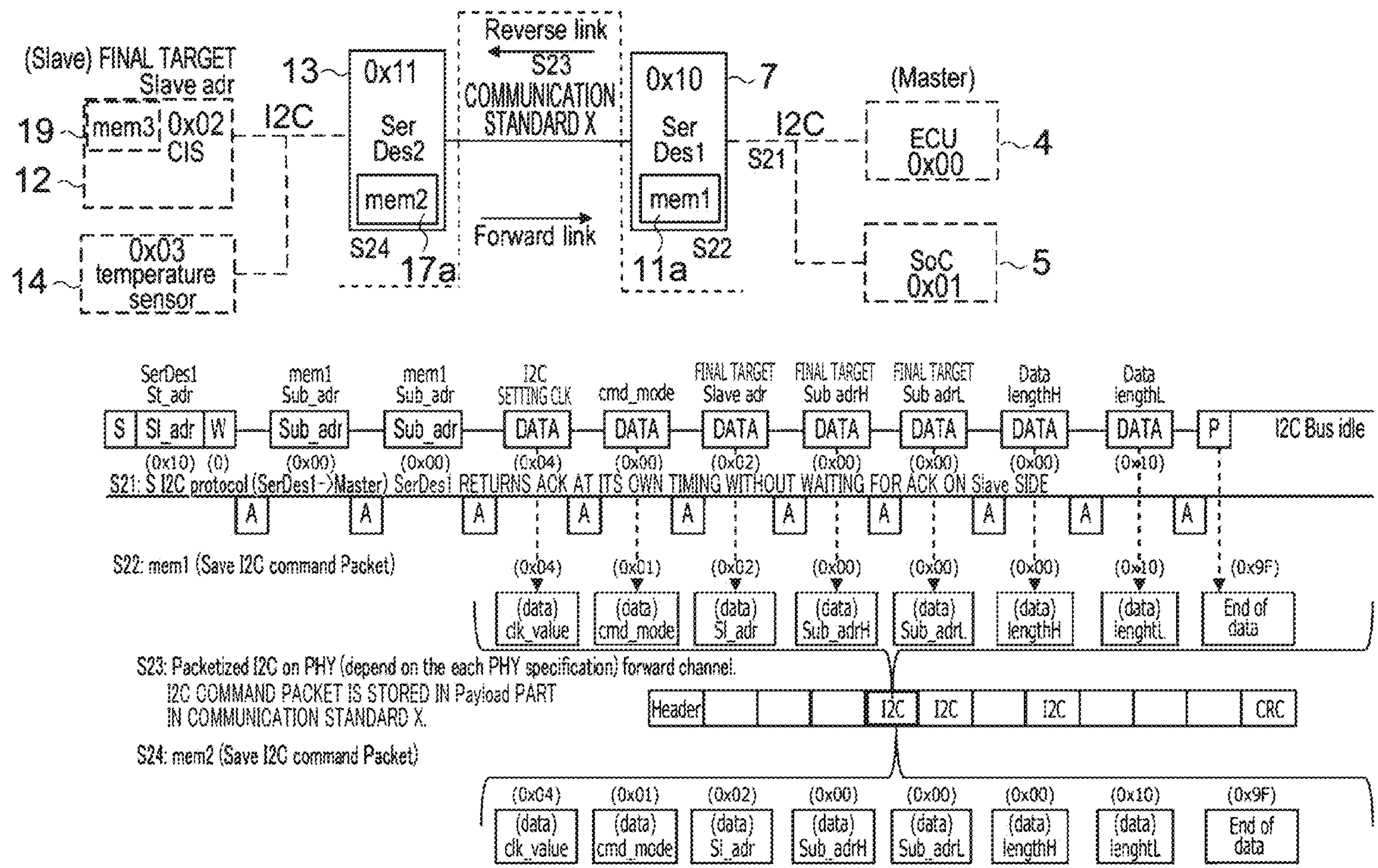
FIG. 44 is a diagram illustrating processing of transmitting a Random Read command from the Master SerDes to the Slave SerDes with the communication protocol X in the Bulk I2C mode.

In the Read operation, as illustrated in FIGS. 42 to 45, first, the Master 21 writes a Read request to the Master SerDes 7 (FIGS. 42 to 43), and the Master SerDes 7 writes the Read request in the Slave SerDes 13 (FIGS. 44 to 45).

Figure 46A:
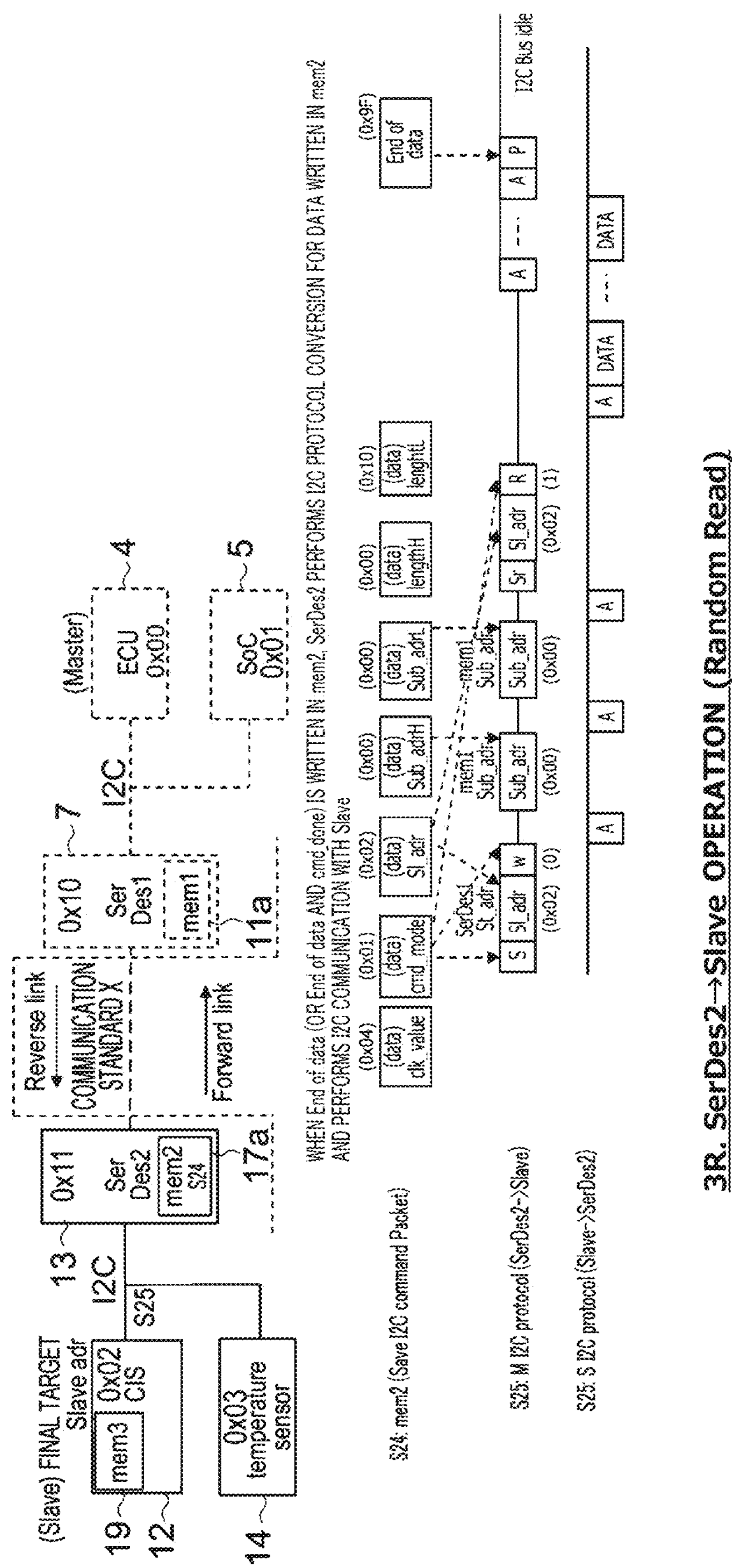
FIG. 46A is a diagram illustrating processing of transmitting and receiving the random read command from the Slave SerDes to the Slave in the Bulk I2C mode.

Thereafter, as illustrated in the processing of the M I2C protocol in step S25 in FIGS. 46A and 47, after writing that the processing target is mem3 of the image sensor 12 with "S", "SL_adr", "W", and "Sub_adr", read is performed from the processing target with "Sr", "SL_adr", and "R".

Figure 42:
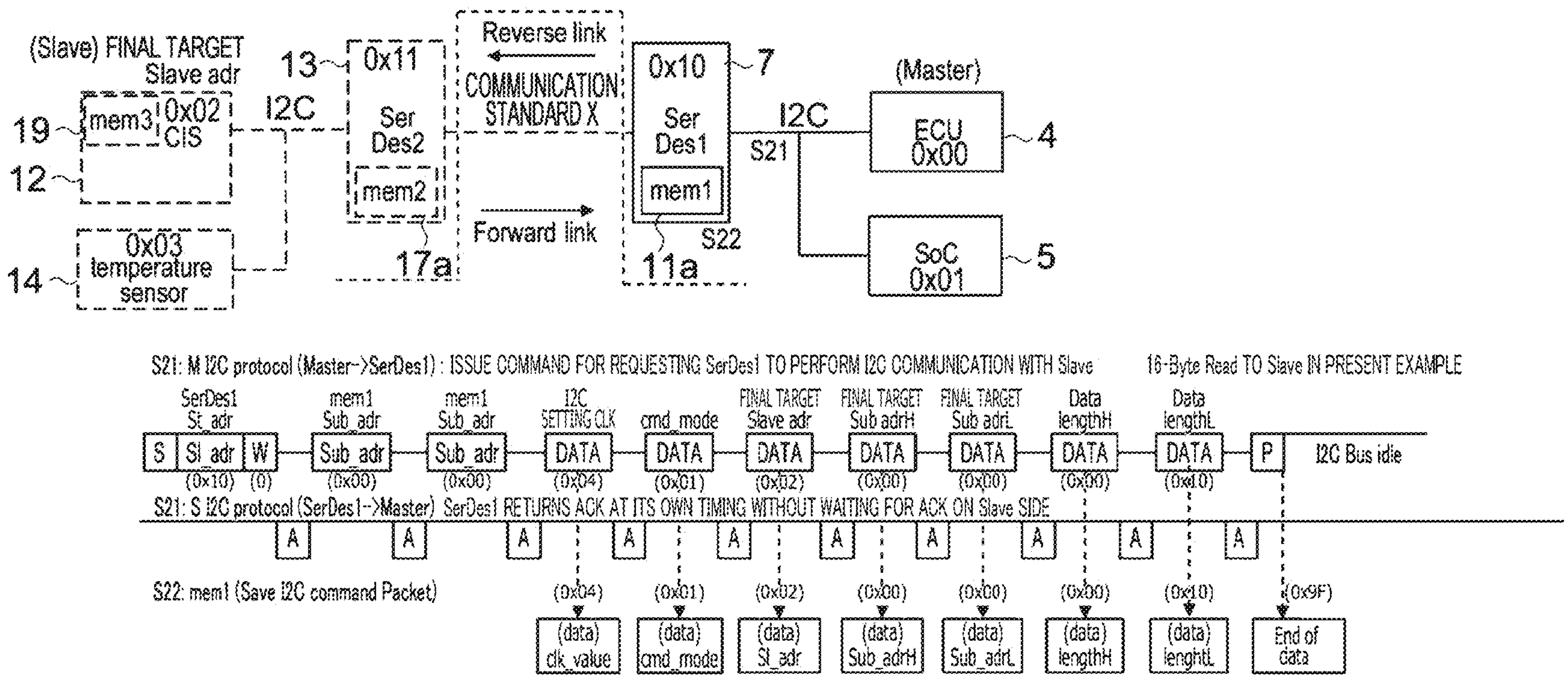
FIG. 42 is a diagram illustrating a Random Read operation in the Bulk I2C mode.

Hereinafter, a processing procedure of Random Read will be sequentially described with reference to FIGS. 42 to 52. FIG. 42 illustrates a transmission procedure of the I2C command packet from the Master 21 to the Master SerDes 7 in the Bulk I2C mode. First, as illustrated in step S21 of FIG. 42, processing of the M I2C protocol is performed. Here, the Master 21 issues, to the Master SerDes 7, a command to request the I2C communication with the Slave 22. The command set transmitted from the Master 21 includes SerDes1 St_adr, mem1 Sub_adr, mem1 Sub_adr, I2C setting CLK, Cmd_mode, final target Slave adr, final target Sub_adrH, final target Sub_adr, Data lengthH, Data lengthL, and P (STOP condition).

Every time receiving an information unit from the Master 21, the Master SerDes 7 returns the ACK signal to the Master 21 according to the S I2C protocol (step S21). Furthermore, the Master SerDes 7 also stores the received I2C command packet in mem1 (step S22). FIG. 43 is a diagram illustrating saved data of table1 in mem1 at the time of the Random Read operation in the Bulk I2C mode. As illustrated in FIG. 43, (data) CLK_value, (data) Cmd_mode, (data) Sl_adr, (data) Sub_adrH, (data) Sub_adrL, (data) length, (data) lengthL, and End of data are stored in mem1.

FIG. 44 is a diagram following FIG. 42 and illustrating processing of transmitting the Random Read command from the Master SerDes 7 to the Slave SerDes 13 with the communication protocol X in the Bulk I2C mode. The Master SerDes 7 performs protocol conversion for the data in mem1 through the Packetized I2C on PHY (depend on the each PHY specification) forward channel and transmits the converted data to the Slave SerDes 13 (step S23). More specifically, when the End of data is stored in mem1 in Cmd_mode=0x00, I2C command conversion is collectively performed for the data in mem1, and the converted data is transmitted to the Slave SerDes 13 through the reserve link. Meanwhile, when the End of data is stored in mem1 and cmd_done is written in Cmd_mode=0x10, the I2C command conversion is collectively performed for the data in mem1, and the converted data is transmitted to the Slave SerDes 13 by a reserve link. The Slave SerDes 13 performs the protocol conversion for the received data of the reserve link, and saves the original saved data of mem1 in mem2 (step S24). The Slave SerDes 13 determines that the restoration of the I2C command packet has ended at the stage where the End of data is restored. FIG. 45 is a table illustrating an example of the saved data in mem2 at the time of the Random Read operation in the Bulk I2C mode.

FIG. 46A is a diagram following FIG. 44 and illustrating processing of transmitting a random read command from the Slave SerDes 13 to the Slave 22 in the Bulk I2C mode. The Slave SerDes 13 transmits the I2C command packet to the Slave 22 according to the M I2C protocol (step S25). The Slave 22 returns the ACK signal to the Slave SerDes 13 according to the S I2C protocol for each received information unit, and sequentially transmits RDATA to the Slave SerDes 13 from the address designated by Sub_adrH and Sub_adrL. FIG. 47 is a diagram illustrating saved data of table3 in mem2 after the Random Read operation in the Bulk I2C mode. As illustrated in FIG. 47, the Slave SerDes 13 transmits the ACK signal indicating that RDATA has been received to the Slave 22 for each byte, and stores the RDATA from the Slave 22 in mem2.

Figure 46B:
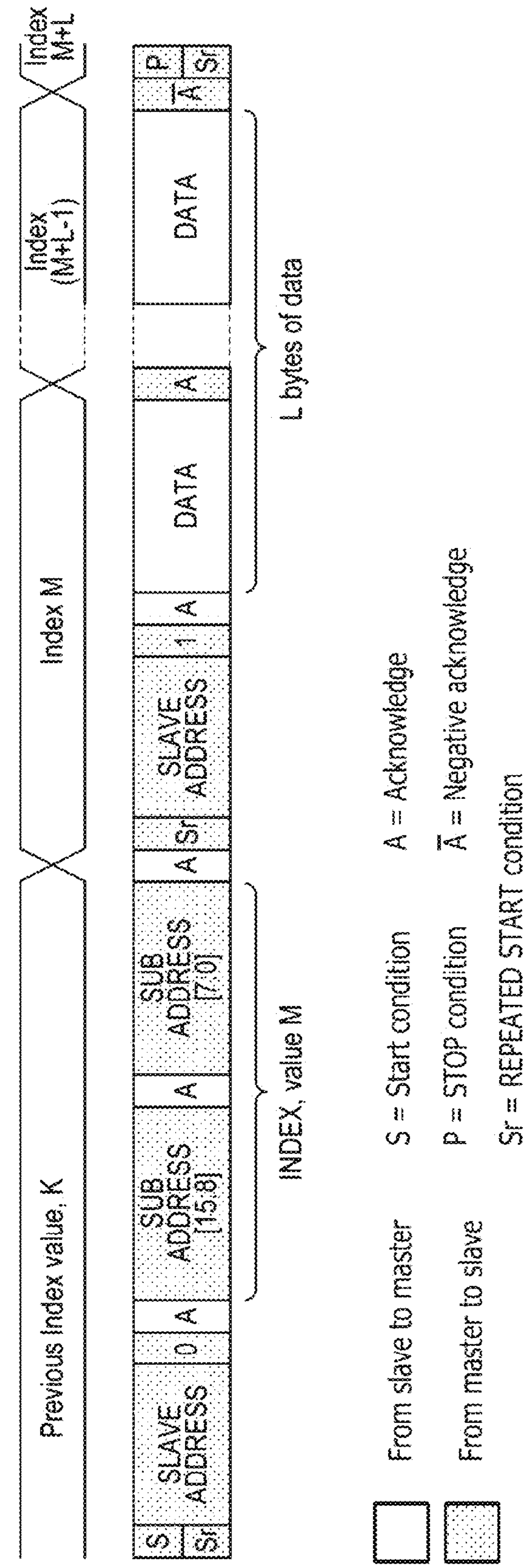
FIG. 46B is a diagram illustrating the I2C communication protocol at the time of the Random Read operation.

It can be seen that the Slave SerDes 13 and the Slave 22 in FIG. 46A perform communication according to the protocol conforming to the I2C communication protocol at the time of the Random Read operation illustrated in FIG. 46B.

Figure 48:
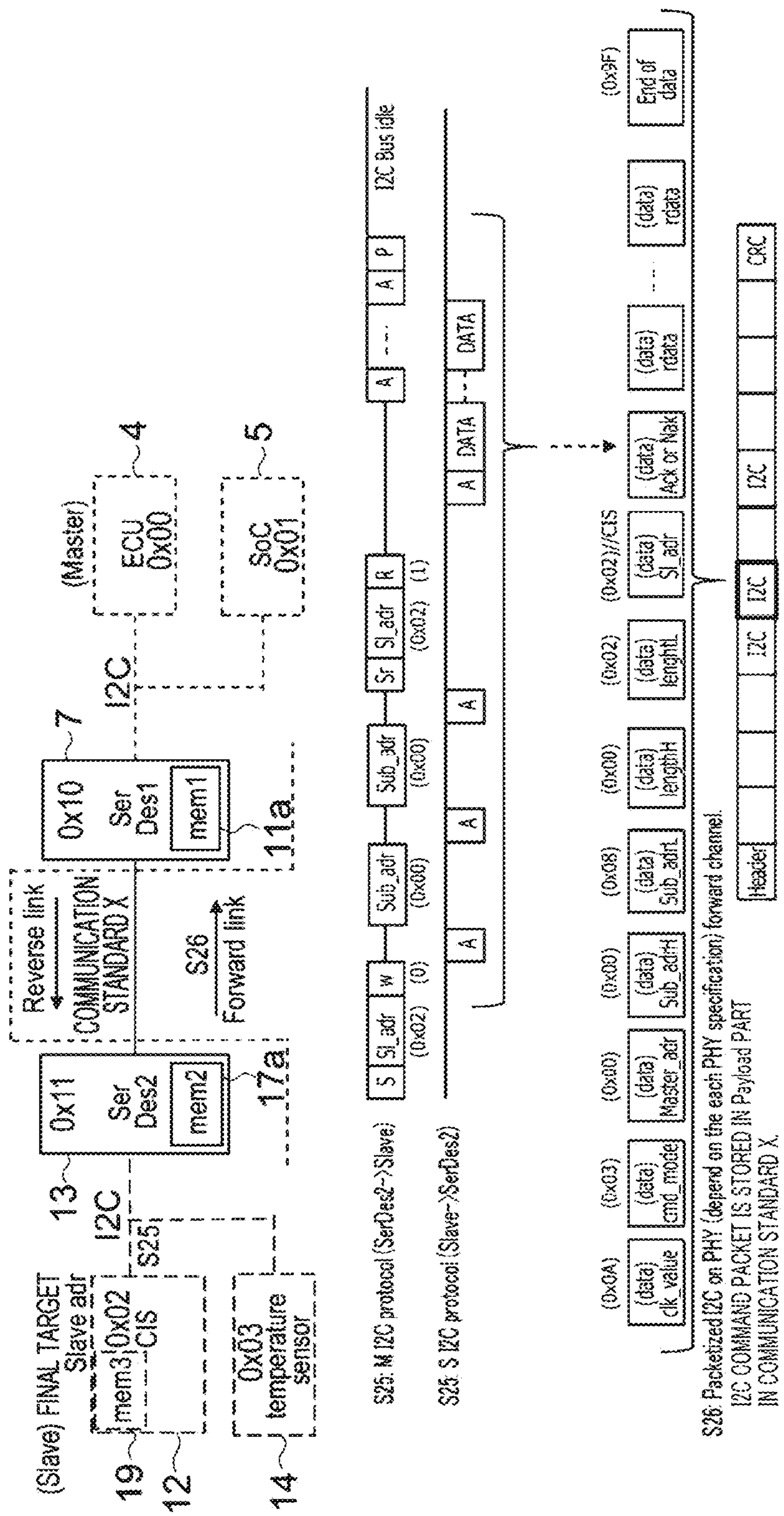
FIG. 48 is a diagram illustrating return processing for a Read command from the Slave SerDes to the Master SerDes in the Bulk I2C mode according to the communication standard X.

FIG. 48 is a diagram following FIG. 46 and illustrating processing of returning the Read command from the Slave SerDes 13 to the Master SerDes 7 in the Bulk I2C mode according to the communication standard X. The Slave SerDes 13 transmits the RDATA via the Packetized I2C on PHY (depend on the each PHY specification) forward channel (step S26). More specifically, the Slave SerDes 13 converts the I2C communication result (RDATA, ACK) with the Slave 22+End of data, and transmits a conversion result to the Master SerDes 7 in a forward link. FIG. 47 illustrates saved data of table3 in mem2 after the Random Read operation.

Figure 49:
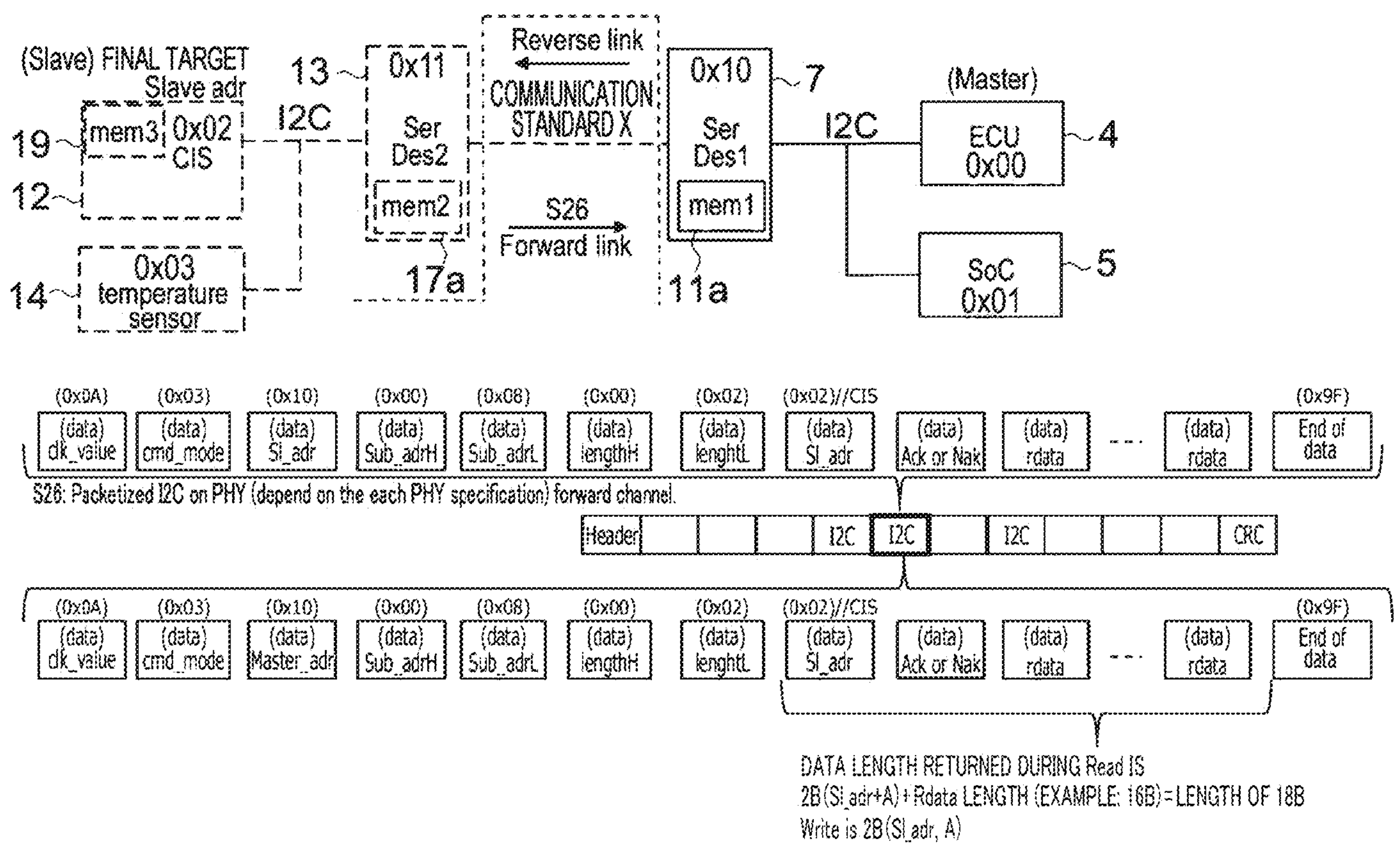
FIG. 49 is a diagram illustrating processing of the Master SerDes when receiving a reply from the Slave SerDes to the Random Read Command in the Bulk I2C mode.

FIG. 49 is a diagram following FIG. 48 and illustrating processing of the Master SerDes 7 when a reply from the Slave SerDes 13 to the Random Read Command is received in the Bulk I2C mode. The Master SerDes 7 performs the protocol conversion for the received data of the forward link, and saves the received data including the I2C communication result (ACK/NACK) with the Slave 22 in mem1. FIG. 50 is a diagram illustrating an example of data in mem1 after reception of reply data from the Slave SerDes 13 to the Random Read Command in the Bulk I2C mode.

Figure 51:
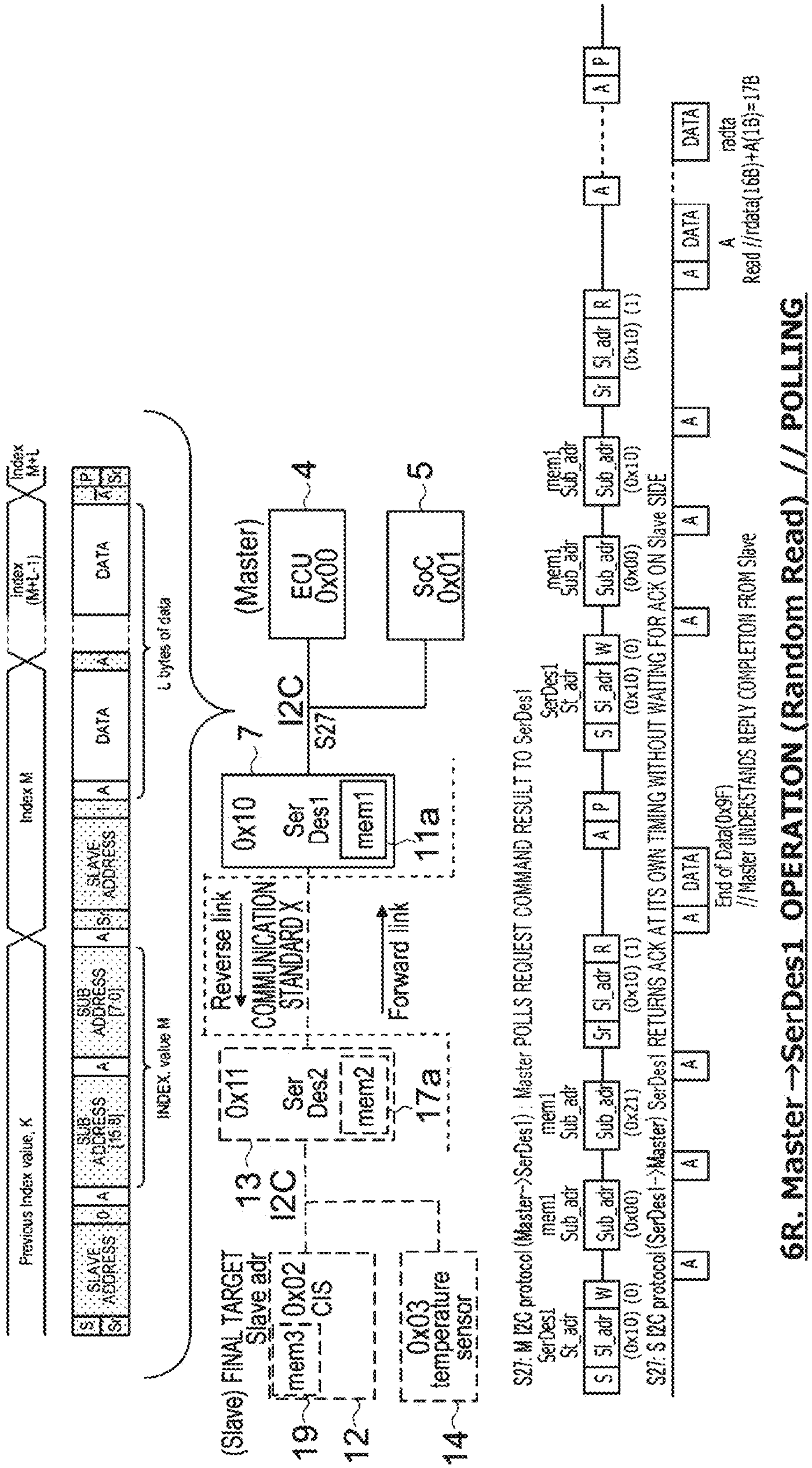
FIG. 51 is a diagram illustrating processing in a case where the Master performs polling for the Master SerDes for the Random Read Command in the Bulk I2C mode and reads an execution result.

FIG. 51 is a diagram illustrating processing in a case where the Master 21 performs polling for the Master SerDes 7 for the Random Read Command in the Bulk I2C mode and reads an execution result. The Master 21 polls a request command result to the Master SerDes 7 in the M I2C protocol (step S27). The Master 21 performs polling at its own timing without waiting for ACK on the Slave 22 side, and the Master SerDes 7 returns ACK or RDATA as a polling result to the Master 21 (step S27).

When the result of "16-bytes read to the Slave 22" requested by the Master 21 to the Master SerDes 7 is completed, the End of data (0x9F) and the resulting ACK (0x81) can be read. If the readout result of End of data is other than 0x9F, polling is continued. In the present example, polling determination is performed by seeing the result of End of data by reading 1 byte, and RDATA (16 bytes)+ACK/NACK is read by reading 17 bytes again. However, it may also be possible to read 18 bytes at a time and determine the polling result and the I2C communication result to the Slave 22. In a case where the result is NACK, the Master 21 can confirm whether or not the NACK is from the Slave 22 by reading Slave adr of Sub_Adr (15).

FIG. 52 is a diagram illustrating an example of saved data of table1 in mem1 before a storage area for the Random Read Command is released in the Bulk I2C mode.

In FIG. 46A, the processing in which the Slave SerDes 13 performs random read for the Slave 22 has been described. However, as illustrated in FIG. 53A, random read is necessarily performed when the mem3 in the Slave 22 is accessed for the first time, but at and after the second time, current read may be performed.

When End of data, or End of data and cmd_done are written in mem2, the Slave SerDes 13 performs the I2C protocol conversion for the data written in mem2 and performs the I2C communication with the Slave 22. In a case where current read is performed (in a case where Cmd_mode [3:0]=1001), Sub_adrH and Sub_adrL in mem2 illustrated in FIG. 54 are not used. Therefore, the I2C command protocol transmitted from the Slave SerDes 13 to the Slave 22 is reduced by 2 bytes.

Figure 53A:
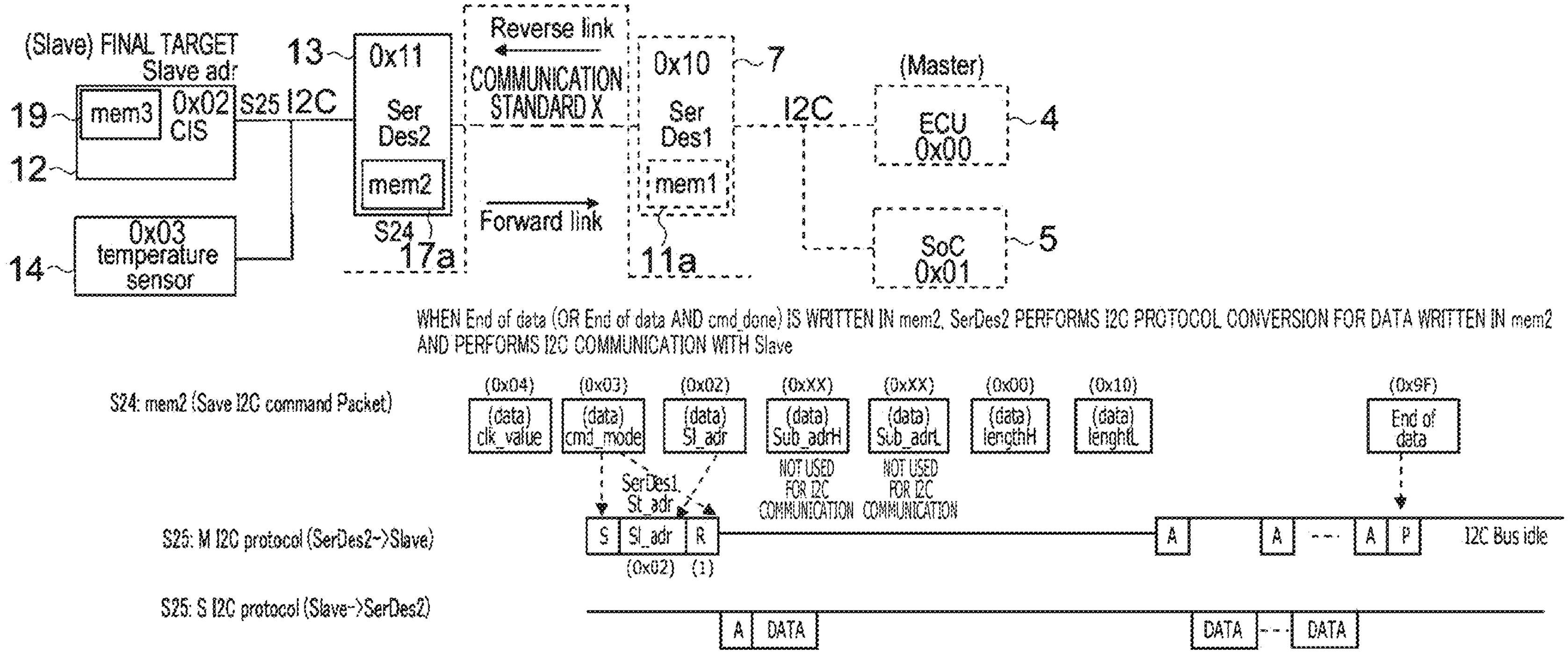
FIG. 53A is a diagram illustrating processing on a Slave SerDes side in a case of performing Current read in the Bulk I2C mode.
Figure 53B:
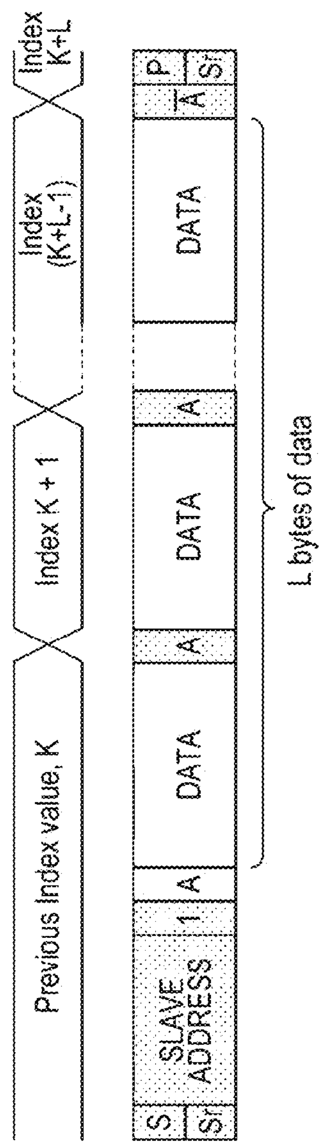
FIG. 53B is a diagram illustrating the I2C communication protocol in the case of performing Current read.

It can be seen that the Slave SerDes 13 and the Slave 22 in FIG. 53A perform communication according to the protocol conforming to the I2C communication protocol illustrated in FIG. 53B.

(Error Command Format)

Figure 55:
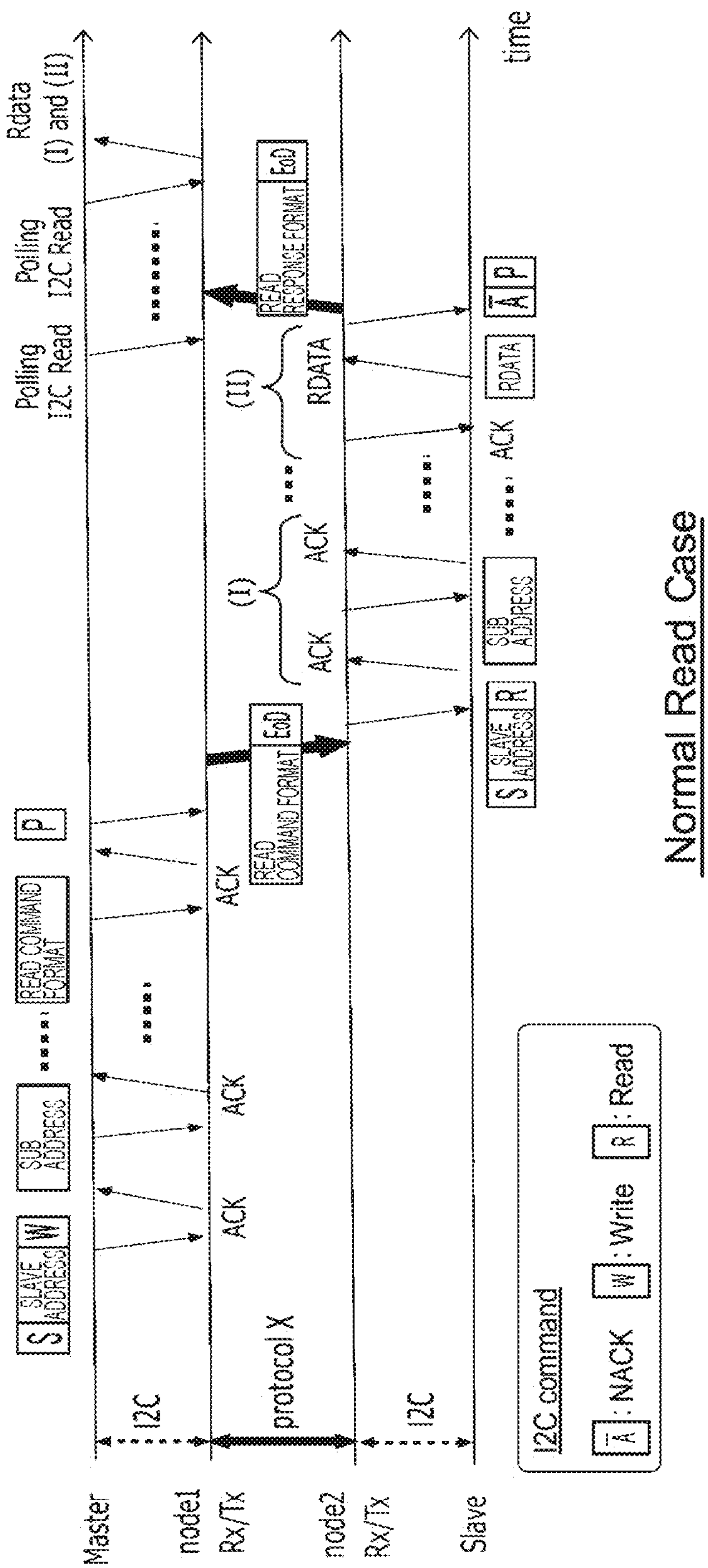
FIG. 55 is a timing chart of a Read operation in a normal state of the Bulk I2C mode.
Figure 56:
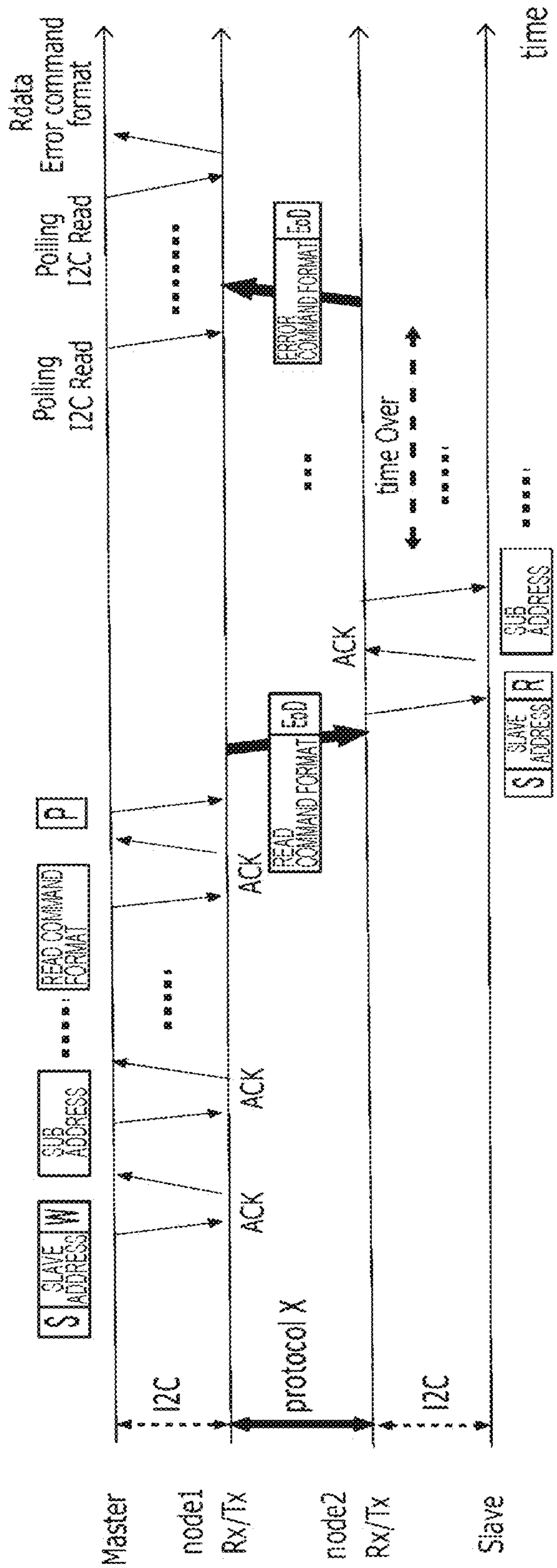
FIG. 56 is a diagram illustrating an example in which an ACK/NACK signal does not arrive from the Slave within a restricted period in the Bulk I2C mode.

In a case where the error command format is provided in the command format as illustrated in FIG. 11B described above, data transmission in the error command format is performed when an error occurs when the Bulk I2C mode is selected. FIG. 55 is a timing chart of the Read operation in the normal state of the Bulk I2C mode, and FIG. 56 is a timing chart in a case where an error occurs during Read in the Bulk I2C mode (hereinafter Read error case 1).

As illustrated in FIG. 55, in a normal state, the node2 transmits the Slave address and the offset address to the Slave 22, then receives the RDATA from the Slave 22, and transmits the RDATA to the node1. FIG. 56 illustrates an example in which the ACK/NACK signal does not arrive from the Slave 22 within a restricted period after the node2 transmits the offset address to the Slave 22. In this case, the node2 forcibly terminates the communication with the Slave 22 when it becomes timeout, transmits the error command format to the node1, and performs initialization processing. The Master 21 determines that an error has occurred during the I2C communication by reading the error command format received by the node1.

FIG. 57 is a diagram illustrating saved data of table3 in mem2 when the Slave SerDes 13 that is the node2 in the Bulk I2C mode transmits the error command format. The value of the Read command format of SubAdr [0:7] is the same as that of table3 in FIG. 45. SubAdr [8:N−1] in table3 in FIG. 45 has the Read response format, whereas SubAdr [8:N−1] in FIG. 57 has the error command format. While RDATA is written in SubAdr [10:N−2] of FIG. 45, SubAdr [10:N−2] of FIG. 57 is don't care. Furthermore, End of Data of the error command format is written in SubAdr [N−1] in FIG. 57.

FIG. 58 is a diagram illustrating saved data of table1 in mem1 when the Master SerDes 7 that is the node1 in the Bulk I2C mode transmits the error command format. Compared with table1 in FIG. 50, the value of the Read command format of SubAdr [0:7] is the same. SubAdr [8:N−1] in table1 of FIG. 50 has the Read response format, whereas SubAdr [8:N−1] in FIG. 58 has the error command format. RDATA is written in SubAdr [N−3:N−2] in FIG. 45, whereas SubAdr [N−3:N−2] in FIG. 58 is don't care. Since End of Data in the error command format is written in SubAdr [N−] in FIG. 58, the Master 21 can perform similar polling processing at the time of normal operation and error operation.

Figure 59:
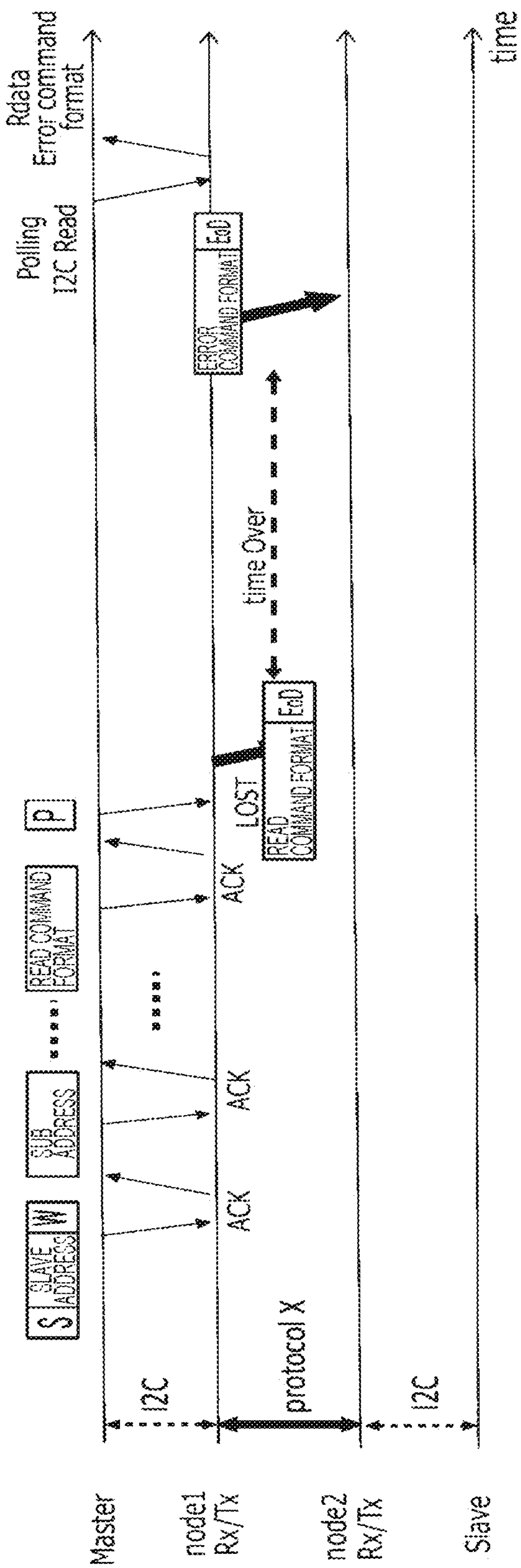
FIG. 59 is a timing chart in a case where an error occurs at the time of Read in the Bulk I2C mode (hereinafter, Read error case 2).

FIG. 59 is a timing chart in a case where an error has occurred during Read in the Bulk I2C mode (hereinafter, Read error case 2). FIG. 59 illustrates a case where the Read command format cannot be transmitted from the node1 to the node2. Since the node1 cannot transmit the Read command format to the node2 within the restricted period, the node1 transmits the error command format to the node2, providing notification that an error has occurred. The Master 21 determines that an error has occurred during the I2C communication by reading the error command format of the node1. When receiving the error command format, the node2 performs the initialization processing as necessary.

FIG. 60 is a diagram illustrating saved data of table1 in mem1 of the node1 (Master SerDes 7) in the Read error case 2. The Read command format of SubAdr [0:7] is the same as the Read command format of SubAdr [0:7] in table1 of FIG. 50. While SubAdr [8:N−1] of FIG. 50 has the Read response format, SubAdr [8:N−1] of FIG. 60 has the error command format. SubAdr [10:N−2] in the error command format is don't care, and End of Data of the error command format is written in SubAdr [N−1]. Therefore, the Master 21 can perform similar polling processing in the normal state and in the error state.

FIG. 61 is a diagram illustrating saved data of table1 in mem1 included in the node1 in a Write error case. The Write command format of SubAdr [0:N−1] is the same as the Write command format of SubAdr [0:N−1] in table1 of FIG. 35. While SubAdr [N: N+9] of FIG. 35 has the ACK/NACK format, SubAdr [N: N+9] of FIG. 61 has the error command format. SubAdr [N+2: N+8] in the error command format is don't care, and End of Data of the error command format is written in SubAdr [N+9]. Therefore, the Master 21 can perform similar polling processing in the normal state and in the error state.

Figure 62:
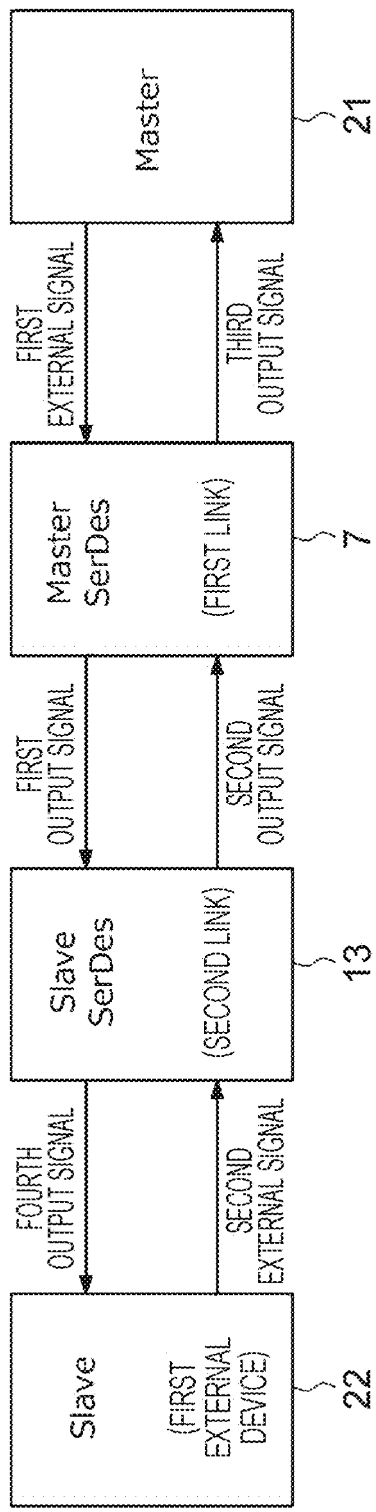
FIG. 62 is an equivalent block diagram of the communication system according to the present embodiment.

FIG. 62 is an equivalent block diagram of the communication system 3 according to the present embodiment. When performing the data communication between the first external device corresponding to the Master 21 and the second external device corresponding to the Slave 22, the communication system 3 in FIG. 62 provides the Master SerDes 7 and the Slave SerDes 13 between the Master 21 and the Slave 22 to relay the data communication between the Master 21 and the Slave 22. The Master SerDes 7 has a first LINK (LINK 11). The Slave SerDes 13 has a second LINK (LINK 17). The first LINK generates the first output signal on the basis of the first external signal from the Master 21 and outputs the first output signal to the Slave SerDes 13, and generates a third output signal on the basis of the second output signal from the Slave SerDes 13 and outputs the third output signal to the Master 21. The second LINK generates the second output signal on the basis of the second external signal from the Slave 22 and outputs the second output signal to the Master SerDes 7, and generates a fourth output signal on the basis of the first output signal from the Master SerDes 7 and outputs the fourth output signal to the Slave.

The first LINK can alternatively select a first mode of receiving the ACK signal indicating an acknowledgement or the NACK signal indicating a negative acknowledgement each time transmitting information of a predetermined number of bytes (for example, 1 byte or 2 bytes), or a second mode of receiving the ACK signal or the NACK signal each time transmitting bulk information that is a bulk of information of a plurality of bytes. The communication system in which each of the first output signal and the second external signal includes command information indicating content of a command transmitted from the first external device.

By configuring the communication system 3 as illustrated in FIG. 62, data communication can be performed between the Master 21 and the Slave 22 at high speed.

Between the Master SerDes 7 and the Slave SerDes 13, data communication can be performed at high speed by, for example, a TDD scheme or a frequency division duplexing (FDD) scheme.

As described above, in the present embodiment, the Master SerDes 7 and the Slave SerDes 13 are arranged between the Master 21 and the Slave 22, and various types of information can be serially transmitted at high speed between the Master SerDes 7 and the Slave SerDes 13 by using the communication standard X. The communication standard X may be the FDD scheme or the TDD scheme. Between the Master SerDes 7 and the Slave SerDes 13, it is possible to select either the Byte I2C mode (first mode) of receiving the ACK/NACK each time transmitting 1-byte or 2-byte information, or the Bulk I2C mode (second mode) of receiving the ACK/NAK signal each time transmitting the bulk information that is a bulk of information of a plurality of bytes. In the case of selecting the Byte I2C mode, it is possible to perform the I2C communication using the TDD scheme in a format close to the I2C communication using the FDD scheme. Furthermore, in the case of selecting the Bulk I2C mode, when the Master SerDes 7 receives the command transmitted from the Master 21 to the Slave 22, the Master SerDes 7 can return the ACK to the Master 21 by its own determination without waiting for the ACK from the Slave 22. Thereby, the Master 21 can quickly receive the ACK, and can quickly perform processing after receiving the ACK. That is, a period during which the Master 21 stretches the clock until receiving the ACK can be shortened, and the processing efficiency of the Master 21 can be improved.

Note that the present technology can also have the following configurations.

(1) A communication device including:

a LINK configured to perform protocol conversion of a signal from a Master and output the converted signal to a Slave SerDes, and perform protocol conversion of a signal from the Slave SerDes and output the converted signal to the Master, in which the LINK is capable of alternatively selecting a first mode and a second mode when transmitting the signal from the Master to the Slave SerDes, in the first mode, the LINK repeats processing of converting a 1-byte signal transmitted from the Master into a signal of a first communication standard in units of the 1-byte signal, transmits the converted signal to the Slave SerDes, then receives a signal of the first communication standard including an ACK signal indicating an acknowledgement or a NACK signal indicating a negative acknowledgement, converts the received signal into a signal of a second communication standard, and transmits the converted signal to the Master, and in the second mode, the LINK transmits a signal including the ACK signal or the NACK signal to the Master each time receiving a multi-byte signal transmitted from the Master byte by byte, collectively transmits converted signals to the Slave SerDes after the conversion of the multi-byte signal received from the Master is completed, then receives and retains the signal of the first communication standard including the ACK signal or the NACK signal from the Slave SerDes, and then converts the signal of the first communication standard into a signal of the second communication standard and transmits the converted signal to the Master in response to a readout request from the Master, and the signal transmitted to the Slave SerDes includes command information indicating content transmitted from the Master, and the signal transmitted to the Master includes command information indicating content transmitted from the Slave SerDes.

(2) The communication device according to (1), in which a number of bytes of the signal transmitted to the Slave SerDes in the first mode is two bytes or three bytes excluding clock frequency information and an error correction code.

(3) The communication device according to (1) or (2), in which, in the first mode, the LINK transitions to a first state when having received a signal including Start Condition from the Master, converts the Start Condition into a signal of the first communication standard and transmits the converted signal to the Slave SerDes when having transitioned to the first state, then, transitions to a second state and holds a clock from the Master to a low level when having received signal including 1-byte address information of a final destination device from the Master while the LINK is in the first state, converts the signal including address information into a signal of the first communication standard and transmits the converted signal to the Slave SerDes in the second state, then, recognizes write and transitions to a third state in a case where a specific bit of the signal including address information is a first bit value when having received the signal including the ACK signal or the NACK signal from the Slave SerDes while the LINK is in the second state, and converts the signal including the ACK signal or the NACK signal received from the Slave SerDes into a signal of the second communication standard and transmits the converted signal to the Master, and then releases the hold of the low level of the clock from the Master in the third state.

(4) The communication device according to (3), in which, in the first mode, the LINK transitions to a fourth state when having received a signal including 1-byte write data from the Master while the LINK is in the third state, converts the received signal into a signal of the first communication standard and transmits the converted signal to the Slave SerDes in the fourth state, and then, converts the received signal into a signal of the second communication standard and transmits the converted signal to the Master when having received the signal including the ACK signal or the NACK signal from the Slave SerDes while the LINK is in the fourth state.

(5) The communication device according to (4), in which, in the first mode, the LINK transitions to a fifth state in a case of not receiving the signal including the ACK signal or the NACK signal within a predetermined period from the Slave SerDes while the LINK is in the second state or the fourth state, and performs error processing in the fifth state.

(6) The communication device according to (1) or (2), in which, in the first mode, the LINK transitions to a first state when having received a signal including Start Condition or ReStart Condition from the Master, converts the received signal including Start Condition or ReStart Condition into a signal of the first communication standard and transmits the converted signal to the Slave SerDes when having transitioned to the first state, then, transitions to a second state and holds a clock from the Master to a low level when having received signal including 1-byte address information of a final destination device from the Master while the LINK is in the first state, converts the signal including address information into a signal of the first communication standard and transmits the converted signal to the Slave SerDes in the second state, then, recognizes read and transitions to a sixth state in a case where a specific bit of the signal including address information is a second bit value when having received the signal including the ACK signal or the NACK signal from the Slave SerDes while the LINK is in the second state, and converts the signal including the ACK signal or the NACK signal received from the Slave SerDes into a signal of the second communication standard and transmits the converted signal to the Master, and then releases the hold of the low level of the clock from the Master in the sixth state.

(7) The communication device according to (6), in which, in the first mode, the LINK transitions to a seventh state when having received a signal including 1-byte readout data from the Slave SerDes while the LINK is in the sixth state, converts the received signal into a signal of the second communication standard and transmits the converted signal to the Master in the seventh state, and then, transitions to the sixth state, and converts the received signal into a signal of the first communication standard and transmits the converted signal to the Slave SerDes when having received the signal including the ACK signal or the NACK signal from the Master while the LINK is in the seventh state.

(8) The communication device according to (7), in which, in the first mode, the LINK transitions to an eighth state in a case of not receiving readout data within a predetermined period from the Slave SerDes while the LINK is in the sixth state, transitions to the eighth state in a case of not receiving the ACK signal or the NACK signal within a predetermined period from the Master while the LINK is in the seventh state, and avoids deadlock of an entire system including the communication device, the Master, and the Slave SerDes by performing error processing in the eighth state.

(9) The communication device according to any one of (1) to (8), in which, in the second mode, the LINK retains a received signal from when receiving a signal including Start Condition to when receiving a signal including Stop Condition from the Master, and transmits the signal including the ACK signal or the NACK signal to the Master for each byte of the received signal, converts the received signal into a signal of the first communication standard, and transmits the converted signal to the Slave SerDes, and receives and retains the signal including the ACK signal or the NACK signal from the Slave SerDes, and then, converts the signal from the Slave SerDes into a signal of the second communication standard and transmits the converted signal to the Master in response to a readout request from the Master.

(10) The communication device according to any one of (1) to (9), in which the command information includes at least one of first information for selecting the first mode or the second mode, second information for alternatively selecting whether or not the Slave SerDes or the communication device generates a clock signal for transmitting and receiving data by the Slave SerDes or the communication device's own determination or to explicitly specify the clock signal to be used by the Slave SerDes or the communication device in a case where the first mode is selected, third information for instructing whether or not data to be written or read is included in the case where the first mode is selected, fourth information indicating whether or not the NACK signal has been received in the case where the first mode is selected, fifth information indicating whether or not the ACK signal has been received in the case where the first mode is selected, sixth information indicating whether or not Stop Condition instructing stop of information transmission is included in the case where the first mode is selected, or a seventh information indicating whether or not Start Condition instructing start of information transmission or a Repeated Start Condition instructing restart of information transmission is included in the case where the first mode is selected.

(11) The communication device according to (10), in which the LINK transmits a signal including the seventh information to the Slave SerDes, and then transmits a signal including address information of a final destination device to the Slave SerDes in the first mode.

(12) The communication device according to (10), in which the LINK transmits a signal obtained by combining the seventh information and address information of a final destination device to the Slave SerDes in the first mode.

(13) The communication device according to any one of (1) to (12), in which each of the signal to the Slave SerDes and the signal to the Master includes at least one of an error correction code, data, clock frequency information, or information indicating a type of a command to be transmitted and received, in addition to the command information.

(14) The communication device according to any one of (1) to (13), in which the signal to the Slave SerDes includes at least one of final destination address information for identifying a final destination device of the signal transmitted from the Master, sub-address information of the final destination device, or data length information indicating a length of data transmitted from the Master.

(15) The communication device according to any one of (1) to (14), in which the command information includes command format information defined in the first communication standard in a case where the second mode is selected, and the command format information includes an error command format.

(16) The communication device according to any one of (1) to (15), in which the command information includes data end determination condition information that specifies a condition for end determination of the signal transmitted from the Master in a case where the second mode is selected.

(17) The communication device according to any one of (1) to (16), in which the signal to the Slave SerDes and the signal from the Slave SerDes include a command obtained by performing protocol conversion of a command of inter-integrated circuit (I2C) communication into the first communication standard.

(18) The communication device according to (17), in which the protocol conversion by the LINK is protocol conversion of time division duplex (TDD).

(19) A communication device including:

a LINK configured to perform protocol conversion of a signal from a Master serDes and output the converted signal to a Slave, and perform protocol conversion of a signal from the Slave and output the converted signal to the Master SerDes, in which the LINK is capable of alternatively selecting a first mode and a second mode when transmitting the signal from the Master SerDes to the Slave, in the first mode, the LINK repeats processing of converting a received signal into a signal of a second communication standard in units of the received signal when having received a signal of a first communication standard transmitted from the Master SerDes, transmitting the converted signal to the Slave, then receiving a signal of the second communication standard including an ACK signal indicating an acknowledgement or a NACK signal indicating a negative acknowledgement, and converting the received signal into a signal of the first communication standard and transmitting the converted signal to the Master SerDes, in the second mode, the LINK converts a received signal into a signal of the second communication standard and transmit the converted signal to the Slave byte by byte when having received a multi-byte signal of the first communication standard transmitted from the Master SerDes, and receives and retains the signal of the second communication standard including the ACK signal or the NACK signal from the Slave each time transmitting the converted signal to the Slave byte by byte, and transmits a signal of the first communication standard corresponding to the retained signal to the Master SerDes after completing the transmission of the signal from the Master SerDes to the Slave, and the signal from the Master SerDes includes command information indicating content transmitted from the Master SerDes, and the signal from the Slave includes command information indicating content transmitted from the Slave.

(20) A communication system including:

a Master SerDes provided with a first LINK; and a Slave SerDes provided with a second LINK, in which the first LINK is capable of alternatively selecting a first mode and a second mode when transmitting a signal from the Master to the Slave SerDes, in the first mode, the first LINK repeats processing of converting a 1-byte signal transmitted from the Master into a signal of a first communication standard in units of the 1-byte signal and transmitting the converted signal to the Slave SerDes, then receiving a signal of the first communication standard including an ACK signal indicating an acknowledgement or a NACK signal indicating a negative acknowledgement transmitted from the Slave, and converting the received signal into a signal of a second communication standard and transmitting the converted signal to the Master, in the second mode, the first LINK transmits the signal including the ACK signal or the NACK signal to the Master each time receiving a multi-byte signal transmitted from the Master byte by byte, collectively transmits converted signals to the Slave SerDes after the conversion of the multi-byte signals received from the Master is completed, then receives and retains the signal of the first communication standard including the ACK signal or the NACK signal from the Slave SerDes, and then converts the signal of the first communication standard into a signal of the second communication standard and transmits the converted signal to the Master in response to a readout request from the Master, and the signal transmitted to the Slave SerDes includes command information indicating content transmitted from the Master, and the signal transmitted to the Master includes command information indicating content transmitted from the Slave SerDes, and the second LINK is capable of alternatively selecting the first mode and the second mode when transmitting a signal from the Master SerDes to the Slave, in the first mode, the second LINK repeats processing of converting a signal of the first communication standard transmitted from the Master SerDes into a signal of the second communication standard in units of the received signal and transmitting the converted signal to the Slave, then receiving a signal of the second communication standard including an ACK signal indicating an acknowledgement or a NACK signal indicating a negative acknowledgement, converting the received signal into a signal of the first communication standard and transmitting the converted signal to the Master SerDes, in the second mode, the second LINK converts a received signal into a signal of the second communication standard when receiving a multi-byte signal of the first communication standard transmitted from the Master SerDes, and transmits the converted signal to the Slave byte by byte, receives and retains the signal of the second communication standard including the ACK signal or the NACK signal from the Slave each time transmitting the converted signal to the Slave byte by byte, and transmits a signal of the first communication standard corresponding to the retained signal to the Master SerDes after completing the transmission of the signal from the Master SerDes to the Slave, and the signal from the Master SerDes includes command information indicating content transmitted from the Master SerDes, and the signal from the Slave includes command information indicating content transmitted from the Slave.

The aspects of the present disclosure are not limited to the above-described individual embodiments, but also include various modifications that can be conceived by those skilled in the art, and the effects of the present disclosure are not limited to the above-described content. That is, various additions, changes, and partial deletions are possible without departing from the conceptual idea and purpose of the present disclosure derived from the content defined in the claims and its equivalents.

REFERENCE SIGNS LIST

1 Communication device
3 Communication system
4 ECU
4*a* I2C
5 SoC
5*a* I2C
7 Master SerDes
8 I2C Cmd Unit
9 Fw. Rx
10 Rv. Tx
11 LINK
11*a* mem
12 Image sensor
12*a* I2C
13 Slave SerDes
14 Temperature sensor
17 LINK
19 mem
20 mem
21 Master
22 Slave

The invention claimed is:

1. A communication apparatus, comprising:

a memory storing instructions, and a processor configured to execute the instructions to perform operations comprising:

performing protocol-conversion on a signal from a Master and outputting a converted signal to a Slave Serializer/Deserializer (SerDes) and performing protocol-conversion on a signal from the Slave SerDes and outputting the converted signal to the Master;

alternatively selecting a first mode and a second mode for transmitting the signal from the Master to the Slave SerDes:

in the first mode, repeating processing of converting the signal transmitted from the Master into a signal of a first communication standard in units of one byte, receiving a signal of the first communication standard including one of an acknowledgement (ACK) signal representing an affirmative response and a non-acknowledgement (NACK) signal representing a negative response after transmitting the converted signal to the Slave SerDes, converting the received signal into a signal of a second communication standard, and transmitting the converted signal to the Master;

in the second mode, transmitting, to the Master, a signal including one of the ACK signal and the NACK signal every time a signal of a plurality of bytes transmitted from the Master is received byte by byte, collectively transmitting the converted signal to the Slave SerDes after a conversion of the signal of a plurality of bytes received from the Master is completed, then, receiving a signal of the first communication standard including one of the ACK signal and the NACK signal from the Slave SerDes and holding the received signal, and then, converting, in response to a read request from the Master, the signal of the first communication standard into a signal of the second communication standard and transmitting the converted signal to the Master, wherein a signal to be transmitted to the Slave SerDes includes command information indicating content transmitted from the Master, and a signal to be transmitted to the Master includes command information indicating content transmitted from the Slave SerDes.

2. The communication apparatus according to claim 1, wherein a number of bytes of the signal to be transmitted to the Slave SerDes in the first mode is one of 2 bytes and 3 bytes except for clock frequency information and error correction code.

3. The communication apparatus according to claim 1, wherein the operations further comprise:

in the first mode, transitioning to a first state upon receiving a signal including a Start Condition from the Master, converts, when transitioning to the first state, the Start Condition into a signal of the first communication standard and transmitting an obtained signal to the Slave SerDes;

then, transitioning to a second state upon receiving, in the first state, a signal including address information of a final destination apparatus of one byte from the Master, and holding a clock from the Master at a low level;

converting, in the second state, a signal including the address information into a signal of the first communication standard and transmitting the obtained signal to the Slave SerDes;

then, upon receiving, in the second state, a signal including one of the ACK signal and the NACK signal from the Slave SerDes, recognizing, where a specific bit of the signal including the address information has a first bit value, the specific bit as writing and transitions to a third state; and converting, in the third state, the signal including one of the ACK signal and the NACK signal received from the Slave SerDes into a signal of the second communication standard, transmitting the obtained signal to the Master, and then, releasing the holding of the low level of the clock from the Master.

4. The communication apparatus according to claim 3, wherein the operations further comprise:

in the first mode, transitioning to a fourth state upon receiving, in the third state, a signal including writing data of one byte from the Master;

converting, in the fourth state, the received signal into a signal of the first communication standard, and transmitting the obtained signal to the Slave SerDes; and then, upon receiving, in the fourth state, a signal including one of the ACK signal and the NACK signal from the Slave SerDes, converting the received signal into a signal of the second communication standard and transmitting the obtained signal to the Master.

5. The communication apparatus according to claim 4, wherein the operations further comprise:

in the first mode, transitioning to a fifth state where the signal including one of the ACK signal and the NACK signal is not received from the Slave SerDes within a predetermined time period in one of the second state and the fourth state; and performing error processing in the fifth state.

6. The communication apparatus according to claim 1, wherein the operations further comprise:

in the first mode, transitioning to a first state upon receiving a signal including one of a Start Condition and a ReStart Condition from the Master;

converting, when transitioning to the first state, the signal including one of the Start Condition and the ReStart Condition into a signal of the first communication standard and transmitting an obtained signal to the Slave SerDes;

then, transitioning to a second state upon receiving, in the first state, a signal including address information of a final destination apparatus of one byte from the Master, and holding a clock from the Master at a low level;

converting, in the second state, a signal including the address information into a signal of the first communication standard and transmitting the obtained signal to the Slave SerDes;

then, upon receiving, in the second state, a signal including one of the ACK signal and the NACK signal from the Slave SerDes, recognizing, where a specific bit of the signal including the address information has a second bit value, the specific bit as reading and transition to a sixth state; and converting, in the sixth state, the signal including one of the ACK signal and the NACK signal received from the Slave SerDes into a signal of the second communication standard, transmitting the obtained signal to the Master, and then, releasing the holding of the low level of the clock from the Master.

7. The communication apparatus according to claim 6, wherein the operations further comprise:

in the first mode, transitioning to a seventh state upon receiving, in the sixth state, a signal including reading data of one byte from the Slave SerDes;

converting, in the seventh state, the received signal into a signal of the second communication standard, and transmitting the obtained signal to the Master; and then, transitioning to the sixth state upon receiving, in the seventh state, a signal including one of the ACK signal and the NACK signal from the Master, converting the received signal into a signal of the first communication standard, and transmitting the obtained signal to the Slave SerDes.

8. The communication apparatus according to claim 7, wherein the operations further comprise:

in the first mode, transitioning to an eighth state where the reading data is not received from the Slave SerDes within a predetermined time period in the sixth state;

transitioning to the eighth state where the one of the ACK signal and the NACK signal is not received from the Master within the predetermined time period in the seventh state; and performing error processing in the eighth state to avoid deadlock of an entire system including the communication apparatus, the Master, and the Slave SerDes.

9. The communication apparatus according to claim 1, wherein the operations further comprise:

in the second mode, holding the received signal from when receiving the signal including a Start Condition to when receiving a signal including a Stop Condition, and transmitting a signal including one of the ACK signal and the NACK signal to the Master byte by byte of the received signal;

converting the received signal into a signal of the first communication standard, and transmitting the converted signal to the Slave SerDes; and receiving a signal including one of the ACK signal and the NACK signal from the Slave SerDes and holding the received signal, then converting, in accordance with a reading request from the Master, the signal from the Slave SerDes into a signal of the second communication standard, and transmitting an obtained signal to the Master.

10. The communication apparatus according to claim 1, wherein the command information includes at least one of first information for selecting one of the first mode and the second mode, second information for alternatively selecting, where the first mode is selected, whether one of the Slave SerDes and the communication apparatus generates a clock signal for transmitting and receiving data by its own determination or one of the Slave SerDes and the communication apparatus explicitly designates the clock signal to be used, third information indicating, where the first mode is selected, whether or not one of writing data and reading data is included, fourth information indicating, where the first mode is selected, whether or not the NACK signal is received, fifth information indicating, where the first mode is selected, whether or not the ACK signal is received, sixth information indicating, where the first mode is selected, whether or not a Stop Condition instructing to stop transmission of information is included, or seventh information indicating, where the first mode is selected, whether or not one of a Start Condition instructing to start transmission of information and a Repeated Start Condition instructing to resume transmission of information is included.

11. The communication apparatus according to claim 10, wherein the operations further comprise:

in the first mode, transmitting the signal including the seventh information to the Slave SerDes, and then transmitting the signal including an address information of a final destination apparatus to the Slave SerDes.

12. The communication apparatus according to claim 10, wherein the operations further comprise:

in the first mode, transmitting a signal obtained by combining the seventh information and an address information of a final destination apparatus to the Slave SerDes.

13. The communication apparatus according to claim 1, wherein each of the signal to the Slave SerDes and the signal to the Master includes, in addition to the command information, at least one of an error correction code, data, clock frequency information, or information indicating a type of a command to be transmitted and received.

14. The communication apparatus according to claim 1, wherein the signal to the Slave SerDes includes at least one of final destination address information for identifying the final destination apparatus of the signal transmitted from the Master, sub-address information of the final destination apparatus, or data-length information indicating a length of data transmitted from the Master.

15. The communication apparatus according to claim 1, wherein the command information includes, where the second mode is selected, command-format information defined by the first communication standard, and the command-format information includes an error command format.

16. The communication apparatus according to claim 1, wherein the command information includes, where the second mode is selected, data-end-determination-condition information for specifying a condition for determining an end of the signal transmitted from the Master.

17. The communication apparatus according to claim 1, wherein each of the signal to the Slave SerDes and the signal from the Slave SerDes includes a command obtained by performing protocol conversion on a command of I2C (Inter-Integrated Circuit) communication into a command of the first communication standard.

18. The communication apparatus according to claim 17, wherein the protocol conversion is protocol conversion of TDD (Time Division Duplex).

19. A non-transitory computer readable medium storing a program for controlling a communication apparatus, the program code being executable to perform operations comprising:

performing protocol-conversion on a signal from a Master and outputting a converted signal to a Slave Serializer/Deserializer (SerDes) and performing protocol-conversion on a signal from the Slave SerDes and outputting the converted signal to the Master;

alternatively selecting a first mode and a second mode for transmitting the signal from the Master to the Slave SerDes:

in the first mode, repeating processing of converting the signal transmitted from the Master into a signal of a first communication standard in units of one byte, receiving a signal of the first communication standard including one of an acknowledgement (ACK) signal representing an affirmative response and a non-acknowledgement (NACK) signal representing a negative response after transmitting the converted signal to the Slave SerDes, converting the received signal into a signal of a second communication standard, and transmitting the converted signal to the Master;

in the second mode, transmitting, to the Master, a signal including one of the ACK signal and the NACK signal every time a signal of a plurality of bytes transmitted from the Master is received byte by byte, collectively transmitting the converted signal to the Slave SerDes after a conversion of the signal of a plurality of bytes received from the Master is completed, then, receiving a signal of the first communication standard including one of the ACK signal and the NACK signal from the Slave SerDes and holding the received signal, and then, converting, in response to a read request from the Master, the signal of the first communication standard into a signal of the second communication standard and transmitting the converted signal to the Master, wherein a signal to be transmitted to the Slave SerDes includes command information indicating content transmitted from the Master, and a signal to be transmitted to the Master includes command information indicating content transmitted from the Slave SerDes.

* * * * *